(12) United States Patent
Page

(10) Patent No.: US 7,912,045 B2
(45) Date of Patent: Mar. 22, 2011

(54) DATA STREAMING COMMUNICATION SYSTEM AND METHOD

(75) Inventor: Michael Page, Oxford (GB)

(73) Assignee: Sony United Kingdom Limited, Weybridge (GB)

( * ) Notice: Subject to any disclaimer, the term of this patent is extended or adjusted under 35 U.S.C. 154(b) by 1154 days.

(21) Appl. No.: 10/955,075

(22) Filed: Sep. 30, 2004

(65) Prior Publication Data

US 2005/0078683 A1    Apr. 14, 2005

(30) Foreign Application Priority Data

Oct. 8, 2003 (GB) .................................. 0323569.4

(51) Int. Cl.
*H04L 12/28* (2006.01)
*H04J 3/24* (2006.01)
*G10L 19/00* (2006.01)

(52) U.S. Cl. ........ 370/389; 370/474; 370/535; 704/203; 704/229

(58) Field of Classification Search .................. 370/389, 370/474, 535; 704/203, 229
See application file for complete search history.

(56) References Cited

U.S. PATENT DOCUMENTS

| | | | | |
|---|---|---|---|---|
| 4,107,469 A * | 8/1978 | Jenkins | ........................ | 370/505 |
| 4,649,536 A * | 3/1987 | Krinock | ........................ | 370/470 |
| 5,481,543 A * | 1/1996 | Veltman | ........................ | 370/473 |
| 5,901,178 A * | 5/1999 | Lee et al. | ........................ | 375/240 |
| 6,351,733 B1 * | 2/2002 | Saunders et al. | .............. | 704/500 |
| 6,405,338 B1 * | 6/2002 | Sinha et al. | ................... | 714/752 |
| 6,539,051 B1 | 3/2003 | Grivna | | |
| 6,788,710 B1 * | 9/2004 | Knutson et al. | ............... | 370/535 |
| 6,944,154 B2 * | 9/2005 | Coupe et al. | .................. | 370/389 |
| 7,313,315 B2 * | 12/2007 | Morris et al. | ................... | 386/95 |
| 2001/0024457 A1 | 9/2001 | Barry et al. | | |
| 2003/0021166 A1 | 1/2003 | Soloff | | |

FOREIGN PATENT DOCUMENTS

| | | |
|---|---|---|
| EP | 1 223 696 | 7/2003 |
| GB | 2 388 501 | 11/2003 |
| WO | WO 03/058826 A2 | 7/2003 |
| WO | WO 03/058946 | 7/2003 |

OTHER PUBLICATIONS

Emad Rashid, et al., "Ants Routing: An Adaptive packets Flow Control Scheme in Multimedia Communication", ICUPC Conference Record, vol. 1, Oct. 12, 1993, pp. 228-234.
"SuperMAC", Product Brief [online], Sony, Sep. 2003.

* cited by examiner

*Primary Examiner* — Alpus H Hsu
(74) *Attorney, Agent, or Firm* — Oblon, Spivak, McClelland, Maier & Neustadt, L.L.P.

(57) ABSTRACT

A data communication system for communicating one or more payload streamed data signals and an auxiliary data signal, the auxiliary data signal being arranged as one or more data packets according to a data packet protocol, each packet having a packet destination address. The system includes at least two data handling nodes, a transmitting one of the data handling nodes arranged to transmit data to a receiving one of the data handling nodes, and a transmission data formatter associated with the transmitting node for formatting the packets of the auxiliary data signal into a streamed data signal format and for multiplexing the payload streamed data signals and the formatted auxiliary data signal into a bitstream for transmission. The system further includes a received data reformatter associated with the receiving node for demultiplexing the input streamed data signals and the formatted auxiliary data signal and for reformatting the auxiliary data signal into packets according to the data packet protocol.

15 Claims, 44 Drawing Sheets

| PRE-AMBLE | DEST. MAC ADDRESS | SOURCE MAC ADDRESS | DATA LENGTH | NETWOR-KING HEADERS | RESER-VED FIELD | FRAME TYPE | AUDIO DATA PAYLOAD | CRC |
|---|---|---|---|---|---|---|---|---|
| 8 Bytes | 6 Bytes | 6 Bytes | 2 Bytes | 28 Bytes | 12 Bitss | 4 Bits | 1480 Bytes | 4 Bytes |

AUDIO DATA FRAME

FIGURE 17

AUDIO DATA FRAME

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address | | | | | | | |
| 3 | Reserved for source MAC address | | | | Reserved for dest. MAC address | | | |
| 4 | Reserved for source MAC address | | | | | | | |
| 5 | Length - always 1510 bytes (0x5E6) | | | | | | | |
| 6 | Reserved for networking headers | | | | | | | |
| 7 | | | | | | | | |
| 8 | | | | | | | | |
| 9 | | | | | | | | |
| 10 | | | | | | | | |
| 11 | | | | | | | | |
| 12 | reserved | reserved | reserved | frame type | | | | |
| 13-382 | 370 samples 32-channel DSD audio | | | | | | | |
| 383 | CRC | | | | | | | |

FIGURE 18A

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address | | | | | | | |
| 3 | Reserved for source MAC address | | | Reserved for destination MAC address | | | | |
| 4 | Reserved for source MAC address | | | | | | | |
| 5 | IP Type of Service | | IP Hdr Lnth | IP Version | Length – 1446 bytes (0x05A6) | | | |
| 6 | IP Datagram ID | | | | IP Fragment Offset | | | IP Flgs |
| 7 | IP Protocol | | IP TTL | | IP Header Checksum | | | |
| 8 | Source IP Address (low 16) | | | | Source IP Address (high 16) | | | |
| 9 | Destination IP Address (low 16) | | | | Destination IP Address (high 16) | | | |
| 10 | IP Options (low 16) | | | | IP Header Padding | | IP Options (high 16) | |
| 11 | UDP Source Port | | | | UDP Destination Port | | | |
| 12 | UDP Length | | | | UDP Checksum | | | |
| 13 | Frame format ID (0) | | | | | | | |
| 14 | Frame format ID (2) | | | | Frame format ID (1) | | | |
| 15-366 | 1408-byte frame payload (352 DSD samples, 24 channels, plus 88 bytes aux data) | | | | | | | |
| 367 | CRC | | | | | | | |

Fig 18B

CONTROL DATA FRAME

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address ||||||||
| 3 | Reserved for source MAC address |||| Reserved for dest. MAC address ||||
| 4 | Reserved for source MAC address ||||||||
| 5 | Length ||||||||
| 6 | Reserved for networking headers ||||||||
| 7 | Reserved for networking headers ||||||||
| 8 | Reserved for networking headers ||||||||
| 9 | Reserved for networking headers ||||||||
| 10 | Reserved for networking headers ||||||||
| 11 | Reserved for networking headers ||||||||
| 12 | reserved | reserved | reserved | frame type |||||
| 13-24 | 48 bytes control data (of arbitrary format) ||||||||
| 25 | CRC ||||||||

FIGURE 19

| Bits 15:12 | Bits 11:8 | Bits 7:4 | Bits 3:0 |
|---|---|---|---|
| Flags | Frame Type | Protocol Major Ver. | Protocol Minor Ver. |

Fig. 20

Word 13 bits 16-31 section 0

| 0010b | 0110b | 1110b | 1101b |
|---|---|---|---|
| n3 | n2 | n1 | n0 |

Word 14 bits 0-15 section 1

| 0111b | 1011b | 1110b | 1101b |
|---|---|---|---|
| n7 | n6 | n5 | n4 |

Word 14 bits 16-31 section 2

| 1100b | 0110b | 1110b | 1101b |
|---|---|---|---|
| n11 | n10 | n9 | n8 |

Fig. 21

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| P5 | P4 | P3 | P2 | A1 | A0 | 24 | 23 | P1 | 22 | 21 | 20 | 19 | 18 | 17 | P0 | 15 | 14 | 13 | 12 | 11 | 10 | 9 | 8 | 7 | 6 | 5 | 4 | 3 | 2 | 1 | |
| | | | | | | | | 23 | 22 | 21 | 20 | 19 | 18 | 17 | 16 | 15 | 14 | 13 | 12 | 11 | 10 | 9 | 8 | 7 | 6 | 5 | 4 | 3 | 2 | | |

| Parity bit | Data block elements XNOR'd to generate parity bit | | | | | | | | | | | | | | |
|---|---|---|---|---|---|---|---|---|---|---|---|---|---|---|---|
| P0 | 1 | 2 | 3 | 4 | 5 | 6 | 7 | 8 | 9 | 10 | 11 | 12 | 13 | 14 | 15 |
| P1 | 1 | 2 | 3 | 4 | 5 | 6 | 7 | 8 | 16 | 17 | 18 | 19 | 20 | 21 | 22 |
| P2 | 1 | 2 | 3 | 4 | 9 | 10 | 11 | 12 | 16 | 17 | 18 | 19 | 23 | 24 | A0 |
| P3 | 1 | 2 | 5 | 6 | 9 | 10 | 13 | 14 | 16 | 17 | 20 | 21 | 23 | 24 | A1 |
| P4 | 1 | 3 | 5 | 7 | 9 | 11 | 13 | 15 | 16 | 18 | 20 | 22 | 23 | A0 | A1 |
| P5 | (all elements – global parity bit) | | | | | | | | | | | | | | |

FIGURE 23B

| Syndrome bit | Data block elements XOR'd to generate syndrome bit | | | | | | | | | | | | | | | |
|---|---|---|---|---|---|---|---|---|---|---|---|---|---|---|---|---|
| $s_0$ | 1 | 2 | 3 | 4 | 5 | 6 | 7 | 8 | 9 | 10 | 11 | 12 | 13 | 14 | 15 | P0 |
| $s_1$ | 1 | 2 | 3 | 4 | 5 | 6 | 7 | 8 | 16 | 17 | 18 | 19 | 20 | 21 | 22 | P1 |
| $s_2$ | 1 | 2 | 3 | 4 | 9 | 10 | 11 | 12 | 16 | 17 | 18 | 19 | 23 | 24 | A0 | P2 |
| $s_3$ | 1 | 2 | 5 | 6 | 9 | 10 | 13 | 14 | 16 | 17 | 20 | 21 | 23 | 24 | A1 | P3 |
| $s_4$ | 1 | 3 | 5 | 7 | 9 | 11 | 13 | 15 | 16 | 18 | 20 | 22 | 23 | A0 | A1 | P4 |
| $s_5$ | (all elements including parity bits) | | | | | | | | | | | | | | | |

| Nibble | Bit 3 | Bit 2 | Bit 1 | Bit 0 |
|---|---|---|---|---|
| 0 | B3[0] | B2[0] | B1[0] | B0[0] |
| 1 | B7[0] | B6[0] | B5[0] | B4[0] |
| 2 | B11[0] | B10[0] | B9[0] | B8[0] |
| ... | ... | ... | ... | ... |
| 7 | B31[0] | B30[0] | B29[0] | B28[0] |
| 8 | B3[1] | B2[1] | B1[1] | B0[1] |
| 9 | B7[1] | B6[1] | B5[1] | B4[1] |
| ... | | | | |
| 254 | B27[31] | B26[31] | B25[31] | B24[31] |
| 255 | B31[31] | B30[31] | B29[31] | B28[31] |
| 256 | B35[0] | B34[0] | B33[0] | B32[0] |
| 257 | B39[0] | B38[0] | B37[0] | B36[0] |
| ... | ... | ... | ... | ... |
| 2814 | B347[31] | B346[31] | B345[31] | B344[31] |
| 2815 | B351[31] | B350[31] | B349[31] | B348[31] |

Fig 24

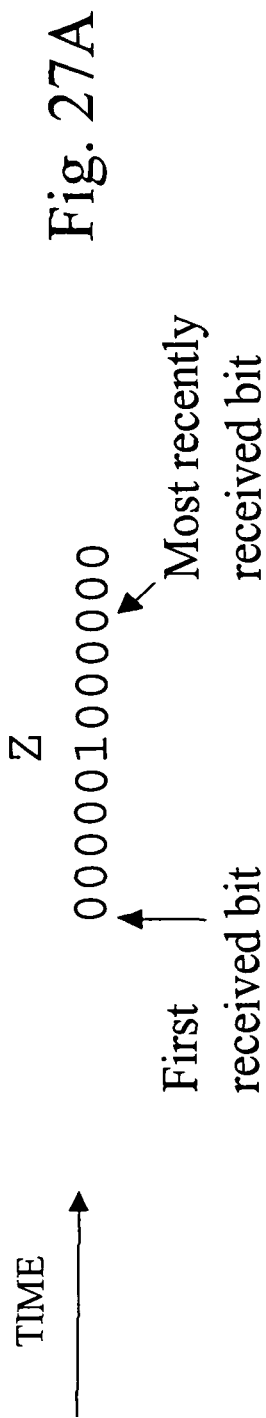

| Type value | Frame format |
|---|---|
| 0x0 | 64fs DSD (as Protocol Spec v1.1) |
| 0x1 | Reserved |
| 0x2 | Reserved |
| 0x3 | Reserved |
| 0x4 | PCM, 4 sample sub-frames |
| 0x5 | PCM, 5 sample sub-frames |
| 0x6 | PCM, 6 sample sub-frames |
| 0x7 | PCM, 7 sample sub-frames |
| 0x8 | PCM, 8 sample sub-frames |
| 0x9 | PCM, 9 sample sub-frames |
| 0xA | PCM, 10 sample sub-frames |
| 0xB | PCM, 11 sample sub-frames |
| 0xC | PCM, 12 sample sub-frames |
| 0xD | PCM, 13 sample sub-frames |
| 0xE | Reserved |
| 0xF | Reserved |

Fig 29

| Flag bit | Name | Description |
|---|---|---|
| 0 | 44.1kHz sync flag | 1: First DSD sample in frame was received at transmitter simultaneously with 44.1kHz sync clock positive edge<br><br>0: First DSD sample in frame was not received at transmitter simultaneously with 44.1kHz sync clock positive edge |
| 1 | fs/n sync flag | 1: First DSD sample in frame was received at transmitter simultaneously with fs/n sync clock positive edge<br><br>0: First DSD sample in frame was not received at transmitter simultaneously with fs/n sync clock positive edge |
| others | (not used) | Set to 0 by transmitter, ignored by receiver |

Fig 30

(Type field = 0x4 through 0xD, PCM)

| Flag bits | Name | Description |
|---|---|---|
| 1:0 | Clock base flag | 00: 44.1kHz (+/-100ppm) audio base clock<br>01: 48kHz (+/-100ppm) audio base clock<br>10: Varispeed (38.5875kHz to 54kHz) audio base clock<br>11: (reserved) |
| 3:2 | Base clock sample rate multiplier | 00: 1x base clock ($f_s$)<br>01: 2x base clock ($2f_s$)<br>10: 4x base clock ($4f_s$)<br>11: 8x base clock ($8f_s$) |

Fig 31

DATA STREAMING COMMUNICATION SYSTEM AND METHOD

BACKGROUND OF THE INVENTION

1. Field of the Invention

This invention relates to data transmission.

2. Description of the Prior Art

Direct Stream Digital (DSD) is a high-resolution single-bit audio coding system used for the so-called Super Audio CD consumer disc format. DSD was developed with a view to producing audio signals comparable to those reproduced from the best analogue formats. DSD signals can produce a frequency response from DC to 100 kHz and have a dynamic range of greater than 120 dB across the audio band.

DSD makes use of 1-bit digital audio and requires a high frequency audio sample clock at 64 Fs=2.8224 MHz (the sample clock of standard PCM systems (Fs) is 44.1 kHz). This high frequency sample clock is transmitted along with the data to facilitate accurate signal reconstruction at the receiving end. Furthermore each channel of 64 Fs DSD audio requires a transmission bandwidth of 2.8224 Mbit/s.

Several known audio networking systems make use of Ethernet to transmit high bandwidth audio-data between a network of audio processing devices. For example the "Magic" system proprietary to Gibson makes use of the Ethernet Media Access Control MAC layer (i.e. physical layer and data link layer) to transmit audio data at a fixed audio sampling frequency of 48 kHz using one Ethernet frame per sample period. The CobraNet audio networking system proprietary to Peak Audio also uses the Ethernet MAC layer to transmit uncompressed digital audio data between networked devices. The CobraNet system uses a 48 kHz sampling rate and allows for transmission of 20-bit and 24-bit audio data. However, none of these known systems provides an interconnection suitable for linking DSD audio devices. This is because Ethernet frame timing is completely unsuitable for transmitting a 2.8224 MHz DSD sample clock.

Copending application Ser. Nos. 10/620,671 (now U.S. Pat. No. 7,084,927, issued Aug. 1, 2006) and 10/803,621 (now U.S. Pat. No. 7,499,500, issued Mar. 3, 2009) relate to techniques for carrying such bitstreams over the physical layer of an Ethernet-type interface. The systems described in these two copending applications aim to provide circuit-switched interconnections between large-scale multi-track production equipment for DSD audio such as multi-channel ADC/DACs, DSD mixers and multi-channel DSD recorders.

So, in the systems of the two copending applications techniques are provided which are based on the direct use of the Ethernet physical layer interface. This can be shown to provide effective and low-latency circuit-switched links at audio data rates of the order of 64 Fs, such systems also being useful for the transmission of other streamed digital signals such as PCM audio signals. Auxiliary data channels can also be handled by the same means. However, as this is achieved by deliberately avoiding the use of higher levels of the Ethernet protocol, there is no convenient way of providing packet-switched auxiliary data routing within such a system.

SUMMARY OF THE INVENTION

This invention provides a data communication system for communicating one or more payload streamed data signals and an auxiliary data signal, the auxiliary data signal being organised as one or more data packets according to a data packet protocol, each packet having a respective packet destination address, the system comprising:

(i) at least two data handling nodes, a transmitting one of said data handling nodes being arranged to transmit data to a receiving one of said data handling nodes across a data connection link;

(ii) a transmission data formatter associated with said transmitting node for formatting said data packets of said auxiliary data signal into a streamed data signal format and for multiplexing said payload streamed data signals and said formatted auxiliary data signal into a bitstream for transmission;

(iii) a received data reformatter associated with said receiving node for demultiplexing said input streamed data signals and said formatted auxiliary data signal and for reformatting said auxiliary data signal into packets according to said data packet protocol.

This invention also provides a data router arranged to receive a data stream containing data packets, having associated destination indicators, via two or more input/output channels and to direct each packet to one or more input/output channels in dependence on said respective destination indicator, in which each input/output channel has an associated maximum data rate, said router comprising:

an Ethernet router; and a routing interface associated with each input/output channel; said routing interface and said Ethernet router being operable to communicate at a data rate higher than said maximum data rate associated with at least some of said individual input/output channels;

said routing interface being arranged to supply data packets received via said data stream associated with that input/output channel to said Ethernet router in said form of Ethernet data packets;

said routing interface being arranged to receive data packets to be output via said corresponding input/output channel from said Ethernet router and to provide said data packets as a data stream for output by that channel at a data rate no greater than said channel's maximum data rate; and said routing interface and said Ethernet router co-operating to selectively inhibit said transfer of data packets from said Ethernet router to said routing interface in order to avoid exceeding that channel's maximum data rate.

Further respective aspects and features of the invention are defined in the appended claims.

The invention addresses the above problems by embedding packetised auxiliary data into the streamed payload signal, and then on reception demultiplexing the packets into a format suitable for routing using a standard (e.g. Ethernet) router.

BRIEF DESCRIPTION OF THE DRAWINGS

The above and other objects, features and advantages of the invention will be apparent from the following detailed description of the illustrative embodiments which is to be read in connection with the accompanying drawings, in which:

FIG. 17 shows the structure of an audio data frame according to an embodiment of the present invention;

FIG. 18A shows the audio data frame format arranged as 384*4-byte data words;

FIG. 18B schematically illustrates a 24 DSD channel frame format in which each frame comprises 368 data words including 352 DSD samples for 24 channels plus 88 bytes of auxiliary data;

FIG. 19 shows the control data format arranged as 26*4-byte data words;

FIG. 20 schematically illustrates the structure of each of the three 16-bit frame format field sections corresponding to the frame format of FIG. 18B;

FIG. 21 schematically illustrates the three 4-nibble sections of the frame format ID containing a set of data entries to be processed at the receiver;

FIG. 22 schematically illustrates the format of the 32-bit data block corresponding to the 24 DSD channel frame format of FIG. 18B;

FIG. 23A schematically illustrates how six parity bits P0 to P5 are generated from 24 audio data bits and the two auxiliary data bits;

FIG. 23B schematically illustrates how a syndrome is calculated by performing XNOR operations on the received data elements;

FIG. 24 is a table showing a the composition of a stream of nibbles from the interleaver for the 24 DSD channel frame format of FIG. 18B;

FIGS. 27A to D schematically illustrate how three different indications S, Z and V are multiplexed using the M-bit of FIG. 26B;

FIG. 29 is a table 10 defining a frame type value index for a each of a number of different frame formats including frame types having different numbers of PCM samples per frame;

FIG. 30 is a table specifying the information derivable from the flag bits of the frame format of FIG. 18B;

FIG. 31 specifies how values for the two flag bits associated with the base clock are interpreted;

DESCRIPTION OF THE PREFERRED EMBODIMENTS

As described above, some known audio networking systems use the data link layer of Ethernet for transmission of uncompressed digital audio data at standard sampling frequencies of around 48 kHz. By way of contrast, embodiments of the present invention use the physical layer of Fast Ethernet to provide a point to point connection for transmission of high frequency (2.8224 MHz) digital audio data. The advantages of using the physical layer of Fast Ethernet for audio data transmission are that it offers a large bandwidth, has proven electromagnetic compatibility and has error detection functionality (cyclic redundancy checks) already in place. Use of the physical layer makes the logic easy to design and implement. There is no need to be concerned with hardware addressing and implementation of windowing protocols as would likely be required if the audio data were encoded using higher layer (e.g. MAC layer) technology. Furthermore at the physical layer level, Ethernet data transmission is robust and spectrum controlled so that electromagnetic emissions are low.

In order to explain the principles by which the present embodiments operate, the layered structure of network protocol architectures and the lower layers of the Ethernet architecture will be described in detail below.

Figure 1:
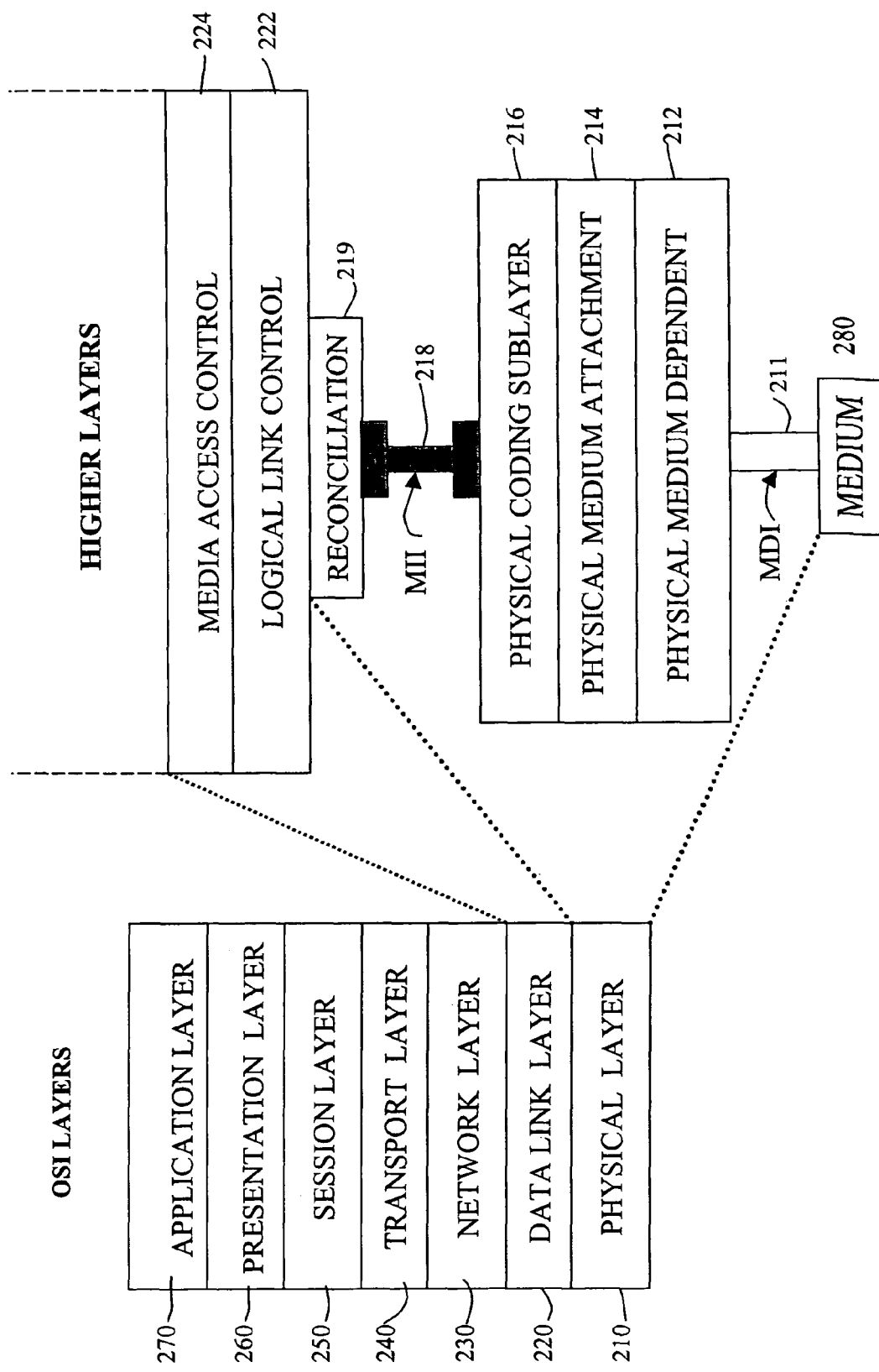
FIG. 1 shows the standard seven-layer Open Systems Interconnection (OSI) model for network protocol architectures and sub-layers of the Ethernet physical layer.

FIG. 1 shows the standard seven-layer Open Systems Interconnection (OSI) model for network protocol architectures. The model comprises an application layer 270, a presentation layer 260, a session layer 250, a transport layer 240, a network layer 230, a data link layer 220, and a physical layer 210.

The application layer 270 provides a user interface, usually in the form of an application program, to a range of distributed information services on the network. The services provided by this layer include file transfer, access and management, as well as general document and message interchange services such as electronic mail.

The presentation layer 260 is concerned with the representation of data during transfer between two communicating application processes. It selects an appropriate transfer syntax to be used during a transaction, so that the structure of the messages being exchanged between two application entities is maintained. The presentation layer 260 also manages data encryption and data compression.

The session layer 250 establishes sessions between communicating applications on communicating network nodes. It may optionally provide interaction management during two-way alternate i.e. half-duplex (rather than two-way simultaneous i.e. full-duplex) data exchange. Further optional features provided by this layer are synchronisation for lengthy network transactions and exception reporting.

The transport layer 240 acts as an interface between the higher application-oriented layers (session 250, presentation 260 and application 270 layers) and the underlying network-dependent protocol layers 210, 220, 230. The transport layer provides the session layer with a defined set of message transfer facilities. It offers a number of classes of services appropriate to different types of network, ranging from class 0 which provides basic connection establishment to class 4 which provides full error control and flow control.

The lowest three layers (network 230, data link 220 and physical layers 210) of the OSI model are all network dependent. The network layer 230 is responsible for establishing and clearing a connection between two transport layer protocol entities and it supports network routing and addressing. The data link layer 220 provides the network layer with a reliable information transfer facility and is responsible for such functions as error detection and message retransmission. Typically both a connectionless and a connection-oriented service is provided. The connectionless service simply discards received frames in which an error is detected whereas a connection-oriented service aims to provide an error-free information transfer facility. Finally, the physical layer 210 provides the data link layer 220 with a means of transmitting a serial bit stream between two pieces of equipment. It converts the data into the stream of electric or analogue pulses that will actually cross the transmission medium and it oversees the transmission of data.

Ethernet is a local area network (LAN) technology, which uses a simple or branching bus-like connection line. The transmission medium in an Ethernet network is formed from one or more continuous lines of cable linked by hubs. Network devices are connected to the cable and they compete for network access using a Carrier Sensing Multiple Access with Collision Detection (CSMA/CD) protocol. According to the CSMA/CD protocol, all client devices monitor the transmission medium and wait until the transmission line is available before transmitting any messages. If two network nodes try to transmit messages at the same time, a collision occurs. The client devices then stop, wait for a random time interval and attempt to transmit again.

Standard Ethernet systems known as 10BASE-T systems provide transmission speeds up to 10 Mega bits per second (Mbps) whereas so-called "Fast Ethernet" (or 100BASE-T) systems provide transmission speeds of up to 100 Mbps. Further higher performance systems are available such as so-called "Gigabit Ethernet". Fast Ethernet uses the same wiring systems, Media Access Control (MAC) method and frame methods as 10BASE-T Ethernet. The embodiments may use any of these systems.

Ethernet systems may use twisted pair cabling or an optical fibre connection. Twisted pair is standard copper wire that is typically used to connect computers to a telephone link. To reduce cross-talk or electromagnetic induction between pairs of wires, two or more insulated wires are twisted around each other. The twisting reduces the effective radiating area of the cable because electromagnetic effects of alternate twists tend to cancel at distances greater than the twist pitch. Each connection on twisted pair requires two wires. If the twisted pair is enclosed by a shield that functions as a ground it is known as shielded twisted pair (STP). Standard twisted pair cabling is known as unshielded twisted pair (UTP).

In Fast Ethernet systems the segment length for twisted pair cable segments is set to a maximum of 100 m to ensure that signal round-trip timing specifications are met. The problem with Fast Ethernet is how to achieve a data transfer rate of 100 Mbit/s over unshielded twisted-pair cable (UTP). In practice there are two standards that can be used to achieve this, one of which (100BASE-4T) uses voice-grade category 3 cable and another (100BASE-X) which uses either high-quality category 5 UTP cable, shielded twisted-pair cable (100BASE-TX) or optical fibre (100BASE-FX). In the 100BASE-X system each type of transmission medium requires a different Physical Medium Dependent (PMD) sub-layer. Category 5 UTP comprises 4 signal pairs, two pairs of which are typically utilised for Ethernet i.e. one signal pair for clock transmit and receive and one signal pair for data transmit and receive. This leaves two unused signal pairs.

The sub-layers of the Ethernet physical layer and data link layer are shown alongside the seven layer OSI model.

The data link layer 220 comprises the Media Access Control (MAC) layer 224 and the Logical Link Control (LLC) layer 222. The physical layer comprises a reconciliation sub-layer 219, a Media Independent Interface (MII) 218, a physical coding sub-layer 216, a physical medium attachment sub-layer 214, a physical medium dependent sub-layer 212 and a Medium Dependent Interface (MDI) 211.

The MAC sub-layer 224 performs the two main functions of data encapsulation and media access management. The data encapsulation functionality includes data framing, handling of source and destination addresses and detection of physical medium transmission errors. The medium access management functionality includes medium allocation (collision avoidance) and contention resolution (collision handling).

The MAC sub-layer 224 can operate either in half-duplex mode or in full duplex mode. In half-duplex mode, network nodes contend for use of the physical medium using multiple access (CSMA/CD) algorithms. The full duplex mode allows for simultaneous transmission and reception without interference. For the full duplex mode to be used three conditions must first be satisfied. Firstly, the physical medium must be capable of supporting simultaneous transmission and reception without interference. Secondly there must be exactly two nodes on the local area network so that the physical medium is treated as a full duplex point-to-point link between the nodes. The use of CSMA/CD algorithms is unnecessary in this full duplex case because there is no contention for use of a shared medium. The third condition is that both network nodes must be configured to use full duplex operation.

The Logical Link Control (LLC) layer 222 performs error-checking functions on data frames and manages links between communicating network nodes.

The Reconciliation 219 sublayer maps the signal set provided at the Media Independent Interface 218 to the Physical Coding Sublayer 216.

The Physical Coding Sub-layer (PCS) 216 provides a uniform interface to the Reconciliation sub-layer for all 100BASE-TX physical layer entity (PHY) implementations. The PCS 216 provides all services required by the MII including: encoding of MII 4-bit "data nibbles" to 5-bit code groups (and also decoding from 5-bit to data nibbles); generation of carrier sense and collision detect indications; serialisation of code-groups for transmission on the underlying PMA sub-layer 214 (and de-serialisation of code groups on reception from the PMA 214); and mapping of transmit, receive, carrier sense and collision detection between the MII 218 and the underlying PMA 214.

The Physical Medium Attachment (PMA) sub-layer 214 provides a medium-independent means for the PCS to support the use of a range of physical media. The 100BASE-TX PMA performs the functions of: mapping of transmit and receive code-bits between the underlying Physical Medium Dependent (PMD) sub-layer 212 and the PCS 216; and generating a control signal indicating the availability of the PMD 212 to a PCS 216. The PMA sub-layer 214 may optionally: generate indications of carrier errors from the underlying PMD sub-layer 212; sense receive channel failures; and transmit far-end fault indications.

The PMD sub-layer 212 is effectively a set of signalling standards that define 125 Mbit/s full duplex signalling systems, which accommodate multi-mode optical fibre (F), shielded twisted pair (STP) and unshielded twisted pair (UTP) wiring.

The purpose of the Media Independent Interface (MII) 218 is to provide a simple interconnection between the MAC sub-layers 222, 224 and the physical layer entities (PHYs) for data transfer at 10 Mbit/s and 100 Mbit/s. The functionality is identical at both data rates, as are the signal timing relationships. The only difference between 10 Mbit/s and 100 Mbit/s operation is the nominal clock frequency. The MII 218 is used to provide media independence for various forms of unshielded twisted-pair wiring, shielded twisted-pair wiring, fibre optic cabling and potentially other media, so that identical MACs may be used with any of these media. The MII 218 maximises media independence by cleanly separating the Data Link Layer 220 and the Physical Layer 210 of the OSI seven-layer reference model. The data and delimiters of the MII 218 are synchronous to clock references and the MII uses Low Voltage Transistor-Transistor Logic (LVTTL) signal levels compatible with common integrated circuit processes. The MII 218 provides independent 4-bit wide data-transmit and data-receive paths and full duplex operation. Each direction of data transfer is serviced with 7 signals: a 4-bit data bundle, a 1-bit delimiter signal, a 1-bit error signal and a 1-bit clock signal.

Figure 2:
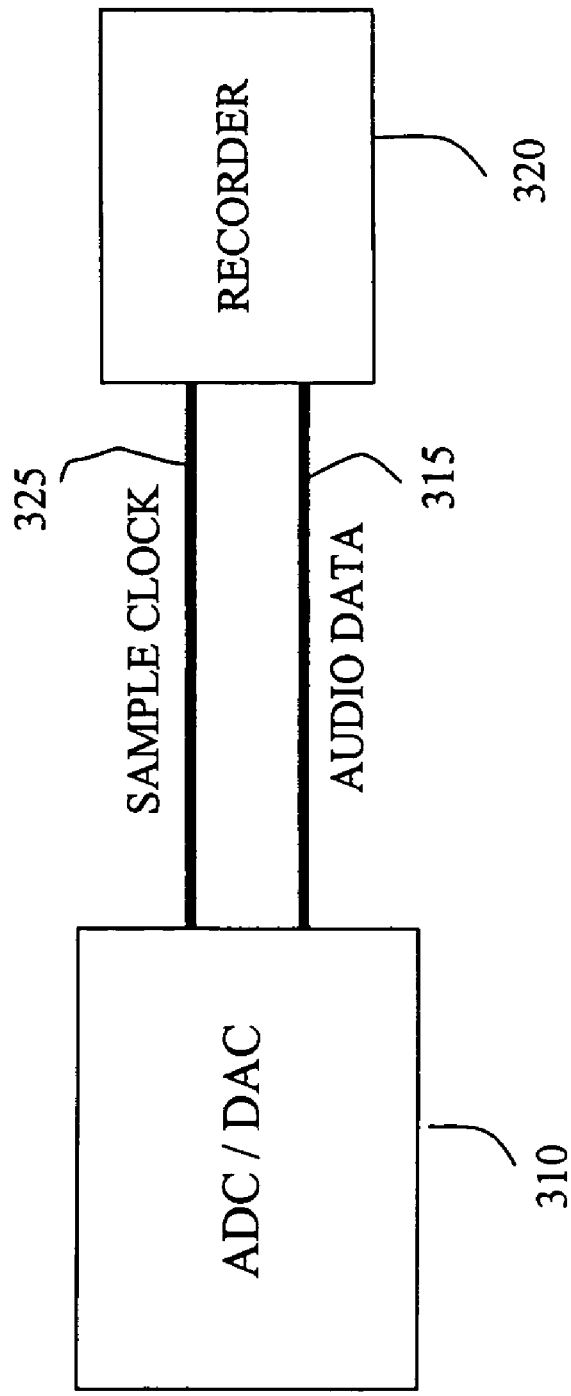
FIG. 2 illustrates a known system for signal transfer in DSD systems.

FIG. 2 illustrates a known system for signal transfer in Direct Stream Digital systems. The apparatus 300 comprises an analogue-to-digital/digital-to-analogue (ADC/DAC) converter 310 connected to a DSD multi-channel recorder 320. The connection comprises two separate cables: a first cable 315 is an optical fibre carrying 8 channels (about 22.6 Mbit/s) of DSD audio data and a second cable 325 carries the high frequency sample clock. It is standard studio practice to use separate cables for the audio data and the sample clock.

Figure 3:
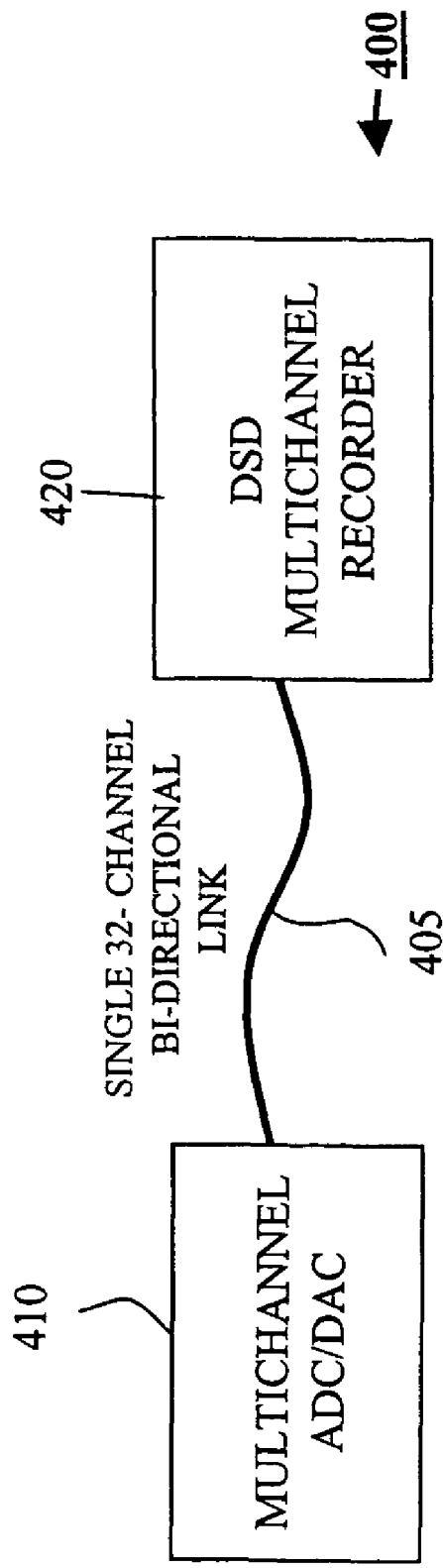
FIG. 3 schematically illustrates a DSD interconnection according to an embodiment of the present invention.

FIG. 3 schematically illustrates a DSD interconnection according to an embodiment of the present invention. In this arrangement 400, a single cable 405 is used to connect a multi-channel ACD/DAC 410 to a DSD multi-channel recorder 420. The cable 405 is a category 5 unshielded twisted pair cable. This cable has four signal pairs, two pairs of which are used to transmit and receive audio data, encoded using Ethernet physical layer technology and the remaining two pairs of which are used to convey a DSD sample clock in both directions across the link (see Table 1 below). The clock signal and the audio data signal are conditioned to decrease the likelihood of interference between the two signals degrading the quality of the clock signal. The clock signal is used to synchronise a phase locked loop (PLL) in the receiving device, which in turn may be used as a sample clock for ADCs and DACs. Any jitter on the sample clock is undesirable since it will manifest itself as distortion on the reproduced analogue audio output. The audio signal is intrinsically digital and consequently more robust to degradation than the clock signal. A packet data transmission system such as Ethernet is capable of carrying the DSD audio data. In this particular embodiment, the physical layer of Fast Ethernet (100BASE-TX) is used to provide a channel bit-rate of 100 Mbit/s which accommodates audio data from 32 DSD channels on a single link. In an alternative embodiment the 100 Mbit/s link is used to support 24 DSD channels on a single link.

Ethernet is an asynchronous data link and is thus inherently unsuitable for transmission of the high-integrity, 64 $F_s$ audio clock signal. For this reason the audio sample clock is transmitted on separate signal pairs of the category 5 UTP cable.

The single cable connection in FIG. 3 is fundamentally a point to point link directly connecting the two audio devices. It uses a special "crossover" category 5 cable that is wired to reverse the input/output connections. In this case a custom made crossover cable is required because conventional crossover cables such as those used for office networking do not reverse the two spare signal pair connections used in this embodiment for transmission of the audio sample clock.

Figure 4:
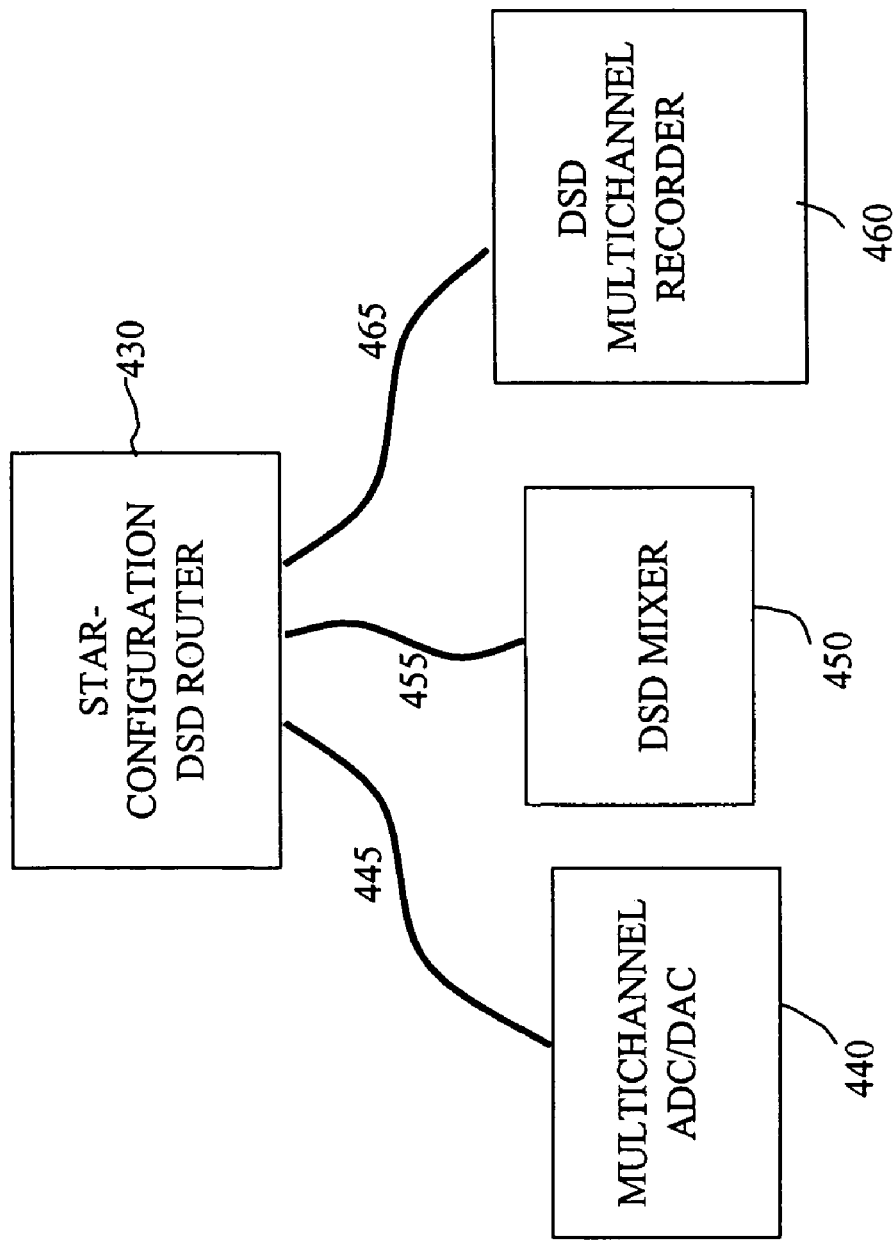
FIG. 4 illustrates a star-configuration interconnection that can be formed between several individual items of DSD equipment.

In alternative embodiments of the invention, such as that illustrated in FIG. 4, more complex interconnections can be formed between several individual items of DSD equipment. The apparatus illustrated in FIG. 4 comprises a star-configuration DSD router 430, a multi-channel ADC/DAC 440, a DSD mixer 450 and a DSD multi-channel recorder 460. Three point-to-point links 445, 455 and 465 are connected together via the central DSD router 430. Unlike the connection of FIG. 3, standard category 5 cable can be used for each of the three connections in this star configuration. This is because the port connections on the router are internally reversed such that signal outputs of one device connect to signal inputs of another device.

The router 430 comprises a number of signal transceivers, each transceiver comprising a data clock transmitter (described below with reference to FIG. 6) and a data and clock receiver (described below with reference to FIG. 7). Switching and routing functions are carried out by a crosspoint switch (not shown) acting on the recovered clock and streamed audio data. In other words, signals are not transferred across the router in packetised form.

The cable 405 linking the transmitter device to the receiver device in FIG. 3 is terminated with 8-terminal RJ45 plugs and both transmitter and receiver devices are fitted with RJ45 sockets. The table below specifies the setting of the RJ45 socket terminal connections for the audio devices of FIG. 3 and for the star-configuration router devices of FIG. 4.

TABLE 1

| Pin number | Function (audio device) | Function (star-configuration router) |
|---|---|---|
| 1 | Data transmit + | Data receive + |
| 2 | Data transmit − | Data receive − |
| 3 | Data receive − | Data transmit − |
| 4 | Clock transmit + | Clock receive + |
| 5 | Clock transmit − | Clock receive − |
| 6 | Data receive + | Data transmit + |
| 7 | Clock receive − | Clock transmit − |
| 8 | Clock receive + | Clock transmit + |

Figure 5:
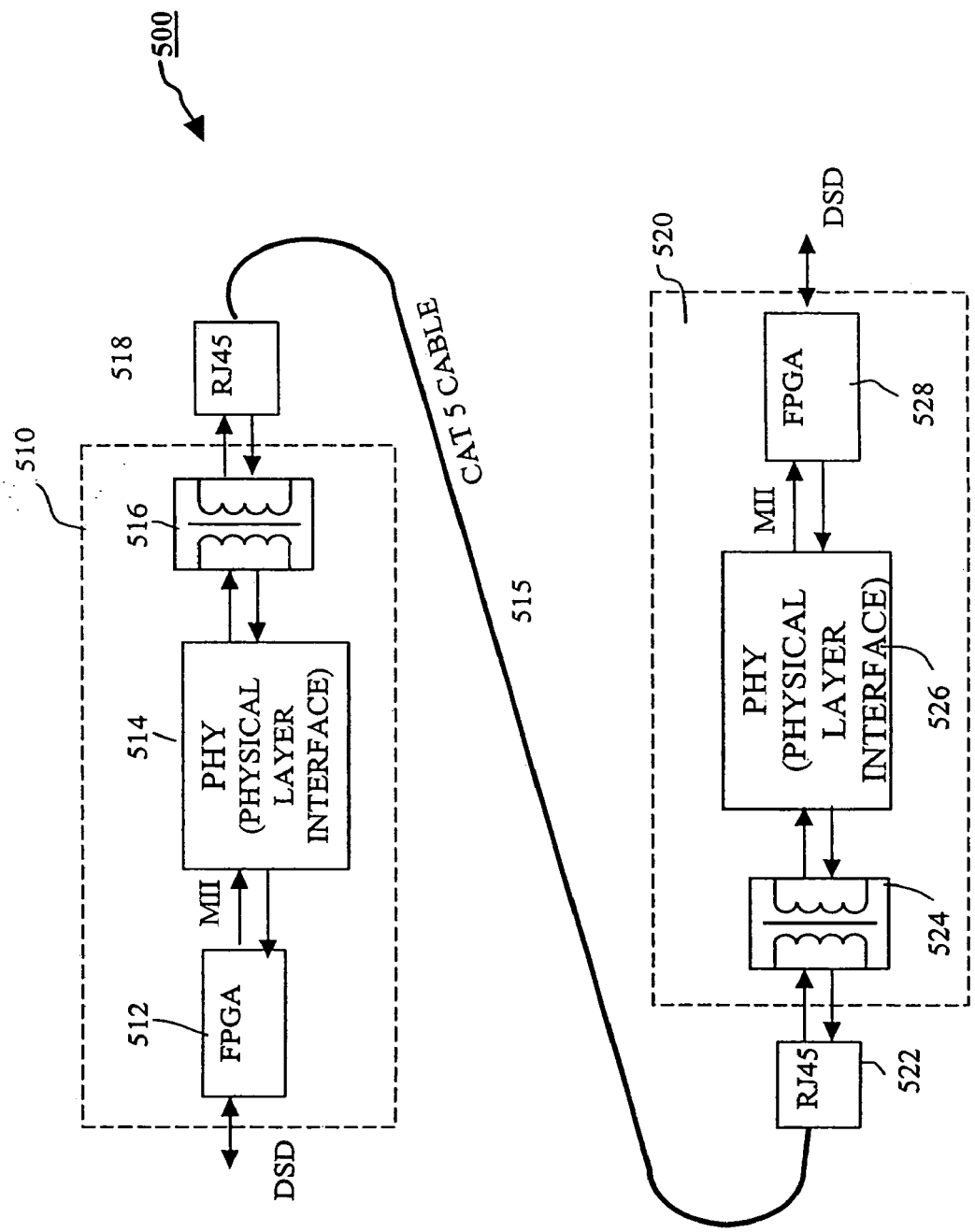
FIG. 5 schematically illustrates an audio data transmission system according to an embodiment of the present invention.

FIG. 5 schematically illustrates an audio data transmission system according to an embodiment of the present invention. The apparatus 500 comprises a first audio processing device 510 and a second audio processing device 520 linked by a category 5 unshielded twisted pair cable 515. Each audio processing device comprises a Field Programmable Gate Array (FPGA) 512, a physical layer interface (PHY) 514, a transformer 516 and an RJ45 8-pin connector 518. The FPGA 512 provides a Multichannel Audio Connection for DSD (MAC-DSD).

1-bit 64 Fs direct stream digital data is supplied from the audio device to the FPGA 512. During a transmission operation the FPGA 512 performs audio data buffering and framing operations whereas during data reception the FPGA extracts data from the framed structure and converts it back to a DSD stream. The FPGA performs transmission and reception concurrently, implementing a full-duplex audio connection. The format of the data frames will be described in detail below with reference to FIGS. 15 and 16. The PHY device 514 performs physical layer coding of the framed audio data, implements spectrum control processing and has line drivers that amplify the current and hence the power of the signal to increase its robustness during transmission. The PHY device 514 effectively implements the Physical Coding Sublayer (PCS), Physical Medium Attachment (PMA) and Physical Medium Dependent (PMD) sub-layers of the physical layer 210. In this embodiment the PHY device 514 is an Intel™ LXT972a component and it operates in full duplex mode with no auto-negotiation and with data scrambling on. The transformer 516 outputs the data for transmission on the category 5 cable 515. On reception the transformer 516 receives the signal prior to physical layer processing. The interface between the FPGA 512 and the PHY device 514 is a Media Independent Interface (MII). Thus the FPGA replaces the network address handling Media Access Controller (MAC) of the conventional Ethernet system. Multiple sample rates are supported and the system is able to accommodate potential developments towards higher DSD sample rates. Any change to the audio sample rate affects the way audio data streams are packed into data frames and this functionality is determined by circuitry in the FGPA 512. Provided that the physical layer link has sufficient bandwidth changes in the audio sample rate have no effect on the PHY device 514.

Figure 6:
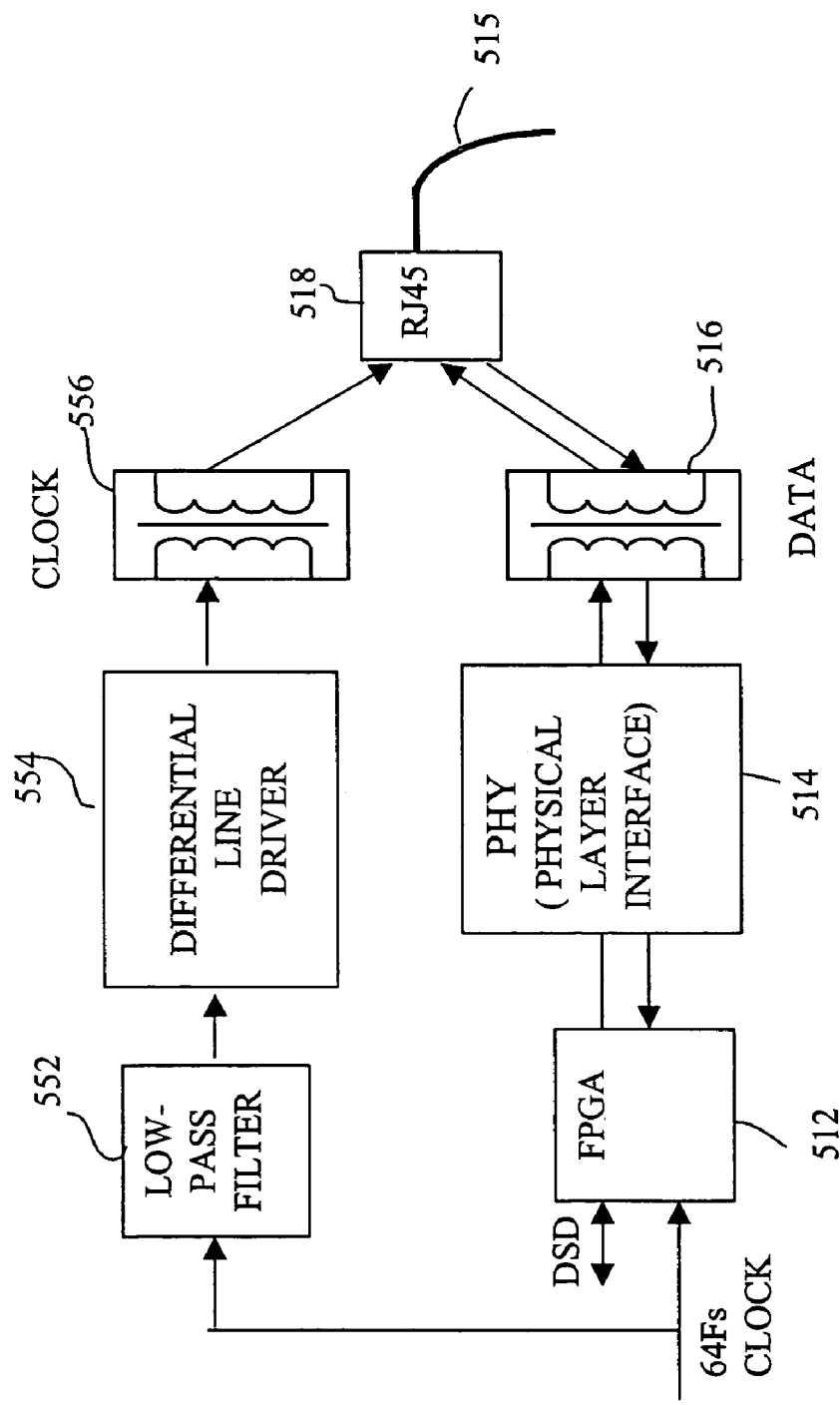
FIG. 6 schematically illustrates how the 64 $F_s$ audio sample clock signal is transmitted in parallel with the DSD audio data along different signal pairs of the category 5 cable.

FIG. 6 schematically illustrates how the 64 $F_s$ audio sample clock signal is transmitted in parallel with the DSD audio data along different signal pairs of the category 5 cable. As in FIG. 5, the FPGA 512, the PHY device 514 and the transformer 516 perform the audio data signal processing prior to its transmission on two signal pairs of the Category 5 UTP cable 515. The 64 $F_s$ audio sample clock is supplied as input both to the FPGA, which performs framing and buffering, and to a low pass filter 552. The low-pass filter serves to reduce electro-magnetic emissions during transmission of the clock signal. The output of the low-pass filter 552 is supplied as input to a differential line driver 554 and is subsequently fed through a 10BASE-T type Ethernet transformer 556. The clock signal is fed via the RJ45 connector 518 onto a signal pair on the category 5 UTP cable 515 where it is transmitted in parallel with the audio data. Transmission of the audio sample clock signal is important since it enables the FPGA of the receiving device to resynchronise the received audio data and thus to reconstitute the DSD bitstreams. The category 5 UTP cable used in this embodiment of the invention has a characteristic impedance of 100 Ohms. Alternative embodiments may use screened twisted pair cable which gives enhanced electromagnetic compatibility (EMC) performance. Further alternative cable types that may be used include category 5e cable (for data rates of up to 250 Mbit/s), category 6 cable (suitable for Gigabit Ethernet or category 7 cable which allows even higher data transmission rates.

The FPGA is only one solution to achieve the functionality required at the transmitter and receiver. Software-controlled general purpose microprocessors may of course be used, in which case the software could be provided by a storage medium (e.g. a read-only memory, flash memory, magnetic disk or optical disk).

Figure 7:
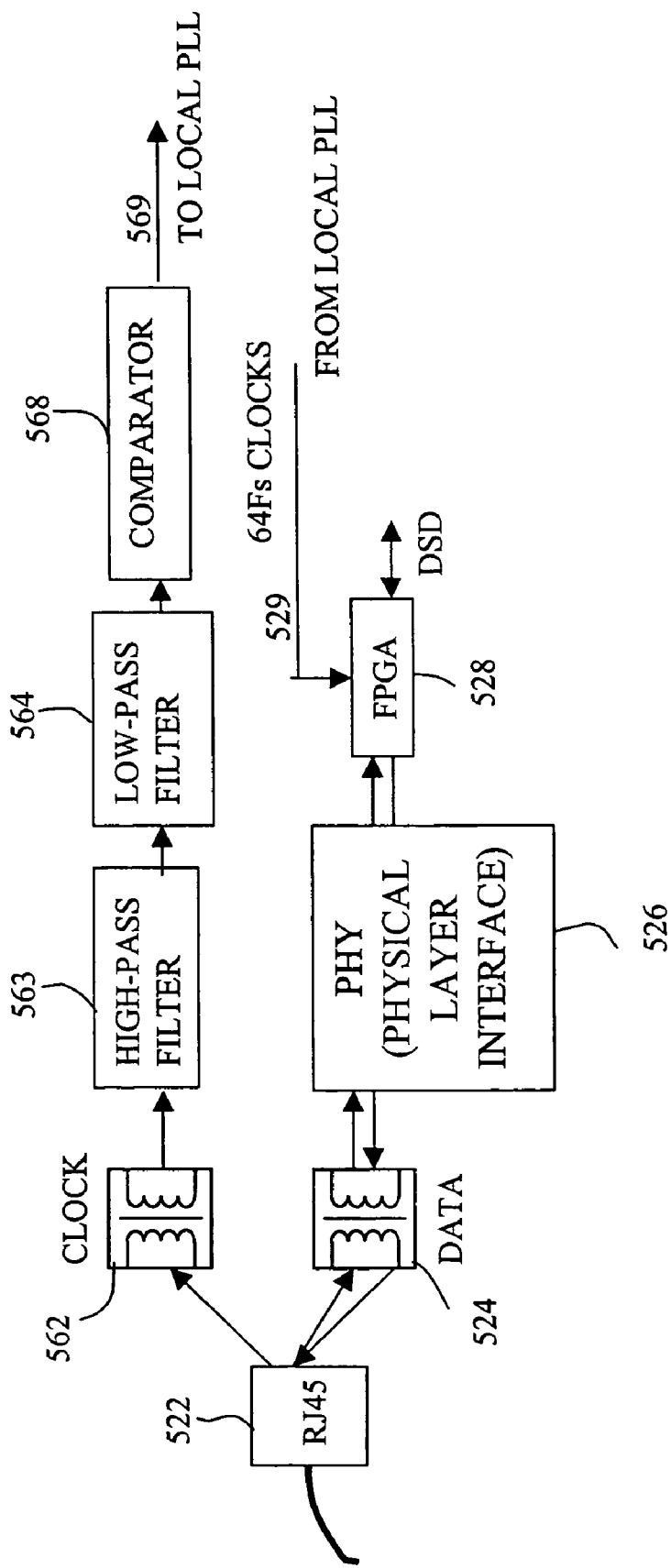
FIG. 7 schematically illustrates reception of the high frequency audio sample clock in parallel with reception of the DSD audio data signal.

FIG. 7 schematically illustrates reception of the high frequency audio sample clock in parallel with reception of the DSD audio data signal. The parallel signals are received from the cable 515 at the RJ45 connector 522 of the receiving device. The DSD audio signal is received by a transformer 524 and is then supplied to a physical layer interface 526 followed by an FPGA 528 which unframes the data and produces a DSD bit stream. The DSD audio stream is output from the FGPA according to a 64 Fs clock signal 529 derived from the local phase locked loop of the receiving device.

The received audio clock signal is supplied to a transformer 562 on arrival at the receiving device. The output of the transformer is supplied to a high pass filter 563 and then to a low pass filter 564, which is of the same type as the low pass filter 552 in the transmitting device. The low pass filter 564 in the receiver serves to remove any high frequency interference in the received signal, derived either from the audio data signal, which it travelled adjacent to along the cable 515, or from external sources. The output from the low-pass filter is supplied to a comparator 568 where it is converted to a logic signal. The logic signal from the comparator is used to drive a local phase locked loop (PLL) circuit. A phase locked loop (PLL) is an electronic circuit that controls an oscillator so that it maintains a constant phase angle relative to a reference signal. In this case the received high frequency clock signal is the reference signal. The PLL circuit generates a local audio reference clock which is used for reproduction of the DSD audio data.

Figure 8:
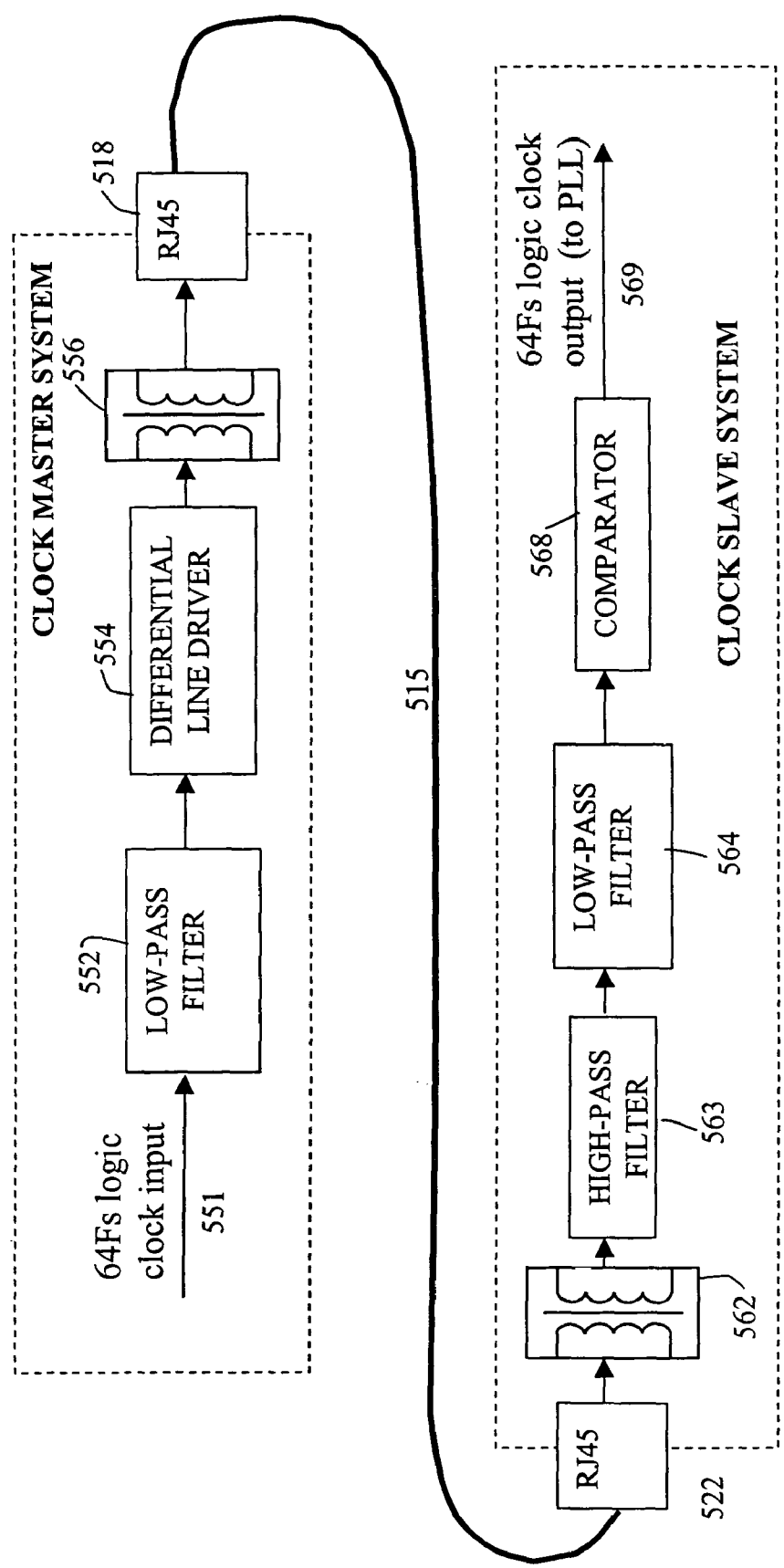
FIG. 8 schematically illustrates the signal path of the 64 Fs DSD sample clock signal.

FIG. 8 schematically illustrates the signal path of the 64 Fs DSD sample clock signal. As explained above, the DSD sample clock is transmitted in both directions via dedicated differential signal pairs in the category 5 UTP interconnection cable 515. The sequence of processing operations performed on the high frequency (64 $F_s$) clock signal will now be described with reference to FIG. 8. Special analogue conditioning of the sample clock signal is performed to facilitate its transmission on a signal pair of the UTP cable adjacent to the asynchronous data signal. The analogue conditioning reduces the severity of electromagnetic interference effects from the asynchronous data signal (or from external sources) which compromise the integrity of the high frequency sample clock signal. As schematically illustrated in FIG. 8, the sample clock processing that occurs in the clock master system involves the low pass filter 552, the differential line driver 554 and the transformer 556. The sample clock processing chain in the clock slave system involves the transformer 562, a high pass filter 563 and the comparator 568.

The input to the low pass filter 552 of the clock master is a 2.8224 MHz (64 Fs) logic signal 551. The frequency tolerance of this signal is in accordance with the Grade 2 specification defined by the standards document AES11-1997. Accordingly the sample clock has a long-term frequency stability of +/−10 parts per million (ppm), with an external synchronisation range of +/−50 ppm. The duty cycle of the sample clock in the range 40-60% and a Low Voltage Transistor-Transistor Logic (LVTTL) logic signal is used.

The 64 Fs logic clock signal 569 output by the comparator 568 of the clock slave system is also a logic signal of frequency 2.8224 MHz (64 Fs). This clock output signal 569 is not used to synchronise any digital audio components directly because the link 515 characteristics may well have introduced substantial jitter and asymmetry to the clock signal. Rather, the clock output signal is used exclusively to synchronise an edge-triggered phase locked loop (PLL) in the receiver system. The clock output signal 569 is carefully routed within the receiver to ensure that any noise and jitter on the signal does not couple into other high-quality clock signals. The PLL circuit (not shown) of the clock slave system is used to generate high quality audio clock signals for distribution throughout the receiving system.

The low pass filters 552, 564 in both the transmitting (clock master) system and receiving (clock slave) system are second-order low-pass Butterworth filters, each having a cut-off frequency fc=2.9 MHz.

The transmitter low-pass filter 552 attenuates high-frequency components of the clock signal that may otherwise cause interference with the adjacent audio data signals in the cable or cause excessive RF emissions from the cable. The receiver low-pass filter 564 on the other hand, removes high-frequency interference from the clock signal induced by either the adjacent high-frequency data signals or by external sources.

The differential line driver 554 located in the transmitter generates a symmetrical output signal of differential peak-peak voltage 1.5V-2.5V into 100 Ohms (the impedance of the category 5 UTP link).

The transformers 556, 562 in both transmitter and receiver are 10Base-T Ethernet transformers having a 1:1 turns ratio and line-side common mode chokes.

The high-pass filter 563 in the receiver is a first-order high pass filter having a cut-off frequency fc=500 Hz. This filter removes low-frequency interference from mains supply sources, and blocks DC offset. This filter is implemented with a simple resistance-capacitance (R-C) combination.

The comparator 568 in the receiver converts the filtered analogue clock signal from the low pass filter 564 into a logic signal. In order to avoid or reduce noise-induced multiple edges a 2% hysteresis is used.

Figure 9:
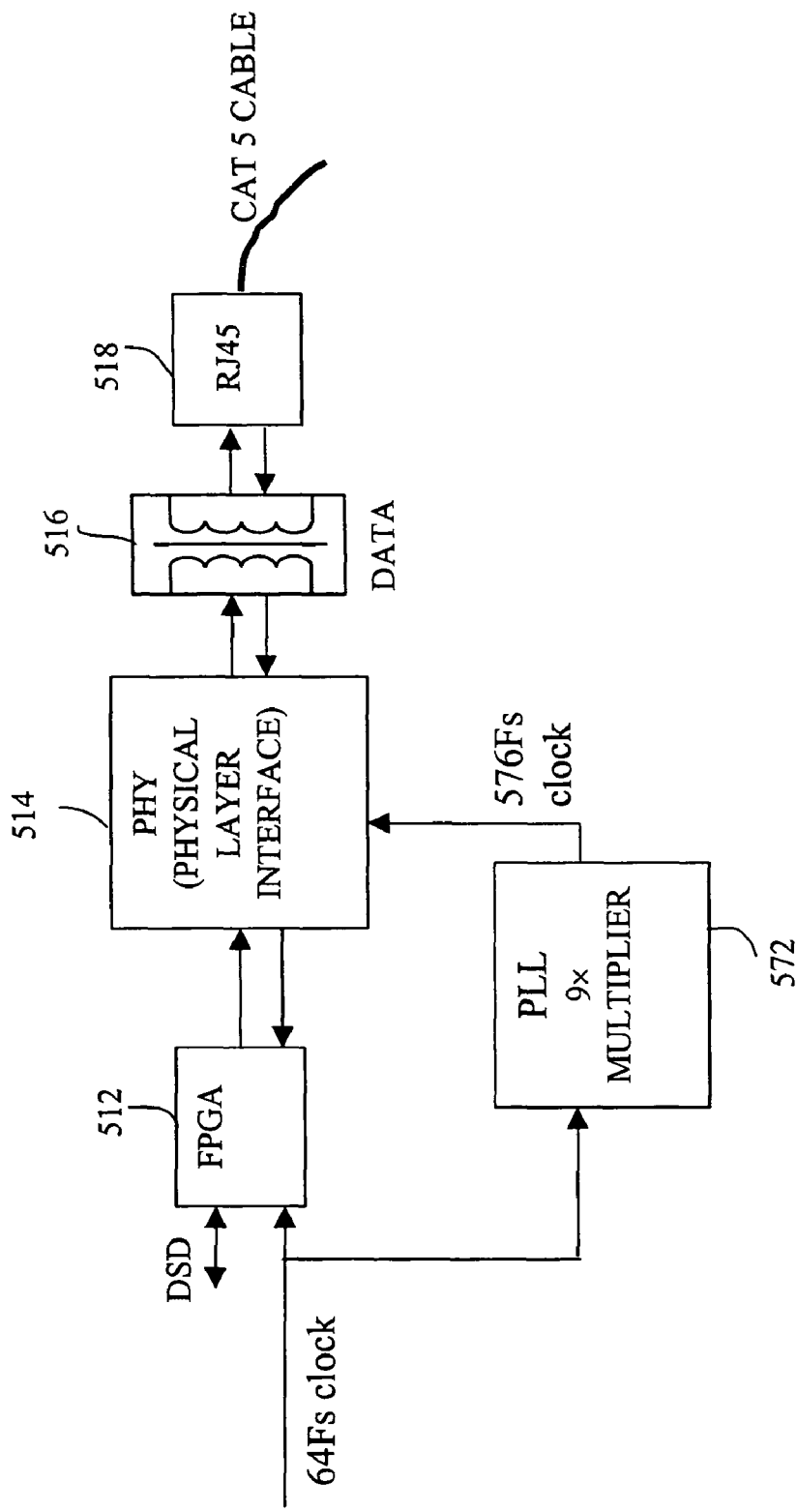
FIG. 9 depicts an embodiment of the invention in which the synchronisation of the physical layer device is adjusted such that it is an exact multiple of the audio sample clock frequency.

FIG. 9 shows an embodiment of the invention in which the synchronisation of the physical layer device is adjusted so it is an exact multiple (9*64 $F_s$) of the audio sample clock frequency 64 $F_s$. The Ethernet standard specifies a 25 MHz symbol rate for data transmission. It is conceivable that transmission of the 2.8224 MHz sample clock along the same category 5 UTP as a asynchronous 25 Mhz audio data signal could result in undesirable degradation of the audio clock. Synchronising the audio data transmission with the sample clock may help to reduce the degradation of the high-quality audio clock signal. The apparatus shown in FIG. 9 comprises a multiplier 572 which takes a 64 $F_s$ clock signal as input and up-converts it in frequency by a factor of 9 using a phase locked loop. The output from the ×9 multiplier 572 is input to the PHY device of the transmitter so that a 576 $F_s$ (25.4016 MHz) audio data signal is generated. Accordingly, this embodiment uses a 25.4016 MHz symbol rate for audio data transmission rather than the standard 25 MHz Ethernet symbol rate. As a consequence of the increased symbol rate the channel bit rate increases from 100 Mbit/s to 101.6064 Mbit/s.

Therefore, this embodiment of the invention can potentially reduce degradation of the audio clock signal but this is at the expense of removing compatibility with the 25 MHz symbol rate of standard Ethernet systems.

Figure 10:
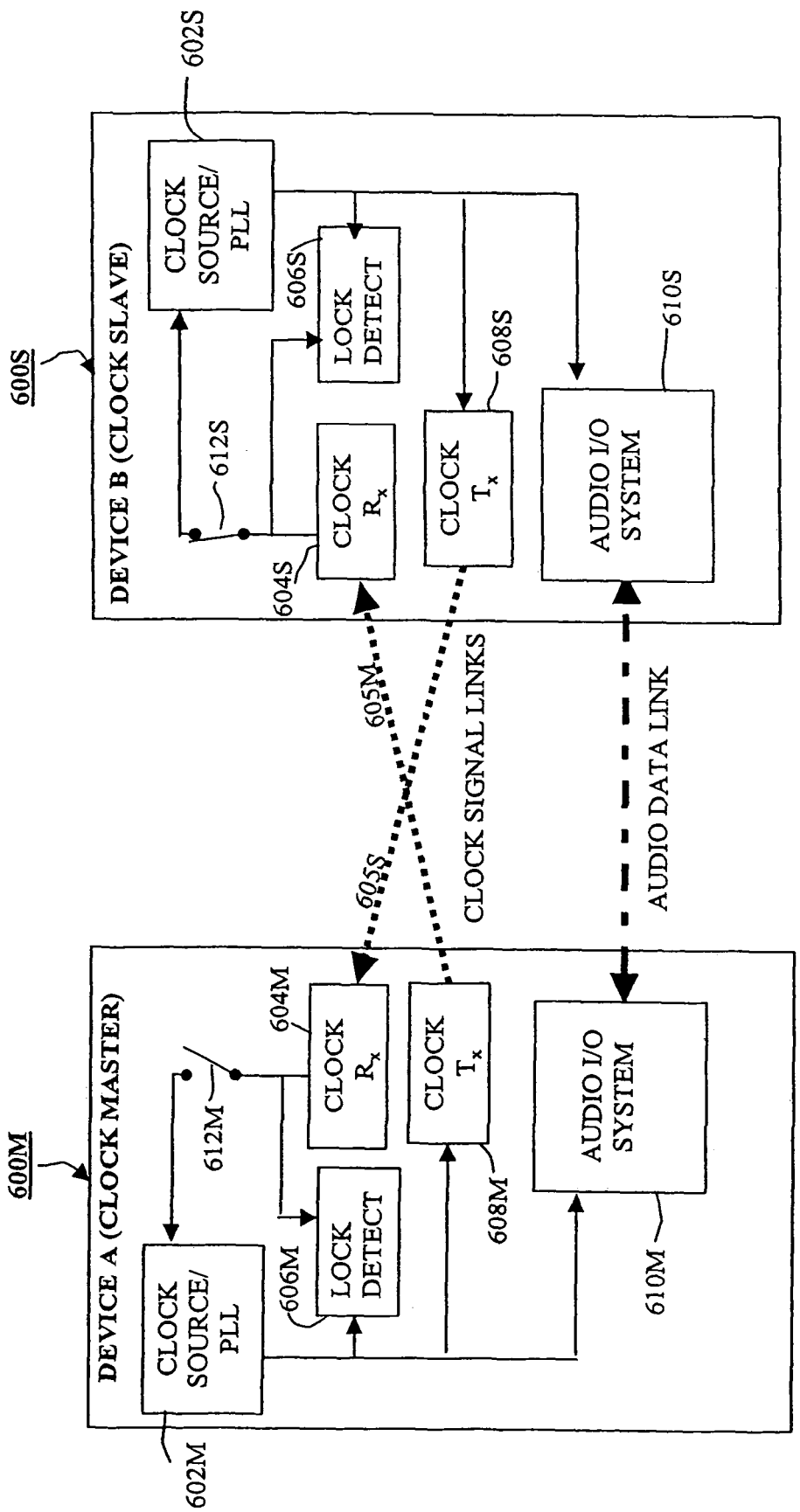
FIG. 10 schematically illustrates a point-to-point audio device link in which one device acts as a clock master whilst the other device acts as a clock slave.

FIG. 10 schematically illustrates a point-to-point audio link in which one device acts as a clock master 600M whilst the other device acts as a clock slave 600S. Each of the audio processing devices comprises a clock source PLL 602M/602S, a clock receiver (Rx) 604M/604S, a lock detect module 606M/606S, a clock transmitter (Tx) 608M/608S, an audio input/output (I/O) system 610M/610S and a switch 612M/612S. The suffix M denotes a component associated with the master device 600M whereas the suffix S indicates a component associated with the slave device 600S. DSD audio data passes along a UTP cable (not shown) which links the audio I/O system 610M of the master with that of the slave 610S.

The category 5 UTP cable provides independent connections such that under normal operating conditions clock signals are transferred in both directions between two audio devices. However in an active link one of the devices must be designated clock master 600M and the other device is thus designated the clock slave 600S. The clock master transmitter 608M sends an audio clock signal 605M to the clock receiver 604S of the clock slave. The master clock signal 605M is used by the phase locked loop 602S of the slave to produce a synchronisation signal that is supplied to the slave audio I/O system 610S. The audio clock signal 605S that is sent from the slave transmitter 608S to the clock receiver of the master 604M is not supplied to the phase locked loop 602M of the master because the switch 612M of the master is left in an open state. However the slave clock signal 605S is compared with the local master clock by the lock detect module 606M of the master device to detect synchronisation of the remote slave system.

Figure 11:
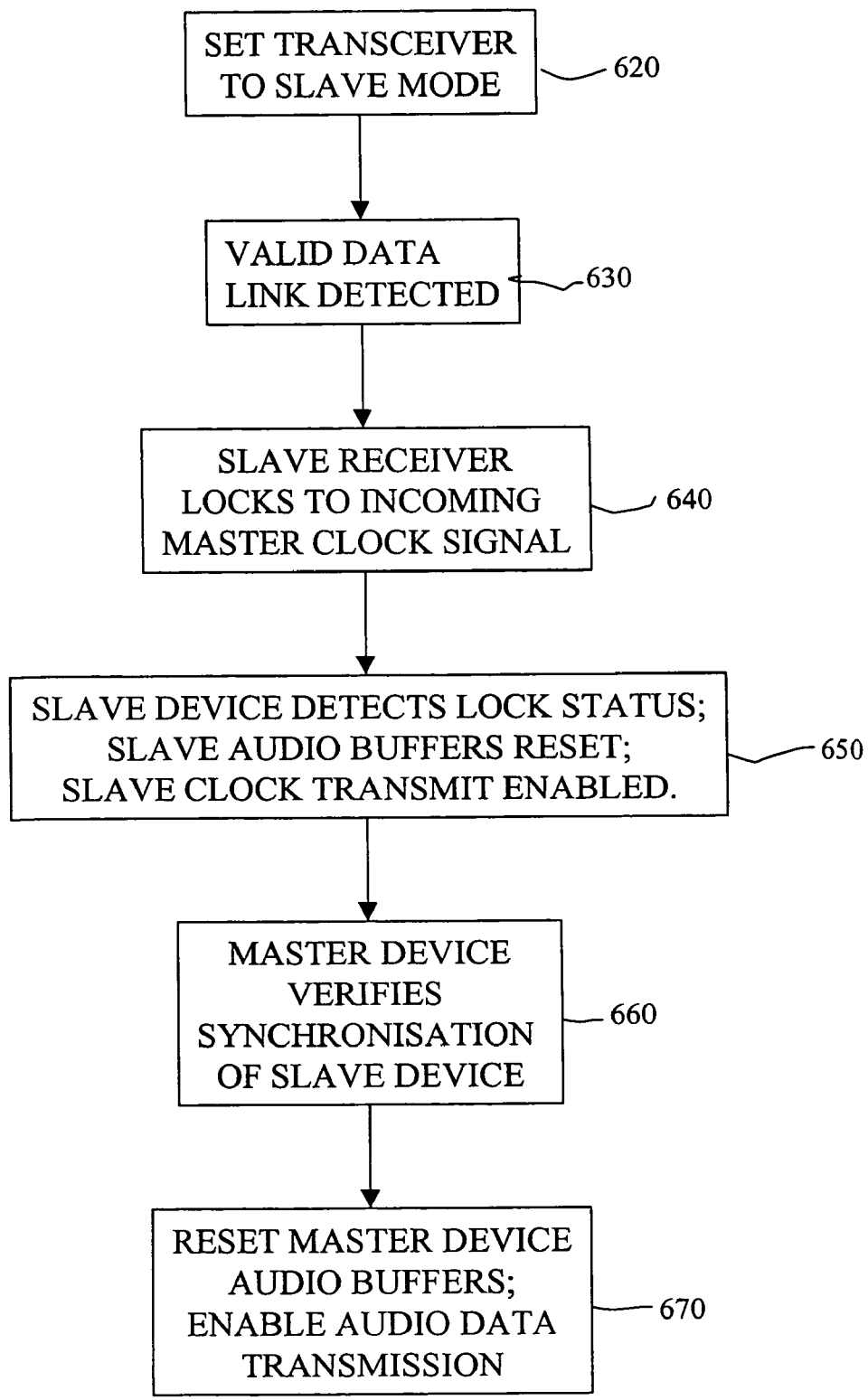
FIG. 11 is a flow chart which illustrates the sequence of events followed to establish a synchronised link between the master device and the slave device of FIG. 8.

FIG. 11 is a flow chart which illustrates the sequence of events followed to establish a synchronised link between the master device and the slave device of FIG. 10.

At stage 620 the transceiver of device B 600S is set to slave mode and the clock transmitter 608S is temporarily disabled (until the link is established and a lock state has been achieved). This acts as a safeguard against two slave devices attempting to synchronise each other with unpredictable consequences.

At stage 630 the UTP cable is used to physically connect the master device 600M to the slave device 600S thereby establishing the link. On connection of the cable both the master device 600M and the slave device 600S detect that the link is currently valid. The master device begins transmitting the clock signal 605M but the slave device's clock transmitter 608 is temporarily disabled.

At stage 640 the slave device's clock receiver 604S detects the incoming master clock signal 605M and feeds this to the local slave phase locked loop circuit 602S which locks to the incoming master clock signal.

At stage 650 the slave device 600S detects the lock condition by comparing its local system clock with the incoming master clock signal 605M via the lock detect module 606S.

Closing the switch 612S completes the circuit between the slave PLL 602S the slave clock receiver 604S and the slave lock detect module 606S and thus enables lock detection. Once the slave lock detect module 606S signals that lock with the master clock has been established, the slave clock transmitter 608S is switched from the disabled state to an enabled state and the slave device 600S audio buffers (located in the audio I/O system 610S) are reset.

At stage 660 the master device clock receiver 604M receives the echoed clock signal from the recently enabled slave clock transmitter 608S and checks the phase of this echoed signal to verify that the slave device has synchronised correctly with the master clock signal 605M. If synchronisation has not been correctly established then audio transmission is not enabled.

At stage 670, having established that the slave device is correctly synchronised the master device resets its audio buffers (located in the audio I/O system 610M) and enables audio data transmission, whereupon framed DSD audio data is sent along the UTP cable linking master and slave devices.

The flow chart of FIG. 11 describes the standard process of establishing synchronisation between the master device and the slave device. However, it may be the case that an attempt is made to establish a link between two audio devices, both of which have been set to slave mode. In this event, the clock transmitters of both devices are disabled at the point where the devices detect a valid data link and an indication is made to the operator that the link is not synchronised. The link conditions are indicated to the user via LED status indicators (not shown) located adjacent to the RJ45 cable connection ports. Table 2 below gives an LED status for each of a number of possible link conditions. In particular a red or yellow LED "on" status corresponds to a clock synchronisation failure of the type that would be encountered during an attempt to link two slave mode audio devices.

TABLE 2

| LED status | Condition |
| --- | --- |
| No LED on | No Ethernet PHY connection detected |
| Red (or yellow) LED on | Ethernet PHY connection detected, but clock synchronisation failed/not present/not locked. Audio transfer inhibited |
| Green LED on | Ethernet PHY connection detected, slave device has locked to master device clock, and link is active |
| Both LEDs on | (illegal indication) |

Figure 12:
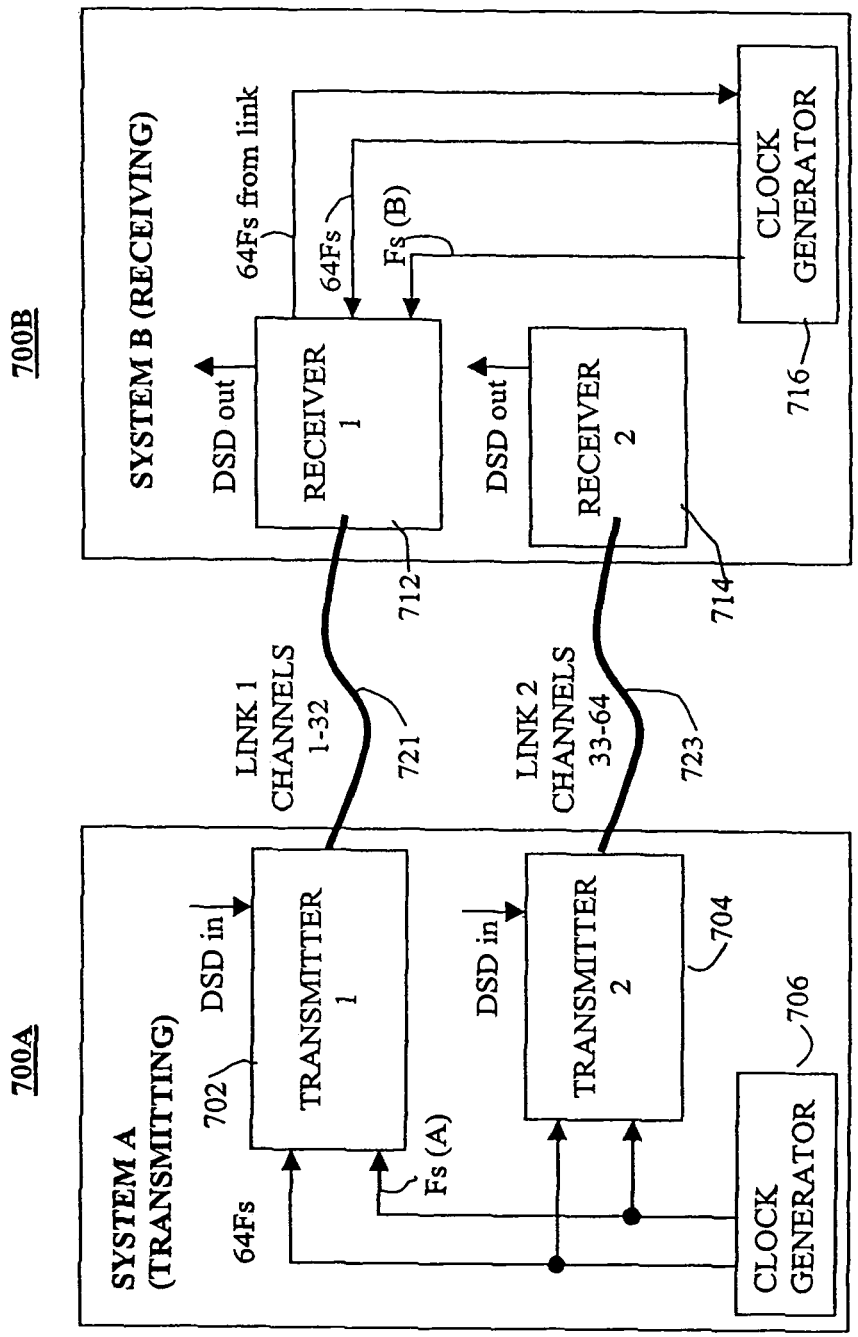
FIG. 12 schematically illustrates an apparatus in which multiple parallel links are used between two pieces of audio equipment in order to achieve a higher channel count than that achievable via a single point-to-point link.

FIG. 12 schematically illustrates an apparatus in which multiple parallel links are used between two pieces of audio equipment. Use of multiple links means a higher channel count is achieved than that achievable via a single point-to-point link. In this case two links are used to provide a total of 64 channels. A transmitter device 700A comprises a first transmitter 702, a second transmitter 704 and a clock generator 706. A receiver device 700B comprises a first receiver 712, a second receiver 714 and a clock generator 716. A first category 5 UTP cable 721 carries audio data channels 1 to 32 (or 1 to 24) and links the first transmitter 702 to the first receiver 712. A second category 5 UTP cable 723 carries audio data channels 33 to 64 (or 25 to 48) and links the second transmitter 704 to the second receiver 714.

When operating the apparatus of FIG. 12, it is necessary to ensure that the DSD audio data streams output by the first receiver 712 are sample-synchronised with the DSD audio data streams output by the second receiver 714 i.e. the samples from channels 1 to 32 (or 1 to 24) are synchronised with the samples from channels 33 to 64 (or 25 to 48). The transmit and receive latencies of the PHY devices in the transmitters 702, 704 and in the receivers 712, 714 mean that it is possible that the output of receivers 712, 714 could slip out of synchronisation by more than one DSD audio sample period ($3.543 \times 10^{-7}$ seconds). Manufacturer specifications for commonly used PHY devices indicate that combined transmit and receive latencies of the PHY devices could vary by up to $6 \times 10^{-8}$ seconds so that slippage of one DSD sample between receivers is conceivable. Any differences in the lengths of cables 721 and 723 will also affect synchronisation.

As shown in FIG. 12, the first and second transmitters 702, 704 of the transmitting audio system 700A use a common synchronisation reference clock signal $F_s(A)$ running at $F_s = 44.1$ kHz. Similarly the first and second receivers 712, 714 of the receiving audio system 700B use a common synchronisation reference clock $F_s(B)$ running at $F_s = 44.1$ kHz. These two 44.1 kHz synchronisation clock signals $F_s(A)$ and $F_s(B)$ have identical frequencies both having been derived from a 64 Fs master clock signal, but their phases, being arbitrary, are unlikely to match. The arbitrary phases are due to $F_s(A)$ and $F_s(B)$ having been derived from the common 64 Fs clock via independent clock dividers. The flow chart of FIG. 13 illustrates how the signals $F_s(A)$ and $F_s(B)$ are employed to ensure that the outputs of receivers 712 and 714 (which have derived their audio data from separate link cables 721 and 723 respectively) are kept synchronous.

Figure 13:
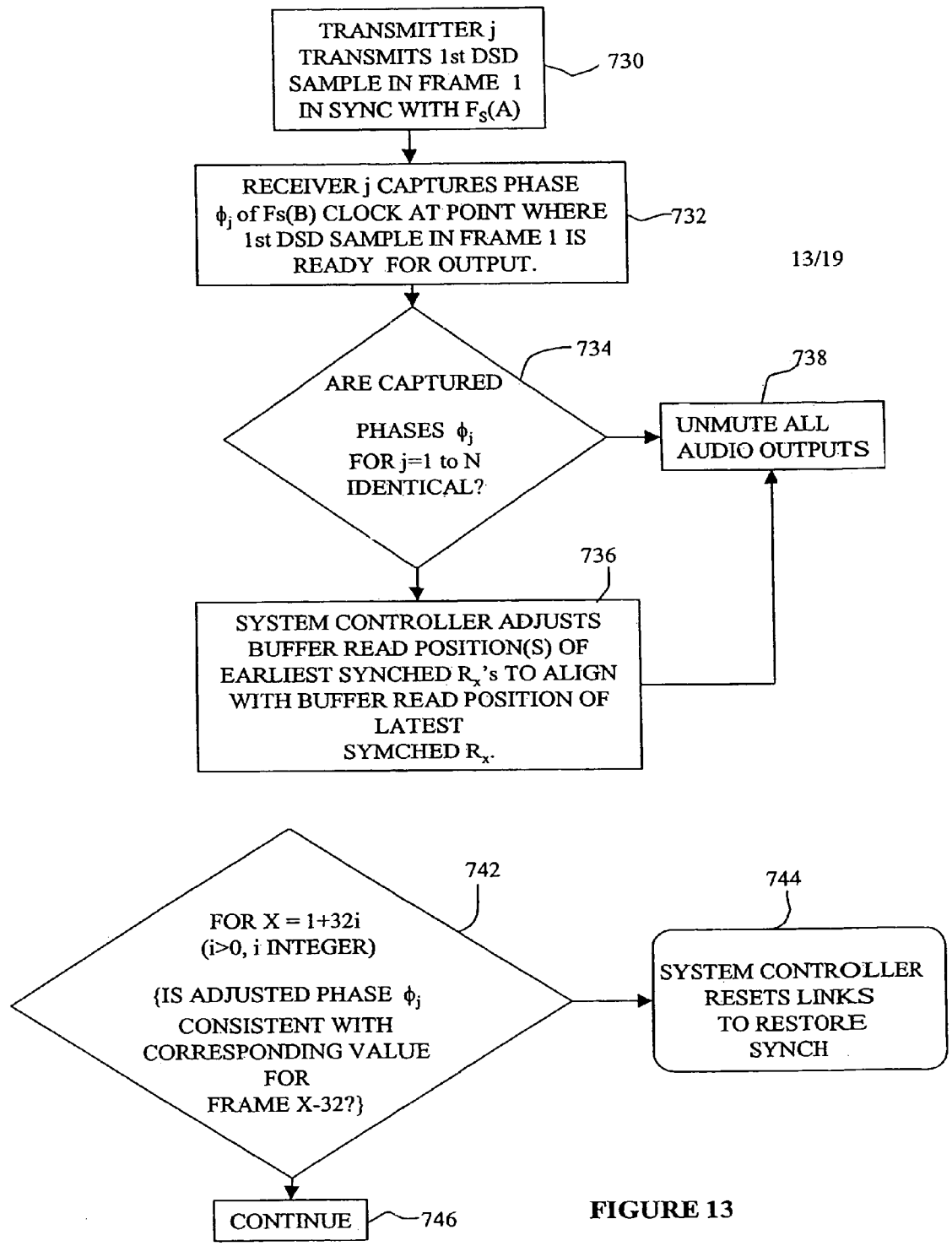
FIG. 13 is a flow chart illustrating how the local clock signals $F_s(A)$ and $F_s(B)$ are employed to ensure that the outputs of two receivers are kept synchronous.

At stage 730 of the flow chart of FIG. 13, a communication link between the transmitting system 700A and the receiving system 700B is established. Each of the two transmitters 702, 704 awaits receipt of a clock edge from the local 44.1 kHz clock signal $F_s(A)$ and then transmits the first audio frame. The data frame is packed such that the first DSD sample is input synchronously with the clock edge. The flow chart of FIG. 13 relates to an embodiment in which there are 32 channels of DSD audio. As shall be described in detail below with reference to FIG. 18A, for the 32-channel system each frame comprises 384 data words and words 13 to 382 each contain a 1-bit DSD sample value for each of 32 channels (370 sample values per channel are contained in each frame). The first transmitter transmits the first audio frame corresponding to channels 1 to 32 whilst the second transmitter transmits the first audio frame corresponding to channels 33 to 64. Since in this embodiment each frame contains 370 samples and there are 64 samples per Fs period, a coincident frame start ($1^{st}$ DSD sample value output) and Fs-period start (Fs(A) clock edge) will occur every 370×64 samples. However, 370 and 64 have a common factor of 2 so a frame-start and Fs period-start occur together every (370*64)/2 samples i.e. every 32 frames. Accordingly, the $1^{st}$ DSD sample value of the frame will be output synchronously with the local $F_s(A)$ clock edge for frames 1, 33, 65, 97 . . . and so on. These particular frames have a specific bit flag in a "frame type" field (see FIG. 16) of the data frame set to one.

At stage 732 of the flow chart both the first receiver 712 and the second receiver 714 capture a phase count value $\Phi_j$ (j=1 or 2 corresponding to first and second receivers respectively) marking the point in time at which the first DSD sample value in the first received frame is ready for output. Note that at system start-up the receiver audio outputs are muted and transmitter audio outputs are only enabled once synchronisation of the 64 Fs sample clocks has been verified by the master device. The time at which the receiver is ready to output the first DSD sample value will depend on the time taken for the slave device to achieve phase lock with the 64 Fs clock signal of the master device. It will also depend on the setting of the threshold level of a FIFO buffer of the particular transmitter.

Each receiver derives the phase count value $\Phi_j$ from a counter in the receiver which is clocked by the 64 $F_s$ local clock signal and reset by the 44.1 kHz signal $F_s(B)$.

At stage 734, a system controller (not shown) compares the phase count values, $\Phi_1$ and $\Phi_2$, for each of the receivers and determines if they are identical. If $\Phi_1=\Phi_2$ then the receivers are synchronised to within the same DSD sample period which is the desired condition. In this event the process proceeds to stage 738 where the audio outputs are unmuted. If however, $\Phi_1 \neq \Phi_2$ at stage 734 then the process proceeds to stage 736 where the system controller adjusts the buffer read positions of the receivers in an attempt to achieve synchronisation. The receiver that synchronised with the 64 Fs master clock earliest (and hence received DSD audio data first) has its buffer read position adjusted to match the buffer read position of the latest synchronised receiver (which started to receive DSD data later). This buffer read position adjustment is equivalent to modification of the phase count values $\Phi_j$ such that they are both equal to the higher of the two compared phase counts. Only when synchronisation has been achieved i.e. when the phase count values of the receivers are identical will the audio outputs be enabled.

The phase count values of the receivers are cross-checked for every flagged frame (first frame and every following $32^{nd}$ frame) to ensure that synchronisation of the receivers is maintained. Frames are transmitted every 131.25 μs so that flagged frames occur approximately every 4.2 ms (32×131.25 μs). Any receiver synchronisation problem should be detectable and correctable within this 4.2 ms period. Stages 742, 744, 746, of FIG. 13 show the check that is performed by the system controller for every flagged frame. At stage 742 the controller checks the modified phase count value for the current flagged frame and compares it with the final (possibly modified) recorded phase count value for the previous flagged data frame i.e. frame X-32. If the phase count values match then the system continues with audio data transmission at stage 746. If however the phase count values for the two flagged frames do not match, this indicates that the two receivers are not outputting the same audio sample value simultaneously and the process proceeds to stage 744 where the system controller initiates resetting of the data links in an attempt to restore proper synchronisation. When the data links are reset the receiver logic is put in a reset condition so that the process of stages 732 to 738 of FIG. 11 is carried out. In alternative embodiments the data links are reset by adjustment of the buffer read positions, but in this case a buffer overrun/underrun would trigger a total reset of the link. Sample synchronisation slippage could occur, for example, due to a cable glitch.

For the alternative 24 DSD channel embodiment, as shall be described in detail below with reference to FIG. 18B, each frame comprises 368 data words and words 15 to 366 contain 352 DSD samples for 24 channels plus 88 bytes of auxiliary data. Each 32-bit sample comprises 1-bit from each of the 24 DSD channels, 2 bits of auxiliary data and 6 check-bits. Bit 0 of each sample corresponds to the first logical audio channel whereas bit 23 corresponds to the $24^{th}$ logical audio channel. In this case the first transmitter transmits the first audio frame corresponding to channels 1 to 24 whilst the second transmitter transmits the first audio frame corresponding to channels 25 to 48. Since in this embodiment each frame contains 352 samples and there are 64 samples per Fs period, a coincident frame start ($1^{st}$ DSD sample value output) and Fs-period start (Fs(A) clock edge) will occur every 352×64 samples. However, 352 and 64 have a common factor of 32 so a frame-start and $F_s$ period-start occur together every (352*64)/32 samples i.e. every alternate frame. Accordingly, in the 24 DSD channel embodiment the $1^{st}$ DSD sample value of the frame will be output synchronously with the local $F_s(A)$ clock edge for frames 1, 3, 5, 7, 9 . . . and so on. It follows that every alternate frame will be a flagged frame and the phase count values of the receivers will be cross-checked every alternate frame.

Figure 14:
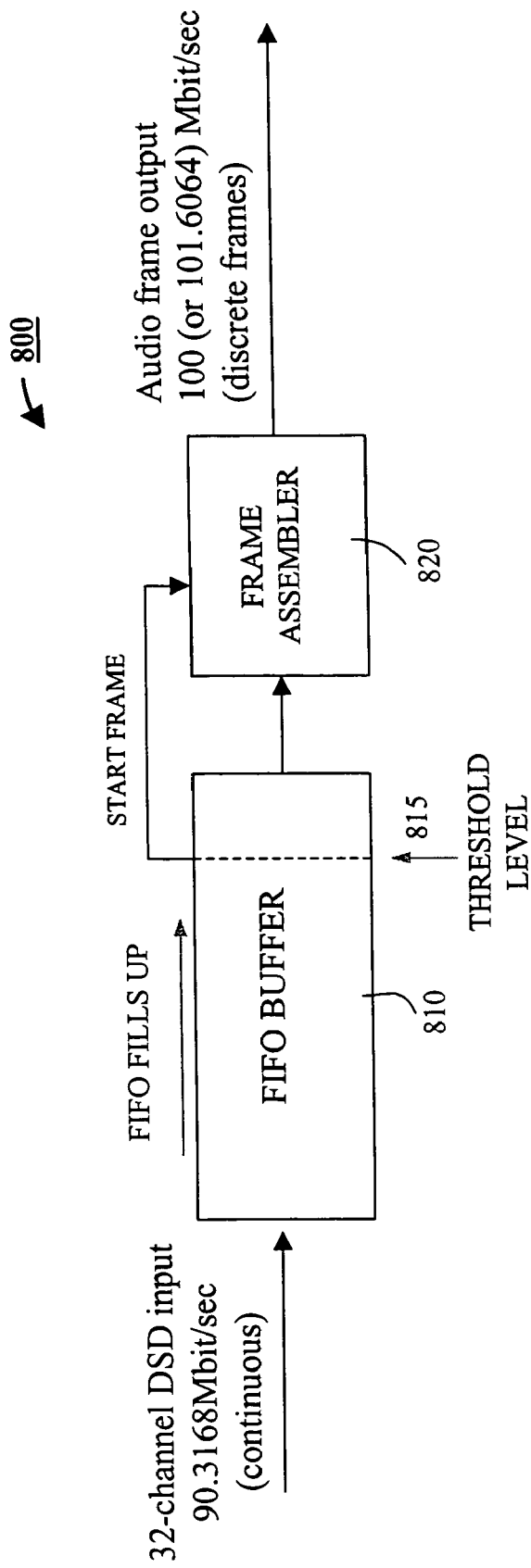
FIG. 14 schematically illustrates how audio data buffering is performed in the transmitter.

FIG. 14 schematically illustrates how audio data buffering is performed in the transmitter. The buffering apparatus 800 comprises a First In First Out (FIFO) buffer 810 in series connection with a frame assembler 820. In operation, 32 channels of Direct Stream Digital 1-bit sample data are continuously fed into the FIFO buffer at a rate of 64 Fs which corresponds to 90.3168 Mbit/s. When the occupation level of the FIFO buffer reaches a predetermined threshold level 815 a signal is generated by the system controller to initiate transmission of a new audio data frame. In response to this signal, the frame assembler assembles the frame preamble and headers, during which time incoming DSD samples continue to be buffered. As soon as the audio data payload assembly begins, the frame assembler starts to extract data from the FIFO. The rate at which data is extracted from the FIFO corresponds to the Ethernet transmission rate of 100 Mbit/s (or 101.6064 Mbit/s for embodiments in which the symbol rate is locked to 9*64 $F_s$). Since the FIFO is filling at a rate of 90.3168 Mbit/s and emptying at a rate of 100 Mbit/s the net buffer occupation level will steadily decrease during this period. The predetermined threshold level 815 is set in dependence upon the data input rate, the data output rate and the frame size (370 1-bit samples for 32 channels) so that the buffer occupation level will be almost, but not quite, zero at the end of each frame transmission i.e. data from the next frame for transmission is present in the buffer. The fact that the transmitter buffer 810 is not completely empty by the time the frame transmission ends breaks the rules of the MAC. Once the frame transmission is complete the FIFO occupation level will increase rapidly until the threshold level is reached whereupon the frame transmission cycle will repeat.

For a transmission system with an input data rate of 90.3168 Mbit/s, an output rate of 101.6064 Mbit/s and a (370 1-bit sample) (32 channel) frame capacity it can be shown that the minimum buffer size is 42 DSD samples and the corresponding minimum threshold level is 30 DSD samples. The audio latency introduce by this minimum size buffer is 14.9 μs (=42/64 Fs).

Figure 15:
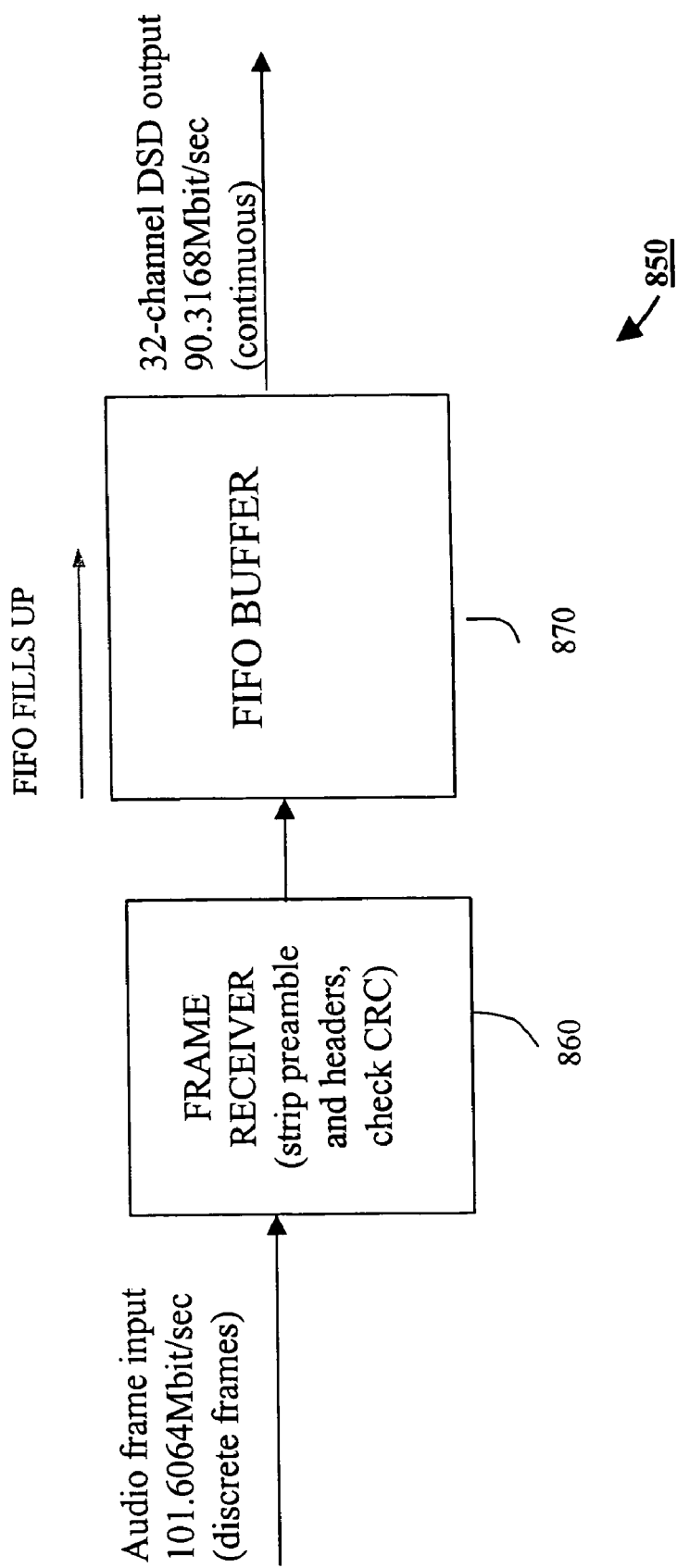
FIG. 15 schematically illustrates how audio data buffering is performed at the receiver.

FIG. 15 schematically illustrates how audio data buffering is performed at the receiver. The receiver buffering apparatus comprises a frame receiver 860 in series connection with a FIFO buffer 870. Audio data arrives (via the category 5 UTP cable) in framed format at the frame receiver 860 at a rate of 100 Mbit/s (or 101.6064 Mbit/s for the 9*64 $F_s$ symbol rate). The frame receiver strips off the preamble and headers of each data frame and optionally performs a cyclic redundancy check (CRC) to verify the integrity of the received data. Unframed audio data is passed directly from the frame receiver 860 to the FIFO buffer 870. Audio data extraction from the FIFO starts immediately since there is no threshold level set in the buffer at the receiver. This ensures that near-zero receiver latency is achieved. The audio data frames contain a cyclic redundancy check word (CRC). The CRC algorithm, check word location and scope are as defined in IEEEE802.3-2000 section 3.2.8. This 32-bit check word will generally detect any error within the frame. In known Ethernet systems a CRC is performed on each frame both at the transmitter and at the receiver. At the receiver complete frames are output only once the result of the CRC on that frame is determined. This results in substantial latency before the data is output at the receiver in known systems. According to the present technique, although the CRC check is still performed at the receiver, data is output from the buffer before the result of the CRC check is obtained. Error control is performed by decoding parity bits at a stage subsequent to data output at the receiver FIFO. In particular, error control is performed when data is extracted from the 32-bit data blocks prior to output as a 32 DSD channel audio stream. Unlike standard Ethernet systems, the MAC-DSD protocol according to the present technique does not support frame re-transmissions in case of an error, as this would require buffering of at least two 125 microsecond audio frames, increasing system latency to an unacceptable degree. Although the primary purpose of the IEEE802.3 CRC is to detect frame errors and thereby generate a retransmission request, the CRC is included for sake of compatibility. It will be appreciated that support for CRC-initiated MAC-DSD frame retransmission may be provided for applications requiring greater robustness at the expense of latency. Audio data is extracted from the FIFO at a continuous rate of 90.3168 Mbit/s and because the data output rate is less than the data input rate, the FIFO gradually fills up as the frame is received. Once a complete frame has been received there will be an inter-frame latency time before reception of audio data from the next frame and the FIFO buffer will continue to empty (although not completely) during this idle period.

In the event that the receiver buffer fills completely or empties completely an error signal will be sent to the system controller. In this event the system controller will mute the audio outputs because a completely full or empty buffer indicates that one of the following situations has arisen: data link has failed; transmitter has failed; or DSD master clocks have not been properly synchronised between transmitter and receiver.

Figure 16:
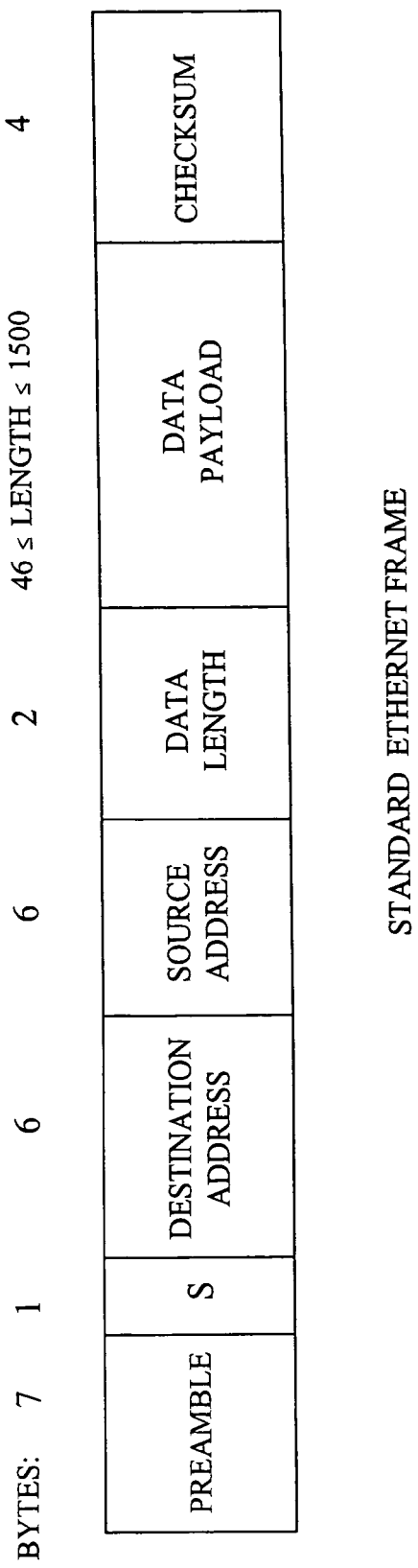
FIG. 16 schematically illustrates the data structure corresponding to a standard Ethernet frame.

FIG. 16 schematically illustrates the data structure of a standard Ethernet frame. The frame structure is defined in the IEEE 802.3 standard. As shown in FIG. 16 the Ethernet frame comprises a preamble, a start frame delimiter, a destination address field, a source address field, a data length field, a data payload and a checksum.

The preamble is 7 bytes long, each byte containing the bit pattern 10101010 and this is followed by a single-byte start frame delimiter S containing the bit pattern 10101011. The preamble and start frame delimiter are used for hardware timing purposes. The destination address field is 6 bytes long and specifies the physical address of the network adapter that is to receive the frame. The source address field is 6 bytes long and contains the physical address of the network adapter that is sending the frame. The data length field is 2 bytes long and specifies the size of the data payload. The data payload is a variable length field which is a minimum of 46 bytes and a maximum of 1500 bytes long. The checksum field is 4 bytes long and contains a checksum value for the frame that is used to perform a cyclic redundancy check (CRC). The CRC is a common means of verifying data transmissions. The sending network node calculates a CRC value for the frame according to a predetermined algorithm and encodes it in the frame. The receiving network node then recalculates the CRC and checks the CRC field to see if the values calculated by the transmitter and the receiver match. If the values do not match this indicates that data has been lost or corrupted during transmission. This Ethernet frame will be passed to the Physical layer components where it will be converted to a bit stream and sent across the transmission medium. Note that slight variations of this Ethernet frame format exist.

FIG. 17 shows the structure of an audio data frame according to an embodiment of the present invention. The audio data frame has a total size of 1536 bytes comprising: an 8 byte preamble (following which the physical layer will accept up to 1528 bytes of arbitrary data); a 6-byte field reserved for the destination MAC address (default value 0xffffff); a 6 byte field reserved for the source MAC address (default value 0x000000); a 2-byte data length field which specifies the number of bytes (always 1510 bytes) following this field but excluding the CRC; a 28-byte field reserved for networking headers; a 12-bit reserved field (as yet unallocated); a 4-bit frame type field which is used for example for synchronisation purposes; an audio data payload of 1480 bytes which holds 370 samples of 32 channel DSD audio; and a 4-byte CRC field containing a checksum. The CRC checksum procedure used in embodiments of the invention will be described below. The audio data frame structure illustrated in FIG. 17 is of a form that allows for compatibility with Internet Protocol (IP) networks. Accordingly the audio data frame may be treated as a User Datagram Protocol (UDP)/IP datagram for transmission over wider IP networks. UDP is a connectionless (best try) transport layer protocol. In this particular embodiment only the physical layer is used. The MAC layer is not used so the MAC address fields are not actually required by the system. These fields are simply reserved and filled with default values to allow (potential later) compatibility with Local Area Networks (LAN) or UDP/IP.

The audio frame CRC validity check will now be described in more detail. All frames use a 4-byte CRC check word, to verify the validity of the frame. The CRC algorithm, check word location and scope are similar to those defined in the standards document IEEE802.3-2000 section 3.2.8.

According to the IEEE802.3 standard, the payload of a frame should not be passed on from the data link layer until the frame validity has been verified with the CRC. However, in the context of embodiments of the invention, this implies that the receiver would have to buffer an entire frame before starting to output the DSD audio bitstreams. Direct implementation of this standard would be undesirable, as it would increase the audio latency by 115 µs, from around 25 µs to 140 µs.

The CRC is primarily used to check the validity of a data link between audio devices at system start-up. Link failures after start-up, such as a cable disconnection are indicated by a receiver error assertion from the PHY device, following which the audio output is muted. Since the link is a simple point-to-point connection, with deterministic, synchronised frame transmission and no collisions, other modes of failure are unlikely.

Accordingly, a relatively simple CRC check is implemented in embodiments of the invention. The receiver audio outputs are muted on start-up, until the first received frame has been received in full and verified by its CRC. If the CRC check fails, the audio outputs remain muted, and an error condition indicated to the local system controller. Following the verification of the first frame, the CRC is only be checked retrospectively. This allows audio data to be streamed out with near-zero receiver latency. The CRC is used only to alert a host processor that a CRC error has occurred.

If an invalid audio data frame is encountered, it is theoretically possible for up to 131 µs of invalid audio data to pass, before the output is muted in response to the retrospective CRC test. However, in practice, a random external perturbation that corrupts PHY line symbols will cause invalid symbols, resulting in rapid assertion of a receiver error condition, which may be detected to mute the audio outputs.

If use of a CRC check on every frame is considered necessary then each frame is buffered and verified using the CRC before outputting the DSD audio data. This is not a preferred option because it adds approximately 115 µs extra latency and substantially increases the receiver buffer hardware size.

The 1536-byte audio data frames illustrated in FIG. 17 each have a transmit duration of 120.9 µs (at a symbol rate of 101.6064 Mbit/s). According to a particular embodiment of the invention, frames are transmitted at intervals of 131.1 µs. A minimum inter-frame time of 96 bit periods is provided which leaves 8.25 µs of "link-time" between transmission of audio frames. This link-time is used to convey auxiliary frames containing control data. The maximum total size of a control data frame in this embodiment is 104 bytes.

The structure of a control data frame is identical to that of the audio data frame shown in FIG. 15, with the exception of the length of the data payload which is 1480 bytes for the audio data frame but only 48 bytes for the control data frame. A control data frame is transmitted every 131 μs which provides a control data bandwidth of 2.9 Mbit/s. The control data itself may comprise channel usage information, router control data and clock source control data. The control data will be transmitted from storage in a FIFO buffer at the transmitter and gathered in a FIFO buffer at the receiver before being routed to a system controller of the receiver.

FIG. 18A shows the audio data frame format for the 32 DSD channel embodiment which is arranged as 384*4-byte data words. Similarly, FIG. 19 shows the control data format for the 32 channel DSD embodiment arranged as 26*4-byte data words. In both FIG. 18A and FIG. 19, bit zero (B0) is transmitted first and bit 31 (B31) is transmitted last. These audio data frames and control data frames are passed to and received from the Media Independent Interface (MII) connection 218 that provides a link to the Ethernet physical layer devices. The MII comprises a 4-bit wide transmit data bus and a 4-bit wide receive data bus each of which is clocked from the PHY at the link rate of 25 MHz (or 25.4016 MHz). The MII also has a transmit-enable signal input to initiate data transmission and a receive data valid signal output as well as other error and signal status indicators.

Referring now to the audio data frame structure illustrated in FIG. 18A it can be seen that the payload of the audio data frame contains 370 samples of 32-channel 64 Fs DSD audio. These channels are multiplexed per-bit. Each 32-bit word represents one 64 Fs DSD sample for 32 audio channels. Word 13 is the first DSD sample in the frame, and word 382 is the last. Bit 0 of an audio data word is always the single-bit sample data for channel 1 (the first channel in the system) whereas Bit 31 of an audio data word is always the single-bit sample data for channel 32 (the last channel in the system). Table 3 below indicates how successive samples for each channel are stored in the data words of the audio frame. For example: bit 0 of word 13 is the channel 1 sample data, for the first DSD sample in the frame; bit 6 of word 14 is the channel 7 sample data, for the second DSD sample in the frame; and bit 31 of word 382 is the channel 32 sample data, for the last DSD sample in the frame.

TABLE 3

| Word | Bit 31 | Bit 30 | ... Bit 1 | Bit 0 |
|---|---|---|---|---|
| 13 | Ch. 32, sample 1 | Ch. 31, sample 1 | ... Ch. 2, sample 1 | Ch. 1, sample 1 |
| 14 | Ch. 32, sample 2 | Ch. 31, sample 2 | ... Ch. 2, sample 2 | Ch. 1, sample 2 |
| ... | ... | ... | ...... | ... |
| 382 | Ch. 32, sample 370 | Ch. 31, sample 370 | ... Ch. 2, sample 370 | Ch. 1, sample 370 |

Although Table 3 above represents the frame format in 32-bits words, these are supplied to and from MII four bits (a nibble) at a time rather than a word (4-bytes) at a time. The sequence of nibbles supplied to the MII for the single 24 DSD channel frame of FIG. 18B is as shown in Table 4 below. The start of the 14$^{th}$ data 4-byte word (word 13) corresponds to the start of the 105$^{th}$ 4-bit nibble (nibble 104). The column headings TXD and RXD in the table below refer to the MII transmit and receive data buses respectively, which transfer nibbles of data synchronously with a 25 MHz (or 25.4016 MHz) clock.

Nibble 0 is the first nibble in the frame, and contains part of the preamble pattern (0×5). Nibble 104 is the first nibble of the audio data field (first nibble of word 13), and nibble 3063 is the last nibble of the audio data field (last nibble of word 382).

TABLE 4A

| nibble | TXD(3)/RXD(3) | TXD(2)/RXD(2) | TXD(1)/RXD(1) | TXD(0)/RXD(0) |
|---|---|---|---|---|
| 0 | 0 | 1 | 0 | 1 |
| 1 | 0 | 1 | 0 | 1 |
| ... | ... | ... | ... | ... |
| 104 | channel 4 sample 1 | channel 3 sample 1 | Channel 2 sample 1 | channel 1 sample 1 |
| 105 | channel 8 sample 1 | channel 7 sample 1 | Channel 6 sample 1 | channel 5 sample 1 |
| 106 | channel 12 sample 1 | channel 11 sample 1 | Channel 10 sample 1 | channel 9 sample 1 |
| ... | ... | ... | ... | ... |
| 111 | channel 32 sample 1 | channel 31 sample 1 | Channel 30 sample 1 | channel 29 sample 1 |
| 112 | channel 4 sample 2 | channel 3 sample 2 | Channel 2 sample 2 | channel 1 sample 2 |
| ... | ... | ... | ... | ... |
| 3062 | channel 28 sample 370 | channel 27 sample 370 | Channel 26 sample 370 | channel 25 sample 370 |
| 3063 | channel 32 sample 370 | channel 31 sample 370 | Channel 30 sample 370 | channel 29 sample 370 |

FIG. 18B schematically illustrates the audio data frame format for the 24 DSD channel embodiment. In this case the frame comprises 368*4-byte data words. The payload of the audio data frame comprises 352 DSD samples, each sample comprising 1-bit from each of the 24 channels. Data words 15 to 366 contain the audio data payload. Words 2 to 4 are reserved for source and destination MAC addresses. Bits 0 to 15 of word 5 specifies the total number of bytes in the frame from the beginning of the length field onwards but excluding the CRC field, which in this case is 1446 bytes. Bits 16 to 31 of word 5, words 6 to 12 and bits 0 to 15 of word 13 are data fields reserved for UDP and IP parameters. These data fields facilitate optional use of UDP/IP. When UDP/IP operation is not required the transmitter fills these fields with zeros. The receiver may ignore all these UDP/IP header fields, with the exception of the first four bits (bits 16 to 19 of word 5 in this case) which indicate the IP Version. The data entry in the IP version field is checked and an action is taken in correspondence with the determined value as specified in Table 5 below:

TABLE 5

| IP Header Value | Consequent Action |
|---|---|
| 0x0 | Process frame as normal (i.e. transmitter did not fill IP fields) |
| 0x4 | Process frame as normal (i.e. transmitter filled frame header fields according to IP version 4) |
| any other | Discard the frame |

The IP Version check is performed to ensure backwards compatibility of the current IP version 4 from future IP versions (i.e. IP version 6). Future IP versions may have different header lengths, and consequently the Frame Format ID fields may be located at a different position in the frame. The safeguard of checking the IP version field means that such a frame would be discarded by the receiver (due to having a value other than 0x0 or 0x4) which avoids the possibility of the frame being incorrectly interpreted due to the Frame Format ID fields not being in the expected location at words 13 and 14.

Bits 16 to 31 of word 13 and bits 0 to 31 word 14 in FIG. 18B are fields for specifying the MAC-DSD frame format. This 48-bit frame format field is logically divided into three distinct 16-bit (4-nibble) sections, each of which contains an identical set of frame format data on transmission. The same set of frame format data is repeated three times within a given frame to ensure that the frame format identifier is robust to transmission errors i.e. multiple copies of the data are sent to serve as an error protection mechanism. This data-repeat error protection mechanism has the advantage that it gives the required error correction capability given that 48 bits are available to convey 16 bits of information yet it is simple to implement. An alternative embodiment might use an error correction code such as a convolutional code to transmit the frame format ID payload.

Each of the three 16-bit frame format field sections are structured as illustrated in FIG. 20. The first nibble (bits 0-3) of each 16-bit section specifies the Protocol Minor Version (OxO-Oxf). The protocol minor Version field is used to indicate minor updates to the protocol specification. A more recent Minor Version should be fully backwards-compatible with a previous Minor Version associated with the same Major Version so that for example a Version 1.7 protocol must incorporate all the functionality of Version 1.6 protocol, and a Version 1.7 transceiver must be able to communicate fully with a Version 1.6 transceiver. The second nibble (bits 4-7) of each 16-bit section specifies the Protocol Major Version (OxO-Oxf). This field is used to indicate major updates to the protocol specification. Backwards-compatibility with previous Major Versions of the protocol is desirable but not mandatory. The third nibble (bits 8-11) of each 16-bit section specifies the Frame Type (OxO-Oxi). This field can be used to indicate different frame types used by a given version of the protocol. Within a given Major Version level, the definitions of frame types should be consistent. The basic type of audio frame is always Type 0. The table below specifies the information derivable from the Frame type number specified by bits 8 to 11 according to the described embodiment.

TABLE 6

| Frame Type Number | Name | Description |
|---|---|---|
| 0x0 | DSD audio frame | 352 DSD (2.8224 MHz) samples, 24-channel, plus 88 bytes aux data, (32, 26) Hamming linear block code error correction, 256-nibble interleaving |
| other | (invalid) | Invalid - reject frame |

The fourth nibble (bits 12-15) of each 16-bit section contains one or more flags used for example to flag frames for synchronisation purposes as described above with reference to the flow chart of FIG. 13. The definition of the flag bits is dependent upon the Major Version protocol level. The table below specifies the information derivable from the frame flag bits 12-15 according to the described embodiment. In particular bit 0 of the flags field is the 44.1 kHzsync flag. If flag 0 has a value 1 this indicates that the first DSD sample in frame was received at transmitter simultaneously with 44.1 kHz sync clock positive edge whereas if bit 0 of the flags field has value 0, this indicates that the first DSD sample in frame was not received at transmitter simultaneously with 44.1 kHz sync clock positive edge.

TABLE 7

| Flag bit | Name | Description |
|---|---|---|
| 0 | 44.1 kHz sync flag | 1: First DSD sample in frame was received at transmitter simultaneously with 44.1 kHz sync clock positive edge<br>0: First DSD sample in frame was not received at transmitter simultaneously with 44.1 kHz sync clock positive edge |
| others | (not used) | Set to 0 by transmitter, ignored by receiver |

FIG. 21 schematically illustrates the three 4-nibble sections of the frame format ID containing a set of data entries to be processed at the receiver. Section 0 comprises nibble 0 (n0) to nibble 3 (n4), section 1 comprises nibble 4 (n4) to nibble 7 (n7) and section 2 comprises nibble 8 (n8) to nibble 11 (n11). The manner in which the repetition of data sections is used at the receiver to reject data transmission errors will now be explained in the context of FIG. 21. According to the present technique it is known that on transmission, each of the three sections should contain an identical data set such that data entries in corresponding nibble positions of each of the three sections match. On particular it is expected that: n0=n4=n8; n1=n5=n9; n2=n6=n10; and n3=n7=n11. At the receiver triplets of corresponding nibbles are compared for equality, and a majority decision is taken as to the correct data value. Consider the example incoming receiver data set shown in FIG. 21. For the first triplet of nibbles it can be seen that n0=1101b, n4=1101b, n8=1101b i.e. the corresponding nibble values are identical so the value is assumed to be correct and the first nibble of the Frame Format, which specifies the protocol minor version, is set to the value 1101b. Similarly, for the second triplet of nibbles n1=n5=n9=1110b so the value is assumed to be correct and the second nibble of the Frame Format, which specifies the protocol major version, is set to 1110b. However, for the third triplet of nibbles there is a discrepancy between the data values since n2=n10=0110b but n6=1011b. In this case n6 is rejected as being erroneous on the basis of a majority decision so that the receiver outputs the third nibble of the Frame Format, which corresponds to the frame type, as 0110b. For the fourth and final triplet of nibbles it can be seen from FIG. 21 that none of the corresponding nibbles match n3=0010b, n7=0111b, n11=1100b. In this case a majority decision is impossible so the frame format cannot be determined and consequently the frame is rejected.

An alternative embodiment uses a modified Frame Format error detection/correction strategy. This alternative strategy also involves using the data repetition and majority decision approach but the strategy is augmented by using the 100Base-TX PHY 'MII receive error' (rx_er) signal to flag nibbles that are known to be in error. For example consider receiving the following values for the fourth triplet of nibbles with associated error flags as indicated: n3=1000b (rx_er=true), n7=0100b (rx_er=false), n11=1000b (rx_er=true). In this case, although the majority decision determines that 1000b is the correct value, the rx_er signal indicates that n3 and n11 are definitely incorrect. Thus according to this alternative strategy the data vale n7 is selected in preference to n7 and n11 to give a Frame Format Flags value of 0100b.

Returning now to the frame data fields of FIG. 18B, the last word (word 367) of the 24 DSD channel data frame is a field containing cyclic redundancy check (CRC) data.

Table 4B below identifies the sequence of nibbles supplied to the MII for the single 24 DSD channel frame of FIG. 18B. This sequence is transmitted via the nibble-wide MII interface 218, starting with the least significant nibble. Nibbles 0 to 8 (32 bits) correspond to word 0 of FIG. 18B, nibbles 8 to 15 correspond to word 1 of FIG. 18B, nibbles 16 to 23 correspond to word 2 of FIG. 18B and so on until the last nibble which corresponds to bits 28 to 31 of word 366. There are a total of 2936 nibbles (367 words) corresponding to the 1446 byte frame of FIG. 18B since the last word is not transmitted as a nibbles. As mentioned above with reference to FIG. 1 the MII 218 interface provides independent 4-bit wide data-transmit and data-receive paths and full duplex operation. More particularly, the MII 218 comprises: a four-bit wide transmit data bus, clocked from the physical layer interface (PHY) 514, 526 at the link rate (25 MHz or 25.4016 MHz); a transmit enable signal input; four-bit (nibble) wide receive data bus, clocked from the PHY at the link rate (25 MHz or 25.4016 MHz); a receive data valid signal output; and error and signal status indicators. A full description of the MII interface, can be found in IEEE802.3-2000 Section 22, but note that the clock rate according to the present technique may be 25.4016 MHz rather than the IEEE standardised 25.0000 MHz.

TABLE 4B

| Nibble | Word (from FIG. 18B) | MII TXD(3) | MII TXD(2) | MII TXD(1) | MII TXD(0) |
|---|---|---|---|---|---|
| 0 | 0 | Bit 3 | Bit 2 | Bit 1 | Bit 0 |
| 1 | 0 | Bit 7 | Bit 6 | Bit 5 | Bit 4 |
| ... | ... | ... | ... | ... | ... |
| 7 | 0 | Bit 31 | Bit 30 | Bit 29 | Bit 28 |
| 8 | 1 | Bit 3 | Bit 2 | Bit 1 | Bit 0 |
| ... | ... | ... | ... | ... | ... |
| 2934 | 366 | Bit 27 | Bit 26 | Bit 25 | Bit 24 |
| 2935 | 366 | Bit 31 | Bit 30 | Bit 29 | Bit 28 |

The nibble is the fundamental unit of data carried on the physical layer. Each 4-bit nibble is mapped to a 5-bit symbol by the PHY 514, 526, for transmission on the signal line 515. All frames for transmission must begin with an eight-byte preamble pattern, following which the physical layer will accept up to 1528 bytes of arbitrary data, supplied 4 bits at a time. Received frames are supplied 4 bits at a time by the receive bus, including the preamble.

The 24 DSD channel frame format of FIG. 18B includes a frame payload of 352 DSD samples, each of which consists of a 32-bit data block. FIG. 22 schematically illustrates the format of the 32-bit data block. Each data block corresponds to a single DSD sample period of approximately 354 ns. The data block comprises a 24-bit audio data vector each bit of which belongs to a respective one of the 24 audio channels, 2 bits of auxiliary data and 6 check (or parity) bits. As shown in FIG. 22 bit numbers 0 to 14 contain bits 1 to 15 of the audio data vector, bit numbers 15, 23, 27, 29, 30 and 31 contain the six parity bits, bit numbers 26 and 28 contain the two bits of auxiliary data and the remaining nine bits of the audio vector are contained sequentially in bit numbers 16 to 22, 24 and 25 of the data block.

The six parity bits of the 32-bit data block provide error control capability. The 24-bits of audio data plus the two auxiliary bits (totaling 26 bits) are encoded using a type of linear block code known as a Hamming code. In this case a (31, 26) Hamming code is used, which means that 5 (=31−26) parity bits are generated by the code for each group of 26 data bits. The final bit of the 32-bit block is a global parity bit so there are a total of 6 parity bits and 26 data bits. The (31, 26) Hamming code is capable to detecting 2 errors per data block but is only capable of correcting one error per data block.

FIG. 23A schematically illustrates how the six parity bits P0 to P5 are generated from the 24 audio data bits (numbered 1-24) and the two auxiliary data bits A0, A1. Parity bits P0 to P5 are generated by performing a logical XNOR operation on a predetermined sequence of 15 data elements. For example P0 is generated by performing an XNOR operation on audio vector bits 1 through 15 whereas P1 is generated by performing an XNOR operation on audio vector bits 1 to 8 and 16 to 22. Global parity bit P5 is obtained by performing the XNOR operation on all 26 data elements. The error detection process at the receiver involves determining whether the parity checks are satisfied in the received data sequence. This is done using a value known as the syndrome. FIG. 23B indicates how the syndrome s is generated by XNOR operations on various combinations of the received data block elements. The syndrome is obtained by comparing the received parity bits and the parity bits recalculated from the received information. Table 8 below indicates how the value of the syndrome is used to detect and correct errors in the received data block. Essentially, if all 6 bits of the syndrome have value 1 (s=111111) then the received data sequence is assumed to be correct. If the sixth bit of the syndrome is zero then there is assumed to be a single error in the received data block, which is correctable by inverting the appropriate bit. The appropriate bit is identified from the value of the syndrome itself e.g. if s=011011 in binary notation, which corresponds to the decimal number 27 then it is determined that bit number 27 (of bits 0 to 31) should be inverted to correct the data block. If the sixth bit of the syndrome is 1 but the other five bits are not all 1 e.g. s=111011 then this indicates that there are two or more errors in the block and the multiple errors are uncorrectable.

TABLE 8

| $s_5$ | $s_4s_3s_2s_1s_0$ | Block status |
|---|---|---|
| 1 | 11111 | No errors in block |
| 0 | other | One error in block, identified by $s_4s_3s_2s_1s_0$ - correct error by inverting bit |
| 1 | other | More than one error in block - not correctable |

The 32-bit data blocks (see FIG. 22) are interleaved in groups of 32, to facilitate correction of groups of errors. The interleaving process involves permuting the data in a predetermined way. This is required because the (31, 26) Hamming code used for each 32-bit data block is only capable of correcting a single bit error in a given block. Since the fundamental unit of data on the physical layer the four-bit data nibble, a single instantaneous corruption on the physical layer will cause a symbol error (recall that a symbol is a 5-bit quantity), resulting in four consecutive bit errors. To facilitate correction of such 4-bit burst errors the erroneous bits must be distributed amongst four different 32-bit data blocks.

Consider a stream of 352 32-bit data blocks B0, B1, B2, ... B351 emerging from the parity generator for transmission. Recall that the 24 DSD channel frame of FIG. 18B comprises an audio data payload of 352 32-bit data blocks. The resulting stream of nibbles from the interleaver is comprised as shown in FIG. 24. In this Figure the bits of the audio payload are labelled such that B2[0] refers to bit 0 of block 2, for example. Thus it can be seen that nibble zero comprises bit 0 of blocks 0, 1, 2 and 3 respectively; nibble 1 comprises bit 0 of blocks 4, 5, 6 and 7 respectively and so on. Accordingly, nibbles 0 to 7 collectively comprise bit 0 of each of the thirty-two 32-bit data blocks, nibbles 8 to 15 collectively comprise bit 1 of each of the thirty-two 32-bit data blocks and nibbles 2802 to 2815 comprise bit 31 of each of the thirty-two 32-bit data blocks. The 32-block interleaving system used by MAC-DSD facilitates the correction of up to eight symbol errors (i.e. 32 bits can be corrected overall) in a group of 32 interleaved data blocks (256 nibbles or symbols).

In summary, the version of the MAC-DSD protocol used for transmission of 24 DSD channels as described above with reference to FIGS. 18B and 20 to 23 has key features including: 24-channel, full-duplex transfer of 2.8224 MHz DSD audio; 100Base-TX physical layer; audio latency of less than 50 microseconds; Hamming linear block code error correction, with 256-nibble interleaving, to correct up to 8 nibble errors per 256-nibble block group; 64 fs DSD clock transfer in both directions; and frame flag indication for transfer of the 44.1 kHz sync signal.

Figure 25:
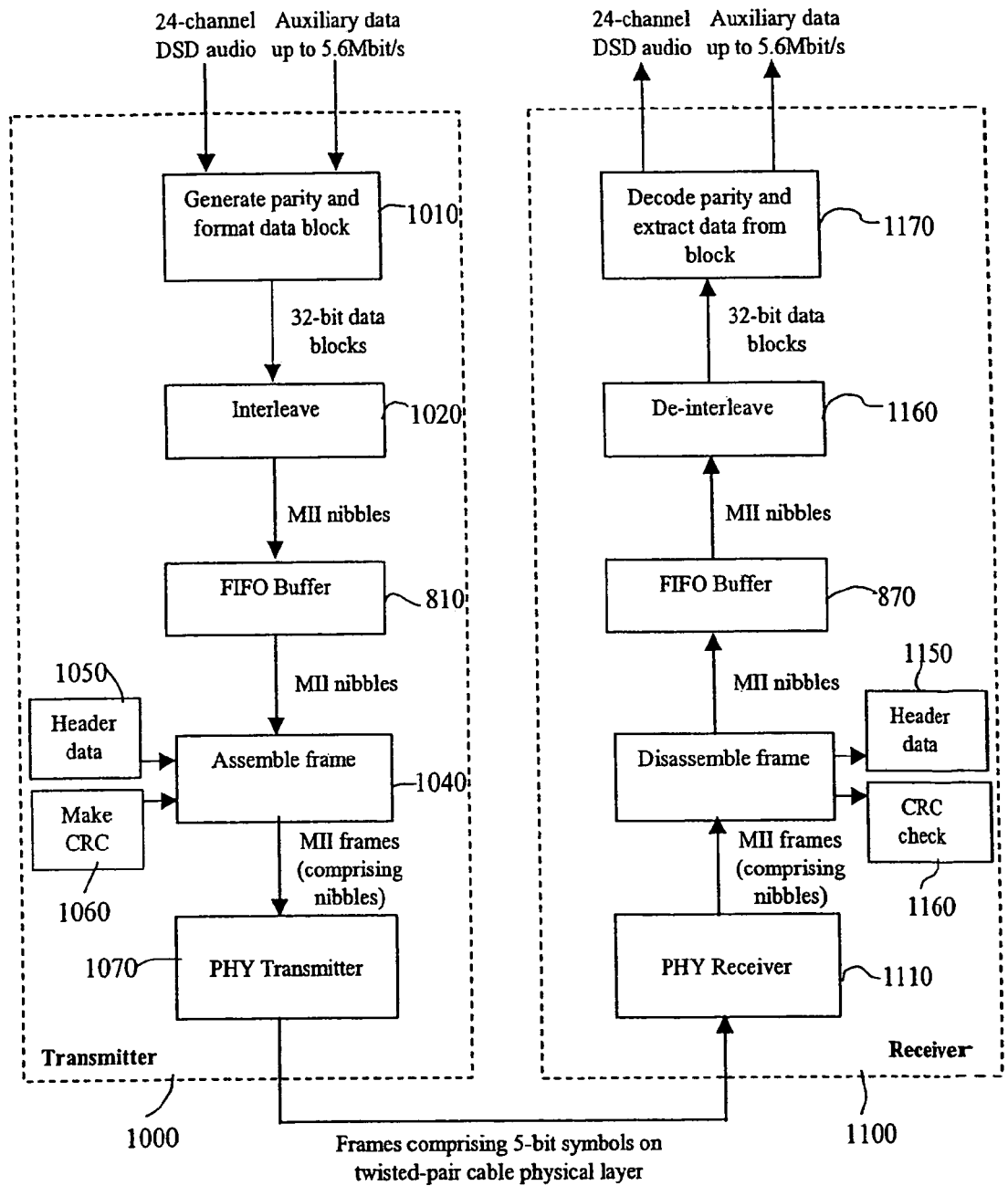
FIG. 25 schematically illustrates the protocol layers of the MAC-DSD protocol for the particular example embodiment using the 24 DSD channel frame format.

FIG. 25 schematically illustrates the protocol layers of the MAC-DSD protocol for the particular example embodiment using the 24 DSD channel frame format. On the transmitter side 1000 the protocol layers comprise a parity generating and formatting layer 1010 that receives the incoming 24 channel DSD audio stream and an auxiliary data stream of up to 5.6 Mbit/s. This layer 1010 generates six parity bits for each 24 audio bit and 2 auxiliary bit sample and formats the resulting 32-bit data block. The 32-bit data blocks output by the parity generating and formatting layer 1010 are supplied to an interleaving layer 1020 that interleaves the data blocks in groups of 32 and outputs the interleaved data across the MII 218 in 4-bit nibbles as specified in FIG. 24. The nibbles of data from the interleaver are supplied to the FIFO buffer 810 of the transmitter at a continuous data rate of 90.3168 Mbit/s. The nibbles continue to fill the FIFO buffer 810 until the predetermined threshold buffer occupation level is reached (as described with reference to FIG. 14) whereupon assembly of a data frame begins. During data frame assembly data nibbles are read out of the FIFO buffer 810 and passed to a frame assembly layer 1040. The frame assembly process involves use of a header data generation module 1050 that generates frame header information and a CRC generation module 1060 that generates data for the CRC field, which is word 367 of the frame format of FIG. 18B. The frames are assembled such that they contain a 1408 byte payload of 352 DSD samples contained in 352 32-bit data blocks. Data from the frame assembly layer 1040 is output as MII frames (which comprise nibbles) at a rate of 101.6064 Mbit/sec and supplied to the transmitter physical layer 1070 which prepares the data for transmission across the physical medium. The transmitter physical layer 1070 forms a 5-bit symbol from each 4-bit nibble and the symbols are transmitted to the receiver across a twisted-pair cable. On the receiver side 1100 a receiver physical layer 1110 receives the 5-bit symbols and processes them to form MII frames comprising 4-bit nibbles. The MII frames are supplied to a frame disassembling layer 1120 at a rate of 101.6064 Mbit/sec, which performs the CRC checks and strips off the header data for subsequent processing. The frame payload is output by the frame disassembling layer 1120 as MII nibbles which are fed to the FIFO buffer 870 (as described above with reference to FIG. 15) which has a low latency with regard to data output. Data is output from the FIFO buffer 870 in the form of MII nibbles and passed to a deinterleaving layer 1160. The de-interleaver de-interleaves the data in groups of 32 data blocks to reconstruct individual 32-bit data blocks of the format illustrated in FIG. 22. The 32-bit data blocks are then passed to a parity decoding and data extraction layer 1170 whereupon the parity data is used to perform error control and the recovered payload data is extracted. The output of this layer is a 24 channel DSD audio stream and an auxiliary data stream of up to 5.6 Mbit·s Note that in FIG. 25, although the FIFO buffers 810, 870 do not perform any data translation and therefore are not technically protocol layers, they are included in the schematic illustration of the protocol layer structure for completeness.

Note that in the case of the 352 sample payload of the 24 DSD channel frame format of FIG. 18B, the transmission buffer size and predetermined buffer occupancy threshold differs from the buffer size and occupancy threshold specified in the description of FIG. 14 above for the 370 sample payload of the 32 DSD channel Frame Format of FIG. 18A. In particular, for the 24 DSD channel frame format the minimum buffer size is 36 data blocks (rather than 42 data blocks) and the corresponding minimum occupancy threshold value is 30 data blocks (as before). The audio latency introduced by this buffering is equivalent to 36 DSD samples (rather than 42 samples) or 14.9 microseconds (rather than 12.2 microseconds).

The above described system in which the physical layer of a link such as an Ethernet link is used to provide a data communication system for transmission of DSD data may also be used to transmitted other types of clocked digital data. In particular the system may be adapted to accommodate transmission of Pulse Code Modulated (PCM) digital data. The physical layer connection according to the present technique offers high bandwidth for communication of PCM data.

Figure 26A:
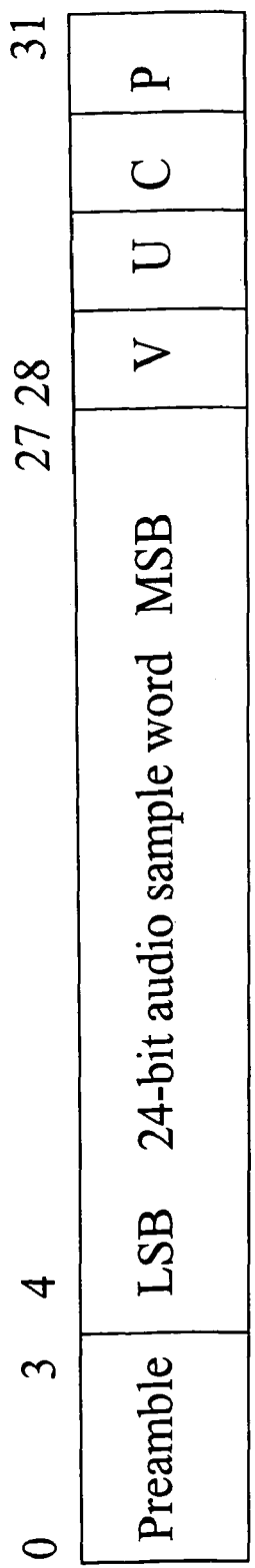
FIG. 26A schematically illustrates the AES3 sub-frame format.

PCM data is clocked at a much lower frequency (e.g. 44.1 kHz-96 kHz) than the 64 Fs clocking frequency of DSD data. Accordingly, in order to support PCM transmission as well as DSD transmission a further lower frequency clock signal, which shall be referred to as the word clock signal, is communicated between networked devices along the twisted pair cable. The word clock is used for reproduction of PCM data at the receiver. The frame format for 24 DSD channels as illustrated in FIG. 18B allows for transmission of 352 bits of data per frame for each of 24 audio channels. Essentially, 352 24 bit DSD samples (one bit per channel) are transmitted in a single frame. Data blocks are transferred over the link at an aggregate rate of 64 Fs, that is, 2.8224 MHz (=64*44.1 KHz) for 44.1 kHz based audio and 3.072 MHz for 48 kHz based audio. In order to transfer PCM data in the desired frequency range of (44.1 kHz-12.5%) to (96 kHz+12.5%) at the required data rates it is necessary to accommodate between 4 and 13 24-bit samples per frame. Accordingly, a number of alternative data formats are defined so that at the transmitter it is decided how many samples should be sent in the next frame and a look-up-table is consulted to select the appropriate one of the alternative data formats. Known PCM transmission formats such as I2S and AES3-1992 and package PCM sample data in serial sub-frames. AES3 is an Audio Engineering Society standard for the serial transmission format for linearly represented digital audio data over conventional shielded twisted-pair conductors, of up to at least 100 m in length, without equalisation. FIG. 26A schematically illustrates the AES3 sub-frame format. Each AES3 frame is uniquely composed of two sub-frames and typically the rate of frame transmission corresponds exactly to the source sampling frequency. The first sub-frame starts with the pre-amble X but the preamble changes to Z once every 192 frames. This defines the block structure used to organise the channel status information. The second sub-frame always starts with pre-amble Y. As illustrated in FIG. 26A each AES sub-frame is 32-bits long in which: bits 0 to 3 contain a preamble; bits 4 (least significant bit) to 27 (most significant bit) contain a 24-bit audio sample word; bit 28 is a "V" field which carries a validity bit associated with the audio sample word; bit 29 is a "U" field which contains one bit of a user data channel associated with the audio data channel transmitted in the same subframe; bit 30 is a "C" field or channel status field which carries one bit of channel status information associated with audio data transmitted in the same subframe; and bit 31 is a "P" field which carries a parity bit such that time slots 4 to 31 inclusive will carry and even number of ones and an even number of zeros i.e. even parity. The V bit is logic 0 if the audio sample word is suitable for conversion to an analogue audio signal and is logic 1 otherwise. The C bit is one-bit of channel status information specifying for example the length of audio sample words, number of audio channels, sampling frequency etc. Channel status information is organised in 192-bit blocks sub-divided into 24 bytes. The first bit of each block is carried in the frame having preamble Z.

Figure 26B:
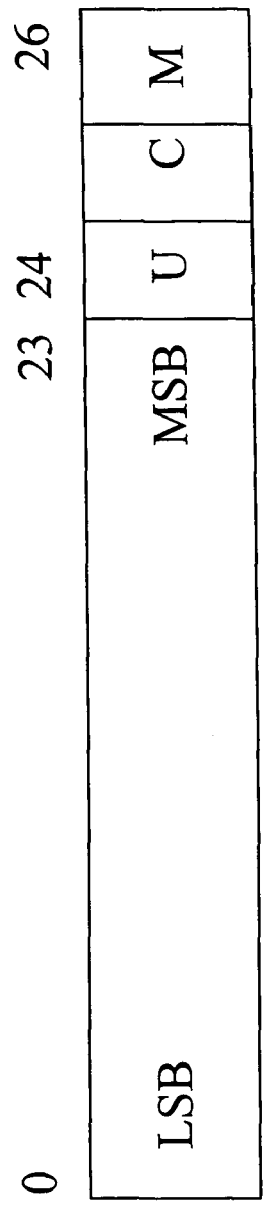
FIG. 26B schematically illustrates the sub-frame format for PCM transmission according to the present technique.
Figures 28A, 28B, 28C, 28D, 28E:
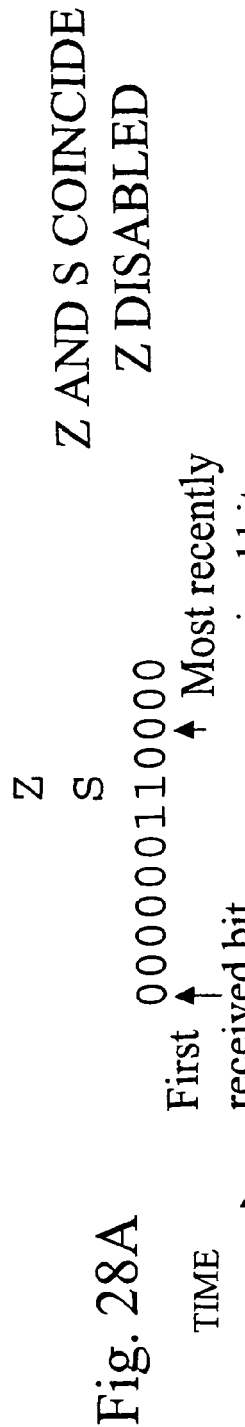
FIGS. 28A to E schematically illustrates circumstances in which the S-bit takes precedence over the Z-bit in the M-bit of the sub-frame format according to FIG. 26B.

FIG. 26B schematically illustrates the sub-frame format for PCM transmission according to the present technique. This 27-bit sub-frame structure includes the U bit and C bit fields of the known AES3 sub-frame format to facilitate transparent transfer of AES3 format data across the physical layer link. As illustrated in FIG. 26B, bits 0 to 23 contain data, bit 24 contains the U bit, bit 25 contains the C bit and bit 26 contains an M bit. The U and C bits are taken directly from incoming AES3 data streams or from the user data and channel status buffer memory in the transmitter. The M-bit is a multiplexed bit specific to the present technique and may be used to contain any of the three following indications at certain points in the bitstream: an S bit which is a flag that identifies an external Fs/n (n integer) synchronised data sample and is repeated across all data channels every n periods of Fs; the Z bit that signals the start of the AES3 U/C data block which repeats on each channel every 192 samples; and the V bit which is the sub-sampled AES3 V-bit status. The S and Z indications are each used to identify particular samples within the audio data stream. Since the S and Z indications are by their nature periodic it should in principle be sufficient to simply specify their phase with respect to the sample clock. However, in practice the S and Z indications should be repeated moderately frequently to enable the link to lock rapidly on start-up and to detect any link failures in a timely manner. The M-bit marks an S indication with two consecutive logical 1's in the bitstream as shown in FIG. 27B whereas a Z indication is marked by a single logical '1' as shown in FIG. 27A. In order to indicate the sync sample (S-bit) by two consecutive logical '1's in the M bit data stream a counter is provided at the transmitter to pre-empt the occurrence of the sync signal. The V-bit status is indicated for each channel in the bit immediately following the S indication. This implies that V is indicated less frequently than per-sample, but is indicated per-channel at intervals of the S sync (i.e. typically Fs/2048, or about 46 ms at 44.1 kHz), and also assumes that V-bit status does not change rapidly, which is a reasonable assumption for the vast majority of audio applications. FIG. 27C shows a V-bit indication which is a logical 1 (true), thereby signalling that channel samples are valid resulting in three consecutive logical 1's in the bit stream (two 1's for the S-bit and 1 for the V-bit). FIG. 27D shows a V-bit indication of 0 (false) immediately following the two logical 1's of the S-bit. This signals that the channel samples are invalid. Since the M-bit is used to indicate a number of alternative events it is likely that event indications will either coincide or be close enough in succession to interfere. For this reason priority is always given to S indications over Z indications. As a consequence of this Z indications will occasionally be missed so it is appropriate to maintain counts of the U/C block phases in the receiver in order to set the Z-bits in outgoing AES3 streams in these circumstances. FIGS. 28A to 28E give examples of relative occurrences of S indications and Z indications and indicate whether or not the relative positioning requires that the Z indication be disabled. In FIG. 28A the Z indication coincides with the second bit of the S indication so Z is disabled and only S is indicated. In FIG. 28B the Z indication immediately precedes the S indication in the received M-bit sequence, in which case Z is disabled because S is imminent. Otherwise the three consecutive logical 1's would be indistinguishable from the S and V indication of FIG. 27C. In FIG. 28C the Z indication precedes the S indication but is separated from it by a single bit period. Since Z and S are sufficiently separated so that they do not interfere so both the Z indication and the S indication are enabled here. In FIG. 28D the Z indication immediately follows the S indication and could lead to ambiguity so the Z indication is disabled. In FIG. 28D, the Z indication follows the S indication with a single bit-period separation. As for FIG. 28C, Z and S are sufficiently separated so that they do not interfere so both the Z indication and the S indication are enabled here.

For the purposes of transferring PCM data between devices on the physical layer the frame format is basically the same as the format described above in relation to FIG. 18B. In particular, each frame is 1472 bytes long and the data payload consists of 352 32-bit data blocks. Each 32-bit block comprises 24 audio data bits and two auxiliary data bits, which together form 26 independent bit-stream segments of 352 bits per frame. In PCM mode, each of the 24 audio bitstreams is divided into a number of sample subframes which are separated by padding. The number of subframes varies from 4 to 13 in dependence upon the particular PCM sample frequency. This enables support for samples rates from 44.1 kHz−12.5% to 96 kHz+12.5%. Each sample sub-frame contains data from a single PCM sample.

For each possible number of sample subframes per bit-stream segment, a specific arrangement of sample subframes and padding bits is defined. All padding bits should have the value 0. This determinism enables the receiver to correctly extract the sample subframes from the bitstream segment. These arrangements are shown in Table 9A. Table 9B gives a specific example of the subframe arrangement for the case of 9 sample subframes per frame.

TABLE 9A

| Number of sample subframes | Padding bits after each subframes | Final padding bits at end of bitstream segment |
|---|---|---|
| 9 | 12 | 1 |
| 10 | 8 | 2 |
| 11 | 5 | 0 |
| 12 | 2 | 4 |
| 13 | 0 | 1 |

TABLE 9B

| Element | Bits |
|---|---|
| sample subframe 1 of 9, bit 0 first | 27 |
| padding | 12 |
| sample subframe 2 of 9, bit 0 first | 27 |
| padding | 12 |
| sample subframe 3 of 9, bit 0 first | 27 |
| padding | 12 |
| sample subframe 4 of 9, bit 0 first | 27 |
| padding | 12 |
| sample subframe 5 of 9, bit 0 first | 27 |
| padding | 12 |
| sample subframe 6 of 9, bit 0 first | 27 |
| padding | 12 |
| sample subframe 7 of 9, bit 0 first | 27 |
| padding | 12 |
| sample subframe 8 of 9, bit 0 first | 27 |
| padding | 12 |
| sample subframe 9 of 9, bit 0 first | 27 |
| padding | 12 |
| final padding | 1 |
| Total | 352 |

Accordingly, the data block audio bit usage for the frame format of FIG. 18B in PCM mode differs from the audio bit usage in DSD mode. A further difference in the frame format in PCM mode relative to DSD mode relates to the Frame Format ID values contained in the three identical frame ID sections in words 13 and 14 of FIG. 18B. The frame format ID fields of each section were outlined above with reference to FIG. 20. In summary, each frame format ID section comprises a flags field, a frame type field, a protocol major version field and a protocol minor version field. To accommodate PCM mode, the frame type field values are extended relative to those defined in Table 6 above. As specified in the table of FIG. 29, 10 new frame type values have been defined corresponding to the 10 different possibilities
(integers in the range 4 to 13) for the number of sample subframes per frame. Two separate formats for the frame flags field of the frame format ID (see words 13 and 14 of FIG. 18B and FIG. 20) have been defined: one format for DSD frames and another format for PCM frames. The table of FIG. 30 shows the flags field format for a DSD frame. In this case flag bit 0 indicates whether or not the first DSD sample in the frame was received simultaneously with the 44.1 kHz sync clock positive edge whereas flag bit 1 indicates whether or not the first DSD sample in the frame was received simultaneously with the Fs/n sync clock positive edge. The tables of FIG. 31 show the flags field format for a PCM frame. In this case flag bits 0:1 specify the frequency of the audio base clock whereas flag bits 3:2 specify the base clock sample rate multiplier. The sample rate can be specified to be 1, 2, 4 or 8 times the base clock frequency Fs.

Figure 32:
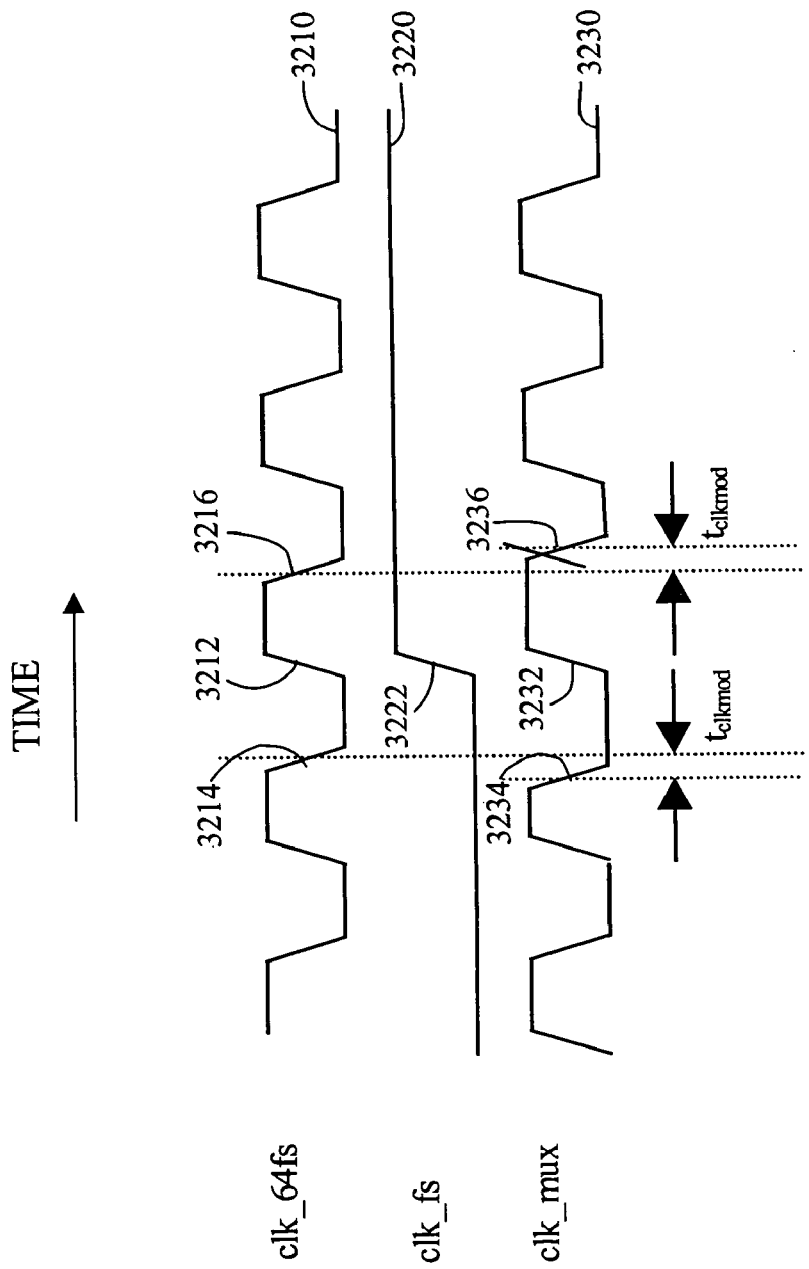
FIG. 32 schematically illustrates how a multiplexed clock signal is formed in dependence upon a 64 Fs signal and a word clock signal.

The PMC frame format described above relate to an example embodiment in which 24 audio channels are accommodated. An alternative embodiment may involve accommodating 48 audio channels in IFs PCM mode (sample rate 44.1 kHz or 48 kHz+12.5%). In this case two audio channels are multiplexed onto each bitstream. The multiplexing may be implemented per sub-frame or per bit. The clock and synchronisation functions of the PCM mode will now be considered in detail. As mentioned above, for transmission of PCM data across the network a word clock is required in addition to the 64 Fs MAC-DSD cable clock. Rather than sending two separate clock signals across the twisted pair cable, the 64 Fs clock and the word clock are multiplexed. The multiplexing process involves modulating the word clock signal onto the 64 Fs clock signal by shifting at least one edge of the 64 Fs clock pulse i.e. by generating a "clock pulse width deviation". The clock pulse width deviation acts as a phase indicator signal for the word clock, which is embedded in the 64 Fs clock. The clock pulse width deviation is formed by identifying certain transitions in the 64 Fs clock signal which are determined to be coincident with the word clock transitions at the transmitter. Since in this embodiment the positive-going transitions of the 64 Fs clock are used for timing synchronisation, the phase of the word clock is encoded by shifting the positions of negative-going 64 Fs clock transitions. In particular, where a word clock and 64 Fs clock transitions positive-going transition coincide, the preceding negative-going transition of the 64 Fs clock is shifted to produce a multiplexed clock signal. FIG. 32 schematically illustrates how the multiplexed clock signal is formed in dependence upon the 64 Fs signal and the word clock signal. In FIG. 32 the uppermost signal 3210 is the unmodified 64 fs clock signal used to synchronise the PLL in the receiver, the middle signal 3220 is the word clock signal used to synchronise PCM data framing in the receiver and the lowermost signal 3230 is the multiplexed clock signal in which the negative-going transitions have been shifted. The multiplexed clock signal 3230 is the clock signal that is transferred over the MAC-DSD link. In FIG. 32 time is increasing to the right along the horizontal axis. It can be seen that the positive going edge 3212 of the 64 Fs clock signal coincides with the positive-going edge 3222 of the word clock signal. Accordingly, the preceding negative-going edge 3214 of the 64 fs clock signal has been shifted back in time by time $t_{clkmod}$ thereby reducing the width of that clock pulse (see edge 3234 of in the multiplexed clock signal 3230) whilst the subsequent negative-going transition 3216 of the 64 fs clock edge has been shifted forwards in time by a corresponding time increment $t_{clkmod}$ (see edge 3236 of the multiplexed clock signal 3230) thereby increasing the width of the pulse. The negative transition 3236 after the word clock edge 3222 is delayed by the same amount that the preceding negative edge 3234 is advanced. The delay of the subsequent negative-going transition 3236 is performed by way of compensation to avoid DC content in the signal. DC content in the signal is likely to cause periodic "baseline shift" at the word clock frequency, when the signal is transmitted in an AC-coupled system. Performing this compensation on the clock cycle following the coincidence of the word clock and 64 Fs clock also reduces the Fs/n clock frequency content in the 64 fs signal. This is important, since it is desirable to reduce low-frequency jitter in the received 64 fs clock, which is typically used to feed a PLL circuit to generate an ADC/DAC audio sample clock. The edge offset time ($t_{clkmod}$) shown in FIG. 32 is exaggerated for ease of illustration. The true time shift will typically be very small, for example, one 2048 fs period (11.07 ns, at Fs=44.1 kHz). Note that the shift or "pulse width deviation" introduced to the clock mux signal shown in FIG. 32 does not occur every word clock cycle. Rather the clock pulse width deviation only occurs once every n clk_fs cycles, where n is an integer value controlled by a register. Effectively, introduction of the clock pulse width deviation every n word clock cycles amounts to multiplexing a clock signal of frequency Fs/n with the 64 fs clock. Since the frequency of the sample clock (word clock) is known, all that needs to be communicated by the transmitter is phase information which enables the receiver to reconstitute the word clock signal with a six-bit counter. The counter is reset by the Fs/n signal and incremented by the 64 fs clock. Note that the signal forms of FIG. 32 apply to both the transmitter (which generates the multiplexed clock) and receiver (which generates the Fs clock) ends of the connection.

Figure 34:
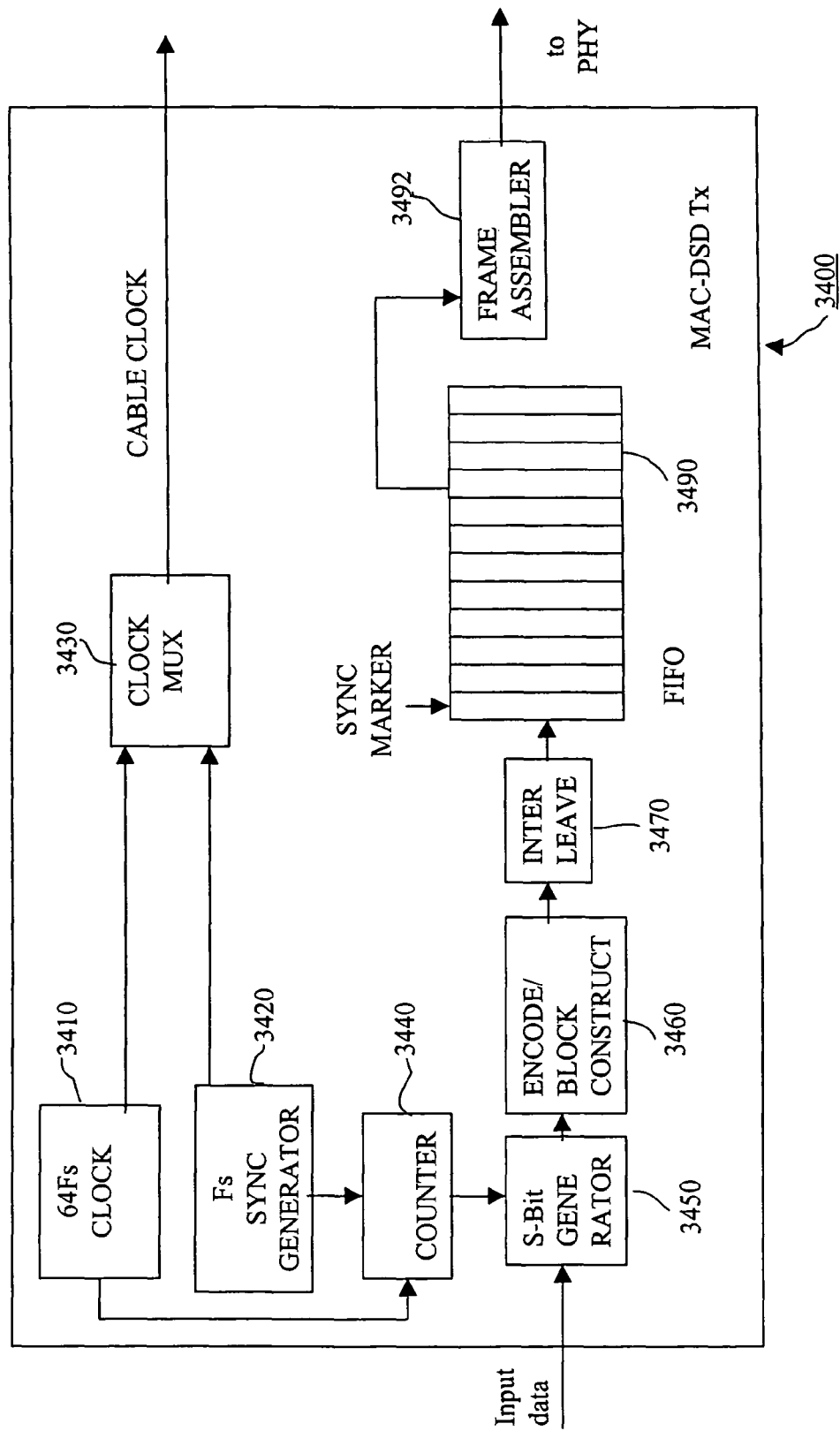
FIG. 34 schematically illustrates a MAC DSD transmitter adapted for transmission of both PCM and DSD data.

FIG. 34 schematically illustrates a MAC DSD transmitter 3400 (the counterpart of the FPGA 512 in FIG. 6) adapted for transmission of both PCM and DSD data. The MAC DSD transmitter module comprises: a 64 Fs clock generator 3410; an Fs sync generator (word clock generator) 3420; a clock multiplexer module 3430, a counter 3440; an S-bit generator 3450; an encoding and block construction module 3460; an interleaver 3470; a FIFO buffer 3490 and a frame assembler 3492.

Figure 33:
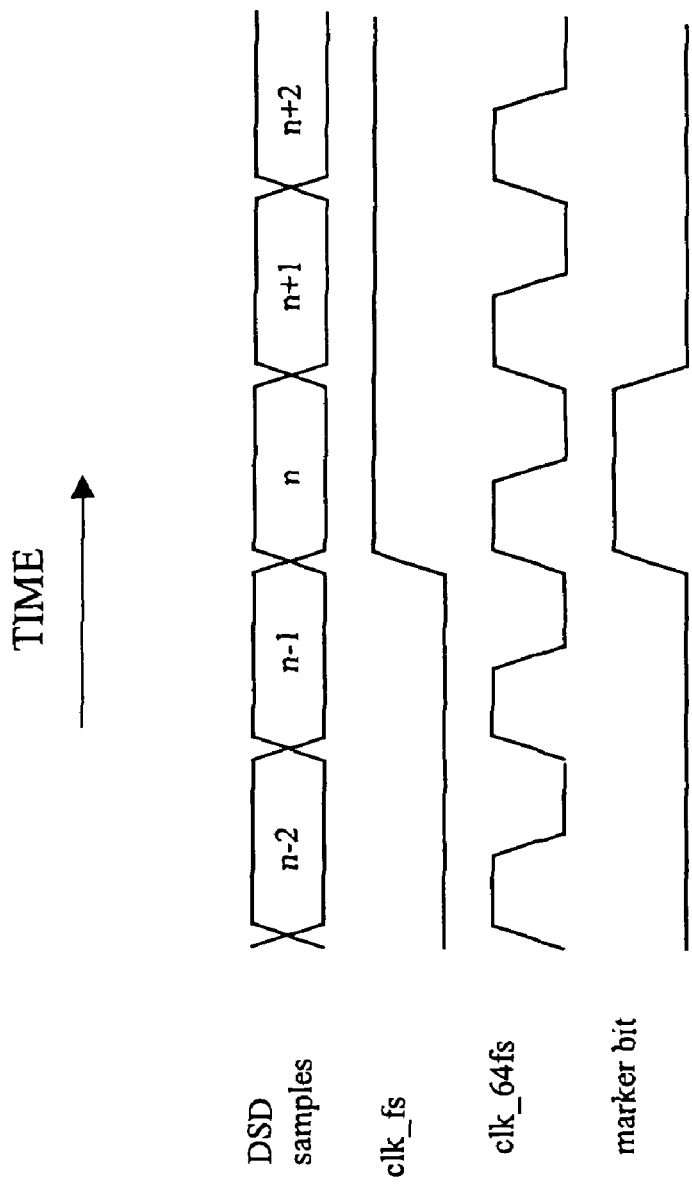
FIG. 33 schematically illustrates five consecutive DSD samples and their timing relationship with the local 64 Fs clock and the word clock.

The clock multiplexer 3430 generates the pulse width deviated clock signal (illustrated in FIG. 32) by shifting certain negative-going edges of the 64 Fs clock signal in dependence upon output from the word clock sync generator 3420. The pulse width deviated clock signal is transmitted across the twisted pair cable to the receiver. The counter 3440, keeps track of the 64 fs clock signal in order to pre-empt the occurrence of the Fs sync signal. It is necessary to pre-empt the Fs sync signal to facilitate generation of the S-bit in the audio data stream, which is performed by the S-bit generator module 3450. Note that the PCM samples are individually labelled with sync markers via the M-bit encoding (see 27-bit PCM audio sample structure of FIG. 27) whereas DSD mode frames rely on a frame flag bit being set in the transmitter and the marker bit of the first sample of the flagged frame being set on entry to the receiver FIFO. The output of the S-bit generation module 3450 is supplied to the encoding and block construction module where parity bits are generated and padding bits are inserted for PCM mode frames only to construct the 32-bit data blocks of the frame payload (see FIG. 18B). Data blocks from the encoding and block construction module 3460 are supplied to the interleaver 3470 which outputs 4-bit nibbles of interleaved data to the FIFO buffer 3490. The transmitter FIFO 3490 bridges the audio clock and link clock (PHY 514 in FIG. 6) domains of the transmitter. The transmitter FIFO buffer 3490 is 25 bits wide. Of the 25 bits, 24 bits are associated with 24 respective channels of concurrent DSD or PCM audio samples, the 25th bit being reserved as a synchronisation marker. The 25$^{th}$ bit indicates whether the corresponding DSD or PCM audio sample occurred simultaneously with an Fs/n clock edge in the transmitter. This is illustrated in FIG. 33 which shows five consecutive DSD samples (n−2), (n−2), n, (n+1), (n+2) and their timing relationship with the local 64 Fs clock and the word clock. It can be seen that sample n corresponds in time to the coincidence of the positive going edge of the word clock and 64 Fs clock. Accordingly the positive-going edge of the marker bit coincides with the beginning of DSD sample n. Data is read out from the transmitter FIFO 3490 in dependence upon the occupancy threshold (as described above with reference to FIG. 14) and supplied to the frame assembler 3492. Data from the frame assembler 3492 is supplied to the PHY of the transmitter. The transmitter start-up procedure differs slightly for PCM mode and DSD mode operations. In PCM mode on start-up, the transmitter starts transmitting as soon as possible. Marked samples are explicitly indicated via the PCM sample subframe 'M-bit' encoding. However in DSD mode marked samples are not explicitly indicated but are derived from flag bit 1 of the frame flags as specified in the table of FIG. 30. Accordingly, on start-up in DSD mode, the transmitter holds-off transmitting the first frame until one of the marked samples (i.e. sample synchronous with Fs/n clock) is available in the FIFO. While the transmitter is in this hold-off state, samples are read-out of the PHY clock side of the FIFO and dropped. When a marked sample becomes available (as indicated by flag bit 1), the interleaving, encoding and frame formatting mechanisms are enabled, such that the first sample in the first frame is the marked sample. From this point, frame transmission is governed by the buffer status (to initiate frame assembly) and frame format rules.

Figure 35:
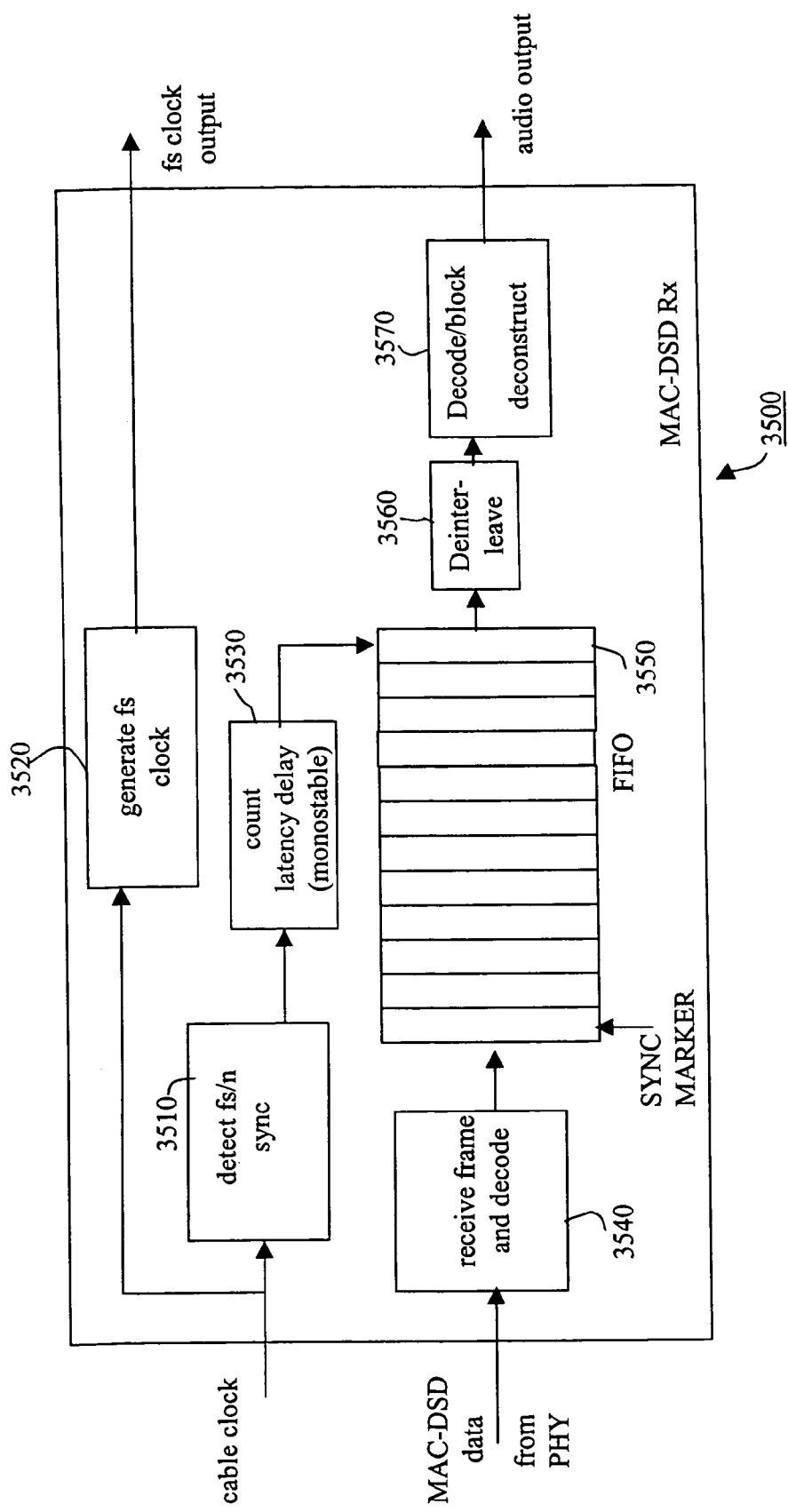
FIG. 35 schematically illustrates a MAC DSD receiver adapted for reception of both PCM and DSD data.

FIG. 35 schematically illustrates a MAC DSD receiver 3500 (the counterpart of the FPGA 526 in FIG. 7) adapted for reception of both PCM and DSD data. The MAC-DSD receiver 3500 comprises: an Fs/n sync detection module 3510; an Fs clock generation module 3520; a monostable counter 3530; a frame receiving and decoding module 3540; a FIFO buffer 3550; a deinterleaver 3560; and a decode/block deconstruction module 3570. The Fs/n sync detection module receives the pulse width deviated clock signal from the twisted pair cable and determines the relative phases of the 64 fs clock and the word clock on the basis of this signal. The Fs/n phase information is supplied as input to the word clock generation module 3520, which outputs the word clock (Fs) signal.

The incoming cable clock signal is passed directly to the local phase locked loop of the receiver system in order to synchronise the system. It is not possible to use the extracted Fs clock derived from the word clock generation module 3520 for this purpose. This is because the word clock generation module 3520 requires sequential logic that is clocked form the local PLL so that the extracted signal is always synchronous with the local PLL. This means that the output of the word clock generation module 3520 is unsuitable as a synchronisation source for the PLL.

Note that the Fs clock signal in the receiver is of the same phase as the Fs clock signal in the transmitter as a result of the Fs/n sync. The Fs/n phase information is also supplied to the monostable counter. The monostable counter is triggered by reception of each Fs/n indication to count 64 fs clock periods. The FIFO output is disabled on detection of the first marked sample in the FIFO 3550, whereupon the FIFO begins to fill with data. After a number of 64 fs cycles equal to the predetermined link latency, the FIFO 3550 outputs are enabled. The predetermined link latency incorporates the delay incurred in the transmitter due to data encoding and frame assembly plus the delay incurred at the receiver due to the decoding process. The predetermined latency of the data link is programmed to be an exact multiple of 64 fs clock periods measured with respect to the Fs/n sync signal transmitted on the cable clock.

MII frames (comprising nibbles) from the PHY 526 of the receiver (see FIG. 7) are supplied as input to the frame reception and decoding module, where header data is removed, and error checks are performed. The decoded data is supplied as input to the FIFO 3550 in the form of MII nibbles. The FIFO outputs 4-bit data nibbles, which are supplied to the deinterleaver 3560 for deinterleaving. The deinterleaved data is then fed to the decode/block deconstruction module 3570 where the audio data payload data is extracted and output as an audio data stream.

Figure 36:
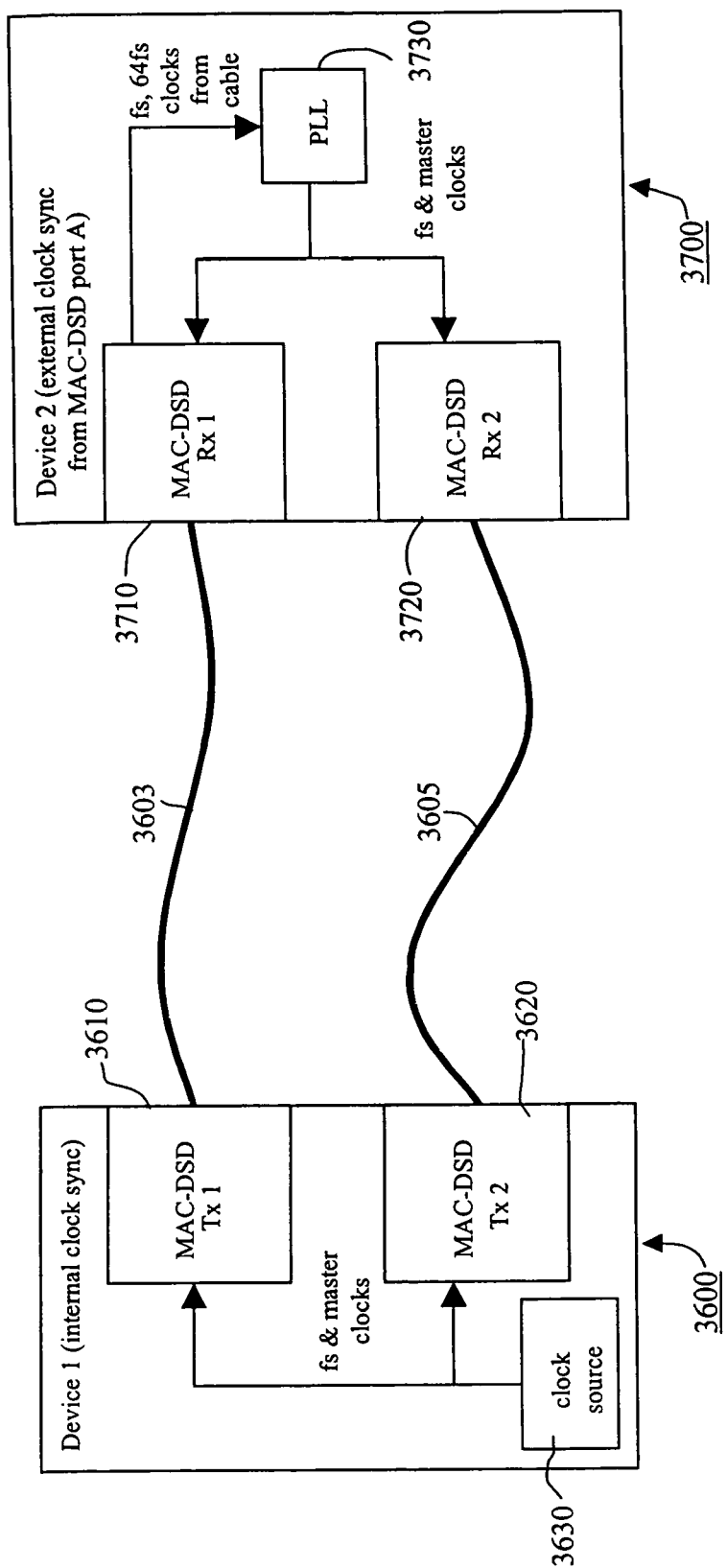
FIG. 36 schematically illustrates a system in which two sample-synchronous links are operated in parallel and in which the Fs/n sync is used to synchronise the parallel links.
Figure 37:
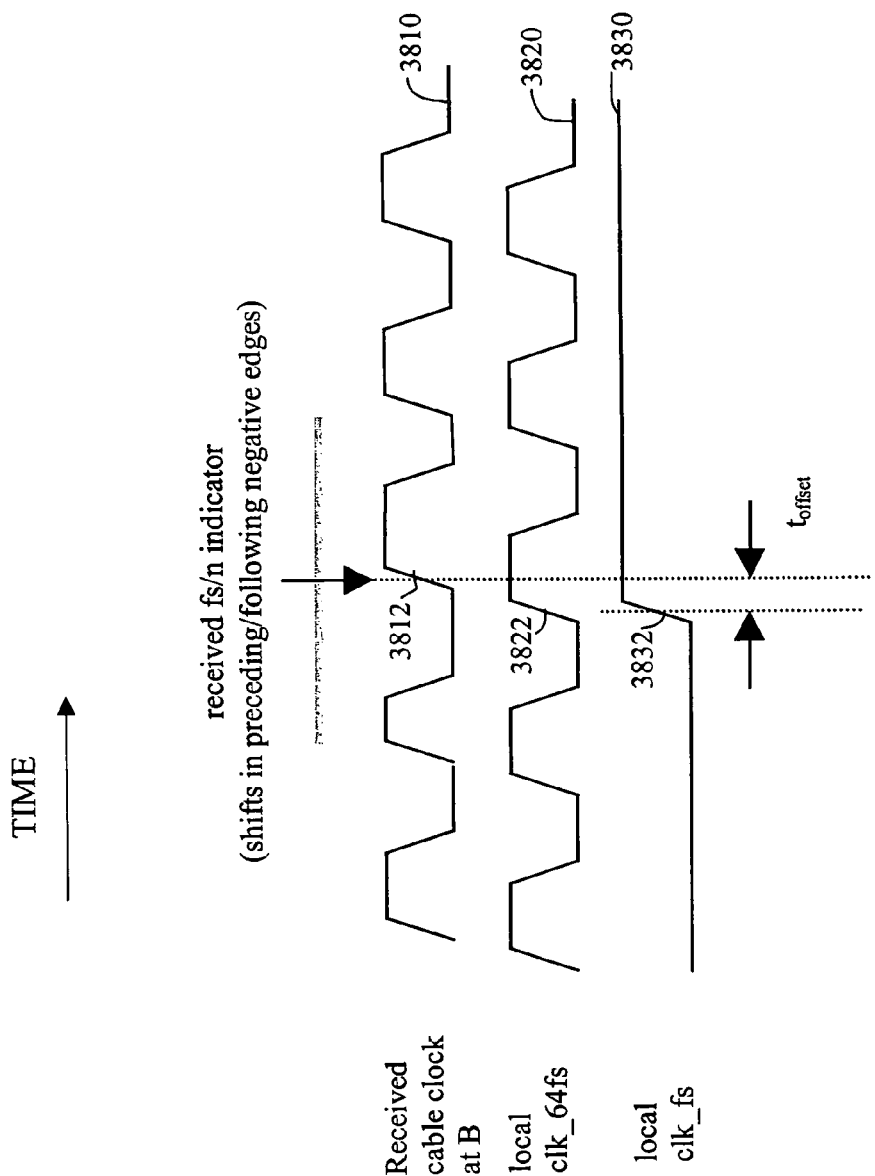
FIG. 37 schematically illustrates a measured difference in propagation delay between the two parallel links of FIG. 27.

FIG. 36 schematically illustrates a system in which two sample-synchronous links are operated in parallel and in which the Fs/n sync signal is used to synchronise the parallel links. The system comprises a transmitting device 3600 which is connected by a first cables 3603 and a second cable 3605 to a receiving device. The transmitting device 3600 has a first MAC-DSD transmitter 3610 which is connected to a first MAC-DSD receiver 3710 in the receiving device 3700 via the first cable 3603. The transmitting device 3600 also has a second MAC-DSD transmitter 3620 which is connected to a second MAC-DSD receiver 3720 in the receiving device 3700 via the second cable 3603. The two MAC-DSD transmitters 3620, 3620 are driven by an internal clock source 3630 that supplies them with both a 64 Fs clock and a word clock. In the receiving device 3700 only the first MAC-DSD receiver 3710 acts as a clock source thereby serving as a master clock. This receiver 3710 derives the word clock signal and the 64 Fs clock signal from the multiplexed clock signal received via the first cable 3603. Note that if a separate word clock source were used then neither of the MAC-DSD receivers 3710, 3720 would serve as a master clock source. The 64 Fs and word clocks extracted from the link cable 3603 are supplied to a PLL 3730 that outputs a word clock signal and a 64 Fs clock signal to both the first MAC-DSD receiver 3710 and the second MAC-DSD receiver 3720. The second MAC-DSD receiver 3720, which is not serving as the master clock source, should re-clock the multiplexed clock signal received via the second cable 3605 in order to detect the Fs/n indicator (i.e. the clock pulse width deviation). The propagation delay on the link via the first cable 3603, is likely to be different from the propagation delay on the link via the second cable 3605. The difference in propagation delay between the first link 3603 and the second link 3605 is determined by comparing the position of the received 64 fs clock edges with the locally-regenerated 64 fs clock (from PLL 3730), and by comparing the position of the received Fs/n indicator with the locally-regenerated Fs word clock, (also from PLL 3730). FIG. 37 schematically illustrates a measured difference in propagation delay between the two links. It can be seen from FIG. 37 that the positive-going clock edge 3812 immediately following the shifted negative-going clock edge (pulse width deviated pulse) in the clock multiplexed signal 3810 is shifted relative to the corresponding positive-going clock edge of the locally regenerated 64 Fs clock signal 3822 and relative to the positive edge 3832 of the locally regenerated word clock signal 3830 by an amount $t_{offset}$. In particular, the received cable clock Fs/n indicator occurs later in time than the local Fs clock edge. Given that the local Fs clock edge is derived to be synchronous with the received cable clock Fs/n indicator on the clock master MAC-DSD link, this indicates that the cable propagation delay for the second link 3605 is longer than the cable propagation delay for the clock master link 3603. The relative difference in propagation delay between the clock master link 3603 and the other link 3605 is $t_{offset}$. The time $t_{offset}$ is defined to be negative in the case that the non-master link 3605 is delayed relative to the clock master link 3603 as shown above, and positive in the case that the non-master link 3605 is advanced relative to the clock master link.

Once $t_{offset}$ is determined at the receiver, the following algorithm must be followed to adapt the latency monostable counter 3530 of the receiver to ensure synchronous operation with the clock master link. If $t_{offset}$ is positive (i.e. non-master link 3605 is advanced in time relative to clock master 3603 link) then when the Fs/n indicator is detected via link 3605 the latency monostable counter in MAC_DSD receiver 3720 is not started until the next word clock edge. However, if $t_{offset}$ is negative (i.e. non-master link 3605 is delayed relative to master link 3603 as in FIG. 37) $t_{offset}$ is rounded down to an integer number of 64 fs periods and one is subtracted from this value to derive a value for the timeout for the non-master latency monostable counter. The latency monostable counter in MAC-DSD 3720 (non-master) is started at the first 64 Fs clock edge following the timeout. This will result in the non-master latency monostable counter timing out synchronously with the monostable counter in the clock master receiver.

If the predetermined link latency period expires before a marked sample is detected in the FIFO 3550 this is an indication that either there is a fault in the system or that the predetermined link latency has been set at too small a value for the link conditions. Accordingly, if the latency period expires before the marked sample is detected an interrupt signal is raised and error indicator bits are set. Table 10 below specifies for each of seven audio data formats an example link latency in 64 Fs periods and in microseconds.

TABLE 10

| Audio format | Latency (64fs periods) | Latency (µs) |
| --- | --- | --- |
| DSD | 127 | 44.9 |
| 44.1 kHz PCM | 192 (3 samples) | 68 |
| 48 kHz PCM | 192 (3 samples) | 62.5 |
| 88.2 kHz PCM | 160 (5 samples) | 56.6 |
| 96 kHz PCM | 160 (5 samples) | 52.1 |
| 176.4 kHz PCM | 144 (9 samples) | 51.0 |
| 192 kHz PCM | 144 (9 samples) | 46.9 |

Figure 38:
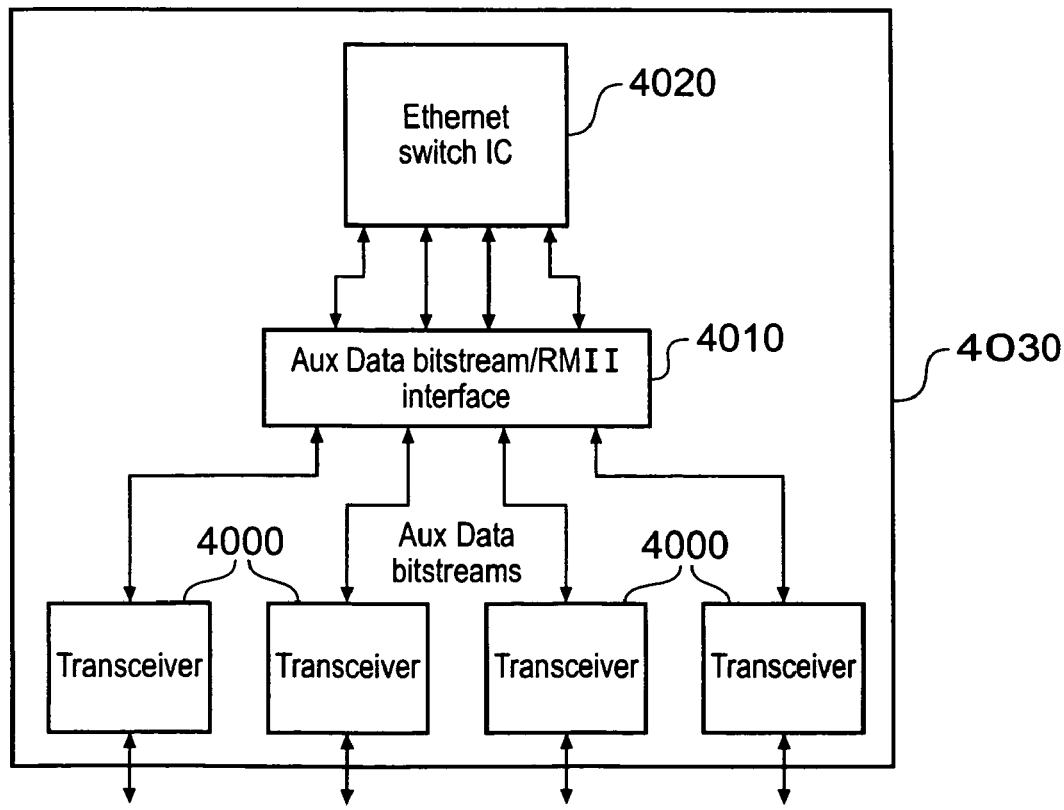
FIG. 38 is a schematic diagram showing auxiliary data routing by a MAC-DSD router.

FIG. 38 is a schematic diagram showing auxiliary data routing by a MAC-DSD router 4030.

The router comprises a number of MAC-DSD transceivers 4000, each of which is arranged as described above to transmit auxiliary data and audio data via an Ethernet physical layer device, and, on receiving such a bit stream, to separate out the audio data and auxiliary data streams. It should be noted that audio data routing and handling is not shown in FIG. 38.

In order to transmit auxiliary data over this system, the auxiliary data is formatted into Ethernet-like packets and the packets are then multiplexed into the two auxiliary data channels in the MAC-DSD protocol.

Non-limiting examples of the types of auxiliary data that might be carried are remote control data for recording and playback functions; general remote control data for audio and video devices; timecode; media content metadata; and auxiliary media, such as streamed compressed video images to accompany an audio feed for audio-visual production.

When a bit stream is received by one of the transceivers 4000, the auxiliary data bit stream is separated out and supplied to an auxiliary data bit stream-RMII interface 4010. RMII stands for Reduced Media Independent Interface, and is established as a standard arrangement within Ethernet systems, but it will be appreciated that other interfaces such as MII (media independent interface), SMII (serial media independent interface) and SS-SMII (source-synchronous serial media independent interface), which are all widely supported and used in multi-channel Ethernet PHY interfaces, could be used. The functionality of all of these is broadly equivalent; they just offer different trade-offs in pin-count reduction versus logic complexity.

As described above, the auxiliary data is carried as periodic single bits, or small groups of bits, interspersed amongst the audio data bits.

The RMII interface 4010 converts the auxiliary data bit stream from the two channels within the MAC-DSD protocol back into data packets which are set up so as to mimic Ethernet protocol data packets. The data packets have a packet address specifying another one of the MAC-DSD transceivers (or, in the case of a "broadcast" message, all of them).

The pseudo-Ethernet packets are supplied to a conventional Ethernet switch circuit 4020 which effects the routing on the basis of the packet addresses. In accordance with that routing, the packets are passed back to the auxiliary bit stream-RMII interface 4010 to be formatted back into an auxiliary data channel format for carriage by the appropriate MAC-DSD channel. From the interface 4010 the auxiliary data is passed to the appropriate one(s) of the transceivers 4000.

Figure 39:
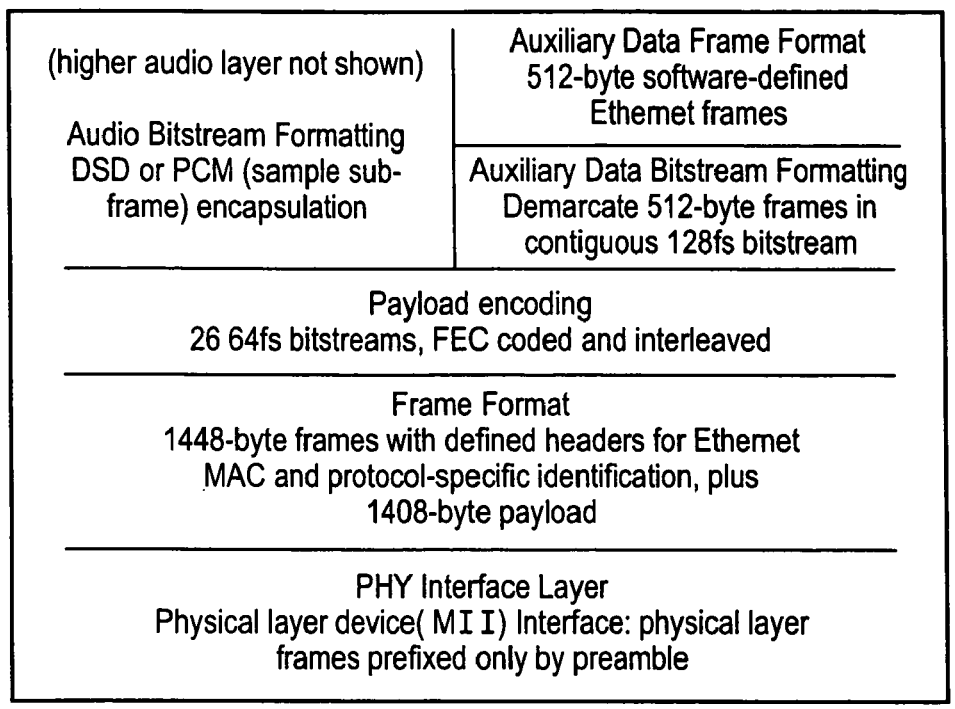
FIG. 39 is a schematic diagram showing a protocol by which auxiliary data is carried.

FIG. 39 is a schematic diagram showing a protocol by which the auxiliary data is carried.

At the bottom of FIG. 39 there is shown the Ethernet physical interface layer (PHY). This layer is common between the protocol shown in FIG. 39 and a standard Ethernet protocol. Physical layer data frames are prefixed only by a preamble.

On top of the physical layer there is imposed the MAC-DSD frame format made up of 1448-byte frames as described above. Over this, the payload encoding provides twenty-six 64 Fs channels (bit streams) with forward error correction and interleaving. It will be clear that the choice of the number of such channels is merely an implementation detail.

Again, as described above, the payload can include an audio bit stream, for example in DSD or PCM format and an auxiliary data bit stream. In the case of the auxiliary data, 512-byte frames are demarcated in the continuous 128 Fs bit stream forming the two auxiliary data channels. Within those 512-byte frames, there is defined an Ethernet data frame format. (512 bytes is just an example frame length used in a first implementation. Other implementations can use different frame lengths, at least up to 1536 bytes, which is the maximum frame length for conventional Ethernet transmission).

So, the system carries frames which, when separated out from the rest of the physical bit stream, appear to be Ethernet auxiliary data frames. However, they are not carried by a conventional Ethernet protocol, but instead are carried by being inserted into the 128 Fs bit stream forming the two auxiliary data channels. So, the pseudo-Ethernet frames are transmitted as successive auxiliary data bits interspersed within an audio data bit stream. They would not be directly recognisable as Ethernet frames by a conventional Ethernet data handling device.

Figure 40:
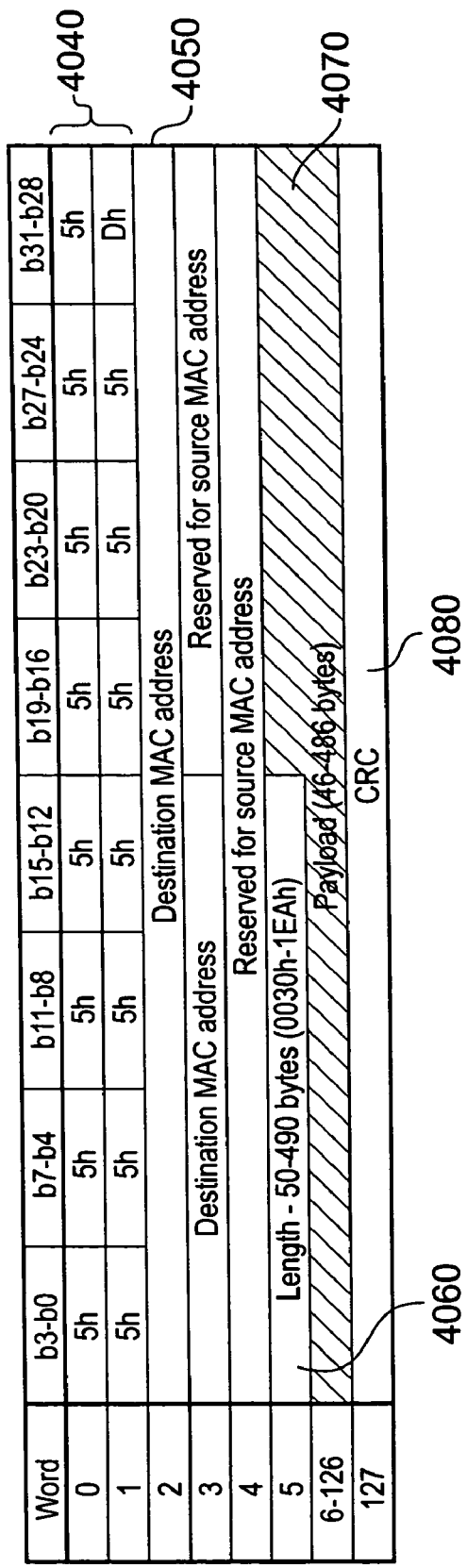
FIG. 40 schematically illustrates a data structure of an auxiliary data frame.

FIG. 40 schematically illustrates a data structure of an auxiliary data frame. The structure comprises a fixed header 4040, a destination address 4050, a length field 4060, a payload 4070 and an error detecting code 4080. The total length of the frame in this embodiment is a maximum of 128 words, which equates to 512 8-bit bytes.

Figure 41:
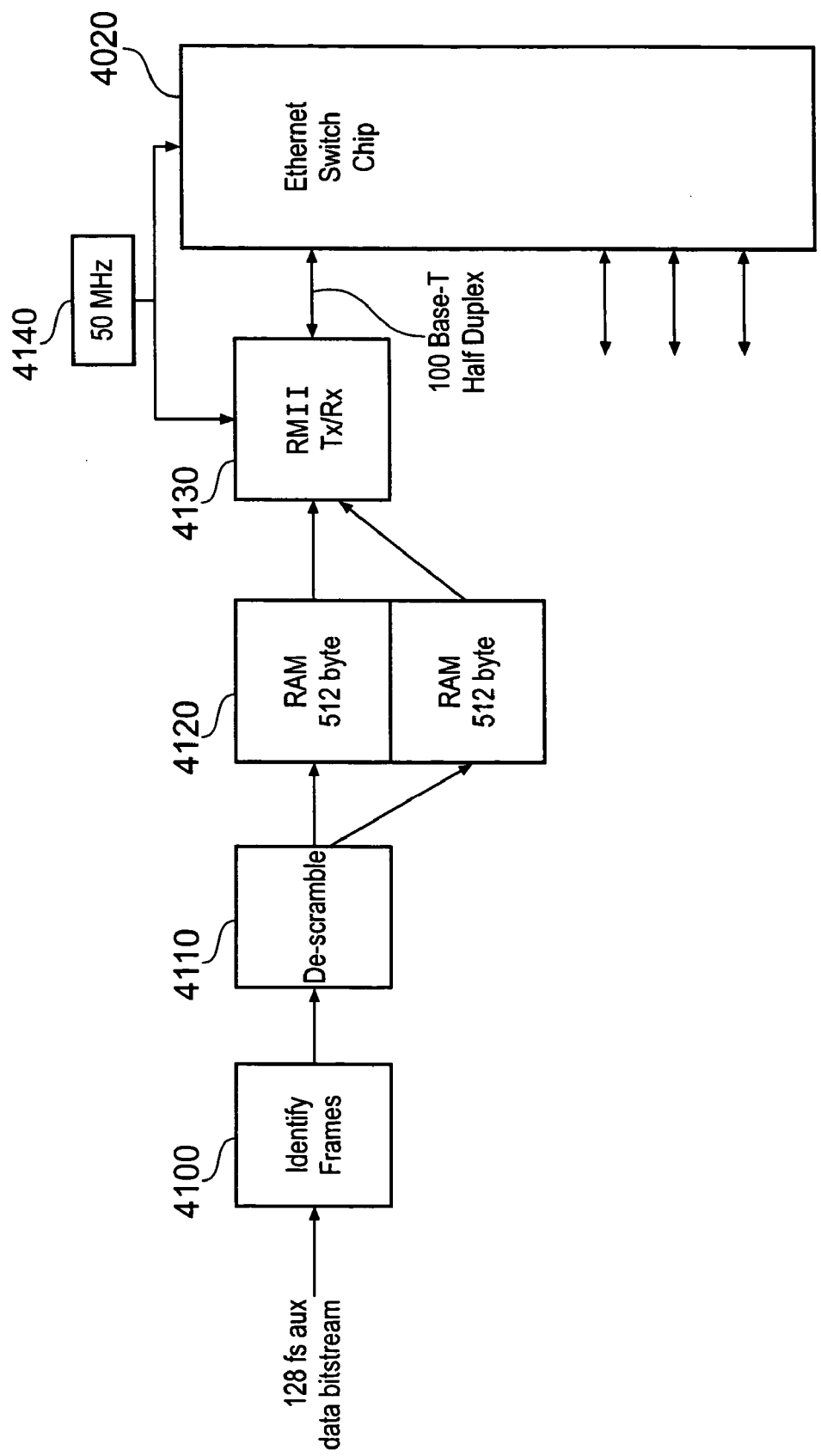
FIGS. 41 and 42 schematically illustrate the operation of an auxiliary data router in a data receive mode and a data send mode respectively.

FIG. 41 schematically illustrates the operation of the interface 4010 and the switch 4020 of FIG. 38 in a data receiving mode.

The 128 Fs auxiliary data bit stream, comprising the two logical channels of auxiliary data separated out by the MAC-DSD transceiver 4000, is supplied to a frame identifier 4100. Frames are identified in the auxiliary data stream by a synchronisation flag comprising 01111111110 (a zero, nine ones, a zero). The frame is then transmitted serially. To ensure the uniqueness of the synchronisation flag, a zero is inserted (on transmission) after any eight consecutive ones of the frame data—so the occurrence of nine consecutive ones can only indicate a synchronisation flag. The extra zero is inserted irrespective of the bit following the run eight ones. At the end of the frame, another synchronisation flag is transmitted. During intervals when a frame is not being transmitted, the bit stream comprises contiguous synchronisation flags.

Therefore, at the frame identifier 4100, incoming data is examined to detect the presence of nine consecutive ones, thereby indicating a frame synchronisation flag.

The data is then passed to a descrambler 4110. To put the descrambler into context, the reason for scrambling the data in the first place will now be described.

Certain data payloads which feature frequent long strings of ones could cause the system to insert large numbers of additional zeros, with a correspondingly large increase in the amount of data to be sent. This in turn could cause a very non-deterministic reduction in the effective bandwidth of the system. This may be mitigated by scrambling the data with a convolutional encoder before the bit stuffing (insertion of extra zeroes) is carried out. In this case, the expansion from the insertion of extra zeroes will be reduced to a factor of approximately $1/(2^8)$ (1 bit in 256, or 0.39%).

Figure 43:
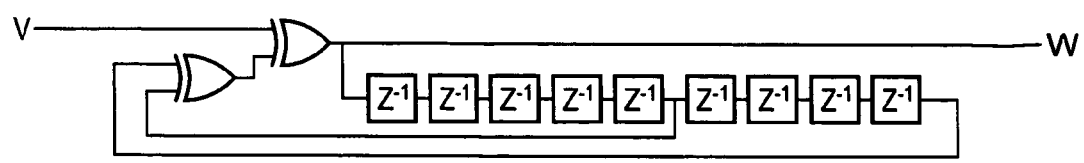
FIGS. 43 and 44 schematically illustrates a data scrambler and a complementary descrambler respectively.
Figure 44:
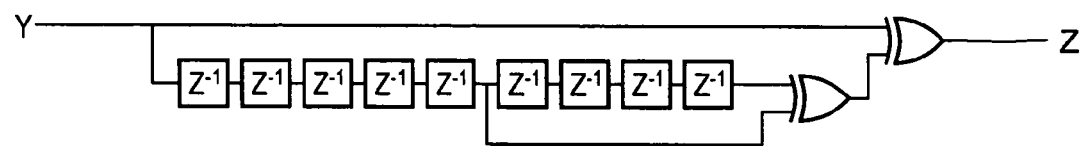
Figure 45:
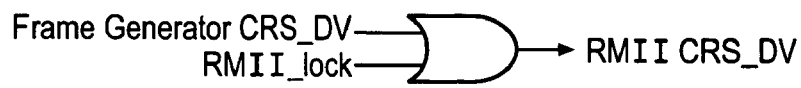
FIG. 45 schematically illustrates the generation of a carrier sense/receive data valid signal.

The scrambling encoder is schematically illustrated in FIG. 43 and the corresponding decoder in FIG. 44.

The encoder contains a 9-bit shift register and XOR gates, so that with an input V and an output W it implements:

$$W = V * W^{-5} * W^{-9}$$

The descrambling circuit of FIG. 44 again comprises a nine bit-shift register and XOR gates, so that with an input Y and an output Z it implements:

$$Z = Y * Y^{-5} * Y^{-9}$$

Note that neither the scrambler nor the descrambler imposes a delay upon the signal. Thus a cascade of the scrambler and descrambler imposes no algorithmic delay.

Therefore, at the descrambler 4110 (returning to FIG. 41) any additional zeroes (i.e. a zero after a run of eight ones) are first removed and then the data is descrambled using the descrambler of FIG. 44.

The resulting descrambled data is then passed to a dual port random access memory (DPRAM) 4120. This contains two storage areas, each large enough to hold at least a single data packet. Data is written into one storage area while it is being read out of the other, and then vice versa. When substantially all of a packet has been loaded into one side of the DPRAM, and assuming that the channel protocol allows it at that instant (see below), the packet of data is read out by an RMII interface 4130. The data is passed from the RMII interface 4130 to the Ethernet switch circuit 4020. The way in which this is achieved will be described below.

Figure 42:
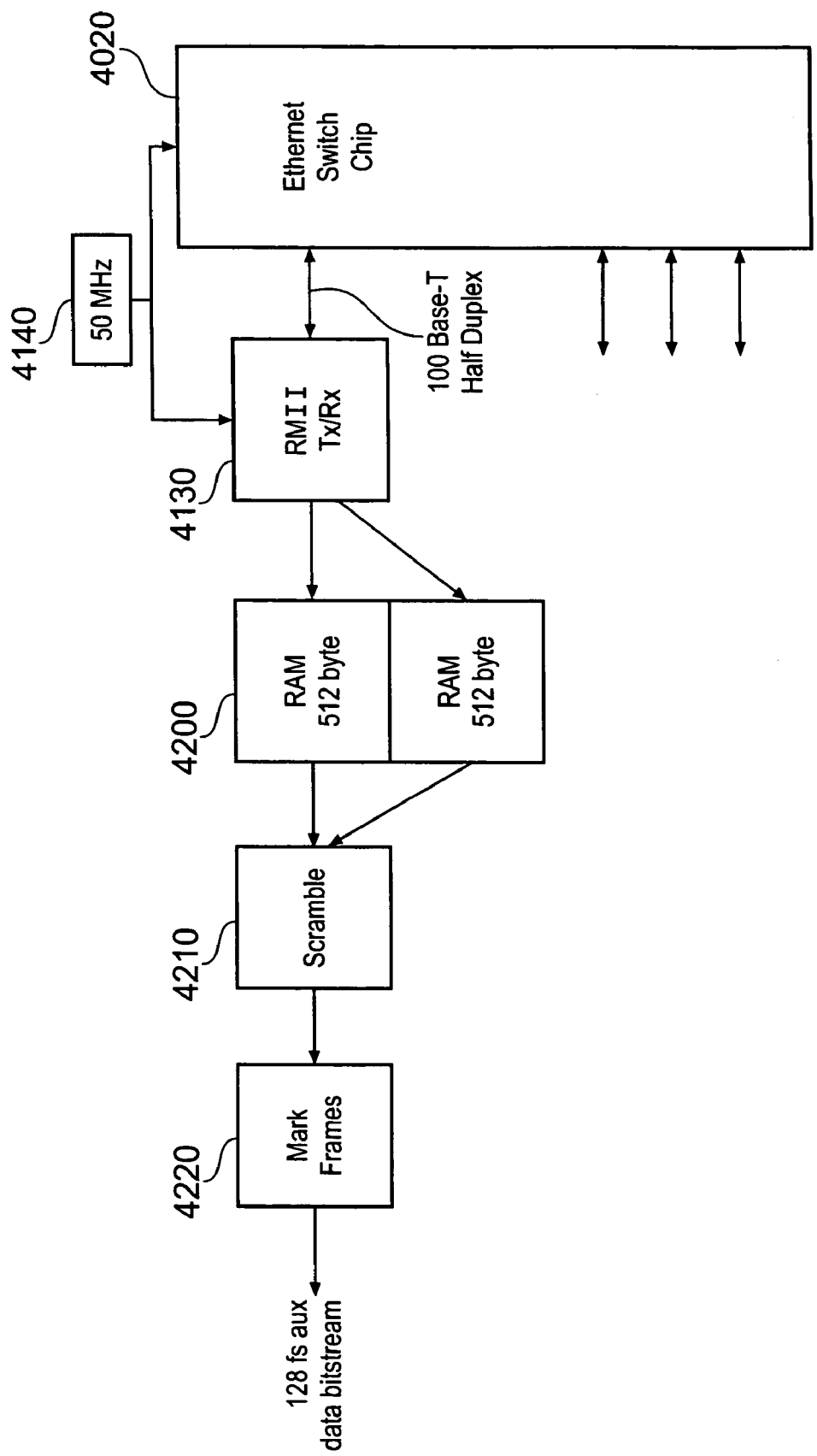

Referring to FIG. 42, when a data packet is received by the RMII interface from the Ethernet switch chip 4020, it is stored in a further DPRAM 4200. As a packet of data is assembled in the DPRAM 4200, it is passed to a scrambler (as FIG. 43) which includes a bit stuffer to add a zero after a run of eight ones in the scrambled data stream, and from there to a frame marker 4220 which inserts the frame synchronisation code 01111111110. The resulting bitstream is then transmitted within the auxiliary data channels of a MAC-DSD link.

The Ethernet switch chip 4020 and the RMII interface 4130 both operate under the control of an RMII interface synchronisation signal, for example a clock source 4140 running at 50 MHz. In other embodiments, however, the implementation may be simplified by running the RMII interface and the Ethernet switch chip at a non-standard rate such as a clock rate synchronous with the audio master clock. In such arrangements the clock source 4140 would be replaced by a clock generator receiving as an input the 64 Fs clock signal (or a signal related to it) shown in, for example, FIGS. 6 to 10 above.

The transmission protocol used between the RMII interface 4130 and the Ethernet switch circuit 4020 is the so called 100 Base-T half duplex system. This is a 100 Mbit/s arrangement in which only one of the parties to the communication can transmit at any one time. So, although the transmission can be bi-directional (to or from the Ethernet switch circuit 4020), the data transfer can occur in only one of the two directions at any one instant. The reason that the 100 Base-T half duplex system is used will now been explained.

The incoming data rate from the MAC-DSD transceiver (as received by the frame identifier 4100) is 128 Fs, or about 5.6 Mbit/s. This is therefore the maximum speed at which data packets need to be transmitted from the RMII interface 4130 to the Ethernet switch chip 4020. It is also the maximum speed at which data can be sent from the Ethernet switch chip to the RMII interface for retransmission via a MAC-DSD transceiver 4000. But in a system having several nodes connected via a single router, it is quite possible that multiple packets could be routed to a single output MAC-DSD channel at a certain time. This could in principle mean that the Ethernet switch chip might attempt to send data to a single RMII interface at a data rate greater than 5.6 Mbit/s.

The Ethernet switch chip 4020 is a standard Ethernet device. This is considered desirable because such devices are cheap and they contain logic for avoiding various types of transmission or reception faults. However, a 100 Base-T Ethernet switch chip does not contain logic for dealing with an output channel limited to a streamed data rate of 5.6 Mbit/s.

So, to avoid this problem happening, it is important that the RMII interface can regulate the flow of data which it receives from the Ethernet switch chip 4020. This is carried out using the half duplex arrangement.

Figure 46:
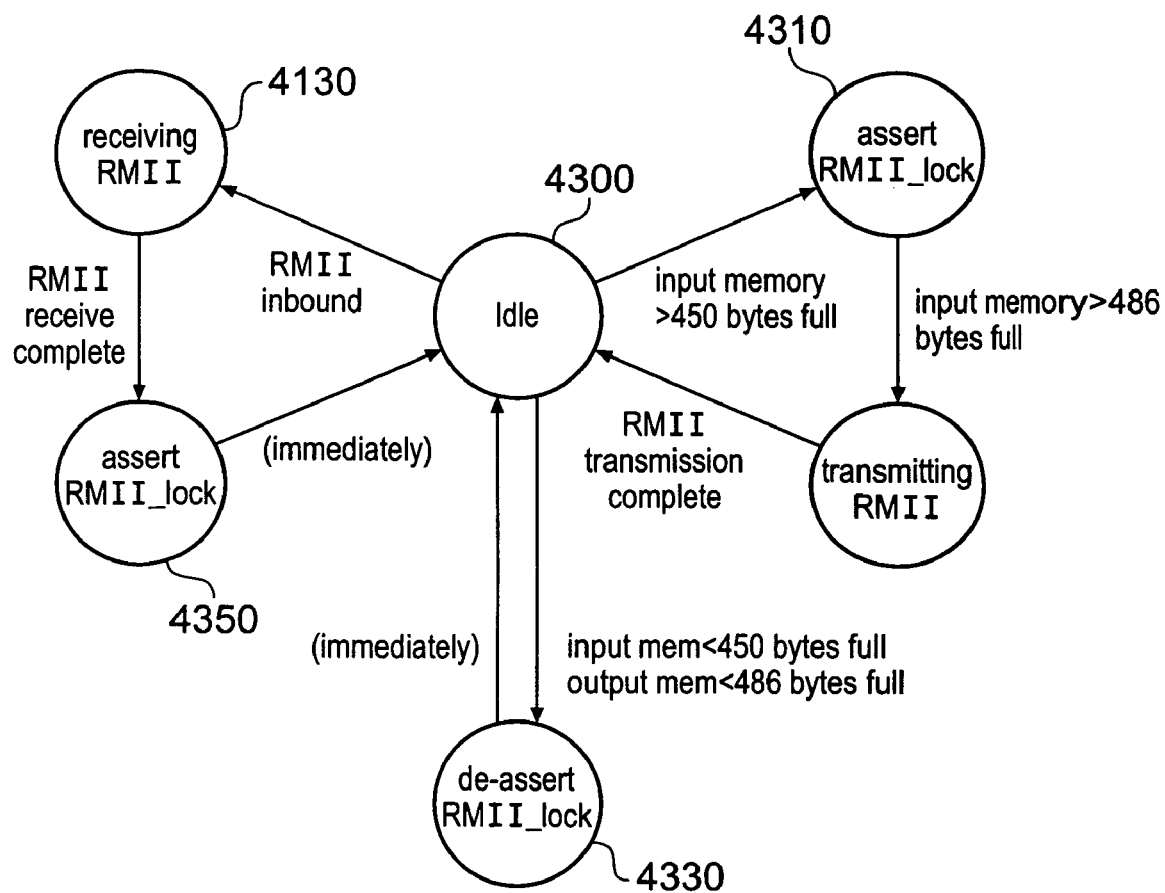
FIG. 46 is a schematic state diagram illustrating the use of an RMII lock function.

In basic terms, an RMII interface can assert a signal referred to as "RMII CRS_DV", or the carrier sense signal, to indicate that it is going to send data to the Ethernet switch circuit 4020. Assertion of this signal by one party allows the other communicating party to complete the transmission of a current frame but not to start transmission of a next frame. This arrangement is modified in the present embodiment so that the RMII CRS_DV signal can be asserted in one of two ways. Referring to FIG. 46, an OR gate combines two signals which can be asserted by the RMII device. One is a frame generator CRS_DV, which is a conventional carrier sense signal which is asserted only when a frame is to be transmitted, and the other is a signal referred to as RMII_lock.

RMII_lock is used as a "false" carrier sense signal to prevent the Ethernet switch chip transmitting any data to the RMII device. It is used at times when the RMII device or further downstream devices are not ready to receive any more data. The way in which RMII lock is asserted will be described with reference to FIG. 46.

FIG. 46 is a state diagram illustrating states entered by the RMII device 4130.

Starting from an idle state 4300, if more than 450 bytes have been received from a MAC-DSD transceiver for onward transmission to the Ethernet switch chip, then RMII_lock is asserted (a state 4310). This in turn asserts RMII CRS_DV. If the Ethernet switch chip is transmitting data back to the RMII device at that point, it is allowed to finish its current frame but not to start transmitting a new frame. However, because the Ethernet switch chip is running at 100 Mbit/s, higher than the data rate of all (or at least some in other embodiments) of the MAC-DSD transceivers, asserting RMII_lock when the input data reaches 450 bytes still allows time for the Ethernet switch chip to finish sending an entire frame back to the RMII device.

Then, when the input memory reaches an occupancy greater than 486 bytes, the RMII device transmits the data to the Ethernet switch chip (a state 4320). The threshold of 486 bytes is chosen with reference to a comparison of the two data rates of 5.6 Mbit/s and 100 Mbit/s, so that by the time that the frame has been almost fully transmitted to the Ethernet switch chip, the remainder of that frame should have arrived in the DPRAM. The RMII interface then returns to the idle state.

As soon as the input memory is less than 450 bytes full or the output memory is less than 486 bytes full, and the device is in the idle state, then RMII_lock is de-asserted (state 4330).

On the receiving side, if data is received from the Ethernet switch chip (state 4340) and the reception has been completed, RMII_lock is asserted (state 4350) and the device returns to the idle state. As mentioned above, RMII_lock is not de-asserted until the memory starts to empty of the data which has been received from the switch circuit.

The invention may be embodied in software, programmable hardware (e.g. FPGA, ASIC), hardware or a combination of these. In the case of a software component, the invention also includes a providing (e.g. storage) medium by which such software is provided.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data communication system for communicating one or more payload streamed data signals and an auxiliary data signal, the auxiliary data signal being arranged as one or more data packets according to a data packet protocol, each packet having a respective packet destination address, the system comprising:
   at least two data handling nodes, a transmitting one of said data handling nodes configured to transmit data to a receiving one of said data handling nodes across a data connection link;
   a transmission data formatter associated with said transmitting node configured to format said data packets of said auxiliary data signal into a streamed data signal format and multiplex said payload streamed data signals and said formatted auxiliary data signal into a transmission bitstream for transmission so that bits of the formatted auxiliary data signal are periodically interspersed as single bits amongst bits of the payload streamed data signals in the transmission bitstream;
   a received data reformatter associated with said receiving node configured to demultiplex said transmission bitstream into said payload streamed data signals and said formatted auxiliary data signal and reformat said demultiplexed formatted auxiliary data signal into packets of said auxiliary data signal according to said data packet protocol.

2. The system of claim 1, further comprising:
   a packetizer, associated with said transmitting node, configured to arrange said auxiliary data signal into data packets.

3. The system of claim 1, wherein said data packet protocol is an Ethernet packet protocol.

4. The system of claim 1, wherein said data connection link comprises a physical layer of an Ethernet link.

5. The system of claim 1, further comprising:
   a clock transmitter configured to transmit a clock signal, associated with said payload streamed data signal, from said transmitting node to said receiving node.

6. The system of claim 1, wherein said one or more payload streamed data signals are audio signals.

7. The system of claim 1, further comprising:
an auxiliary data packet router associated with said receiving node configured to route packets of said auxiliary data signal in accordance with said respective packet destination address.

8. A data transmitting node for transmitting one or more payload streamed data signals and an auxiliary data signal to a receiving node, said auxiliary data signal being arranged as one or more data packets according to a data packet protocol, each packet having a packet destination address, said transmitting node comprising:
a transmission data formatter configured to format said packets of said auxiliary data signal into a streamed data signal format and multiplex said payload streamed data signals and said formatted auxiliary data signal into a transmission bitstream for transmission so that bits of the formatted auxiliary data signal are periodically interspersed as single bits amongst bits of the payload streamed data signals in the transmission bitstream.

9. A data receiving node for receiving a transmission bitstream comprising one or more payload streamed data signals and an auxiliary data signal, said auxiliary data signal being arranged as one or more data packets according to a data packet protocol, each packet having a packet destination address, said packets of said auxiliary data signal being formatted into a streamed data signal format and multiplexed with said payload streamed data signals and said formatted auxiliary data signal into the transmission bitstream for transmission so that bits of the formatted auxiliary data signal are periodically interspersed as single bits amongst bits of the payload streamed data signals in the transmission bitstream; said receiving node comprising:
a received data reformatter configured to demultiplex said transmission bitstream into said payload streamed data signals and said formatted auxiliary data signal and reformat said demultiplexed formatted auxiliary data signal into packets of auxiliary data signal according to said data packet protocol.

10. A method of data communication system for communicating one or more payload streamed data signals and an auxiliary data signal, said auxiliary data signal being arranged as one or more data packets according to a data packet protocol, each packet having a packet destination address, said method comprising:
formatting, at a transmitting node, said packets of said auxiliary data signal into a streamed data signal format and multiplexing said payload streamed data signals and said formatted auxiliary data signal into a transmission bitstream for transmission so that bits of the formatted auxiliary data signal are periodically interspersed as single bits amongst bits of the payload streamed data signals in the transmission bitstream; and
demultiplexing, at a receiving node, said transmission bitstream into said payload streamed data signals and said formatted auxiliary data signal and reformatting said demultiplexed formatted auxiliary data signal into packets of said auxiliary data signal according to said data packet protocol.

11. A method of transmitting one or more payload streamed data signals and an auxiliary data signal to a receiving node, said auxiliary data signal being arranged as one or more data packets according to a data packet protocol, each packet having a packet destination address, said method comprising:
formatting said data packets of said auxiliary data signal into a streamed data signal format; and
multiplexing said payload streamed data signals and said formatted auxiliary data signal into a transmission bitstream for transmission so that bits of the formatted auxiliary data signal are periodically interspersed as single bits amongst bits of the payload streamed data signals in the transmission bitstream.

12. A method of receiving a transmission bitstream comprising one or more payload streamed data signals and an auxiliary data signal, said auxiliary data signal being arranged as one or more data packets according to a data packet protocol, each packet having a packet destination address, said packets of said auxiliary data signal being formatted into a streamed data signal format and multiplexed with said payload streamed data signals and said formatted auxiliary data signal into the transmission bitstream for transmission so that bits of the formatted auxiliary data signal are periodically interspersed as single bits amongst bits of the payload streamed data signals in the transmission bitstream; said method comprising:
demultiplexing said transmission bitstream into said payload streamed data signals and said formatted auxiliary data signal; and
reformatting said demultiplexed formatted auxiliary data signal into packets of said auxiliary data signal according to said data packet protocol.

13. A non-transitory computer readable medium encoded with program code, which when executed by a communication system, causes the communication system to perform a method of communicating one or more payload streamed data signals and an auxiliary data signal, said auxiliary data signal being arranged as one or more data packets according to a data packet protocol, each packet having a packet destination address, the method comprising:
formatting, at a transmitting node, said packets of said auxiliary data signal into a streamed data signal format and multiplexing said payload streamed data signals and said formatted auxiliary data signal into a transmission bitstream for transmission so that bits of the formatted auxiliary data signal are periodically interspersed as single bits amongst bits of the payload streamed data signals in the transmission bitstream; and
demultiplexing, at a receiving node, said transmission bitstream into said payload streamed data signals and said formatted auxiliary data signal and reformatting said demultiplexed formatted auxiliary data signal into packets of said auxiliary data signal according to said data packet protocol.

14. A non-transitory computer readable medium encoded with program code, which when executed by a computer, cause the computer to perform a method of transmitting one or more payload streamed data signals and an auxiliary data signal to a receiving node, said auxiliary data signal being arranged as one or more data packets according to a data packet protocol, each packet having a packet destination address, said method comprising:
formatting said data packets of said auxiliary data signal into a streamed data signal format; and
multiplexing said payload streamed data signals and said formatted auxiliary data signal into a transmission bitstream for transmission so that bits of the formatted auxiliary data signal are periodically interspersed as single bits amongst bits of the payload streamed data signals in the transmission bitstream.

15. A non-transitory computer readable medium encoded with program code, which when executed by a computer, causes the computer to perform a method of receiving a transmission bitstream comprising one or more payload streamed data signals and an auxiliary data signal, said auxiliary data signal being arranged as one or more data packets according to a data packet protocol, each packet having a packet destination address, said packets of said auxiliary data signal being formatted into a streamed data signal format and multiplexed with said payload streamed data signals and said formatted auxiliary data signal into the transmission bitstream for transmission so that bits of the formatted auxiliary data signal are periodically interspersed as single bits amongst bits of the payload streamed data signals in the transmission bitstream, said method comprising:

demultiplexing said transmission bitstream into said payload streamed data signals and said formatted auxiliary data signal; and reformatting said demultiplexed formatted auxiliary data signal into packets of said auxiliary data signal according to said data packet protocol.

* * * * *